United States Patent [19]

Janning et al.

[11] Patent Number: 6,064,308

[45] Date of Patent: May 16, 2000

[54] RF SIGNALING SYSTEM AND SYSTEM FOR CONTROLLING THE WHEREABOUTS OF ANIMALS USING SAME

[75] Inventors: Joseph J. Janning, West Chester; Eugene A. Janning, Cincinnati, both of Ohio

[73] Assignee: Pole/Zero Corporation, West Chester, Ohio

[21] Appl. No.: 08/956,732

[22] Filed: Oct. 23, 1997

Related U.S. Application Data

[60] Provisional application No. 60/029,464, Oct. 25, 1996, and provisional application No. 60/060,370, Sep. 29, 1997.

[51] Int. Cl.⁷ .................................................. A01K 29/00
[52] U.S. Cl. ........................ 340/573.3; 119/721; 119/908; 340/527.7; 455/91; 455/106; 455/899
[58] Field of Search ............................. 340/573.3, 572.7; 119/908, 721; 455/106, 91, 899

[56] References Cited

U.S. PATENT DOCUMENTS

| | | | |
|---|---|---|---|
| 2,774,060 | 12/1956 | Thompson | 340/572.5 |
| 2,800,104 | 7/1957 | Cameron et al. | 119/720 |
| 3,098,971 | 7/1963 | Richardson | 455/19 |
| 3,493,955 | 2/1970 | Minasy | 340/572.3 |
| 3,500,373 | 3/1970 | Minasy | 340/572.4 |
| 3,518,546 | 6/1970 | Augenblick et al. | 455/19 |

(List continued on next page.)

FOREIGN PATENT DOCUMENTS

| | | |
|---|---|---|
| 2455749 | 10/1981 | France . |
| 61-149880 | 7/1986 | Japan . |

OTHER PUBLICATIONS

Stutzman, W. L. et al. Antenna Theory and Design, N. Y., John Wiley & Sons (1981), p. 79. TK 7871.6.S877.

(List continued on next page.)

*Primary Examiner*—Glen Swann
*Attorney, Agent, or Firm*—Holland & Knight LLP

[57] ABSTRACT

An RF signaling system and system for controlling the whereabouts of animals utilizing same functions, in a preferred embodiment, by efficiently establishing well-defined electronic boundaries using small, battery powered transmitters transmitting constant envelope RF signals in a near-field regime by repetitively delivering trains of brief, low duty cycle pulses of electrical energy to a resonant circuit which includes an antenna at a low RF carrier frequency corresponding to the resonant frequency of the circuit. During intervals between pulses, the resonant circuit is effectively isolated from the circuit delivering the pulses to minimize loading effects. Further energy efficiency is achieved by interposing inactive interals between at least some successive transmissions of the RF signals represented by the pulse trains. The RF signals emitted by the transmitters are digitally encoded as are those emitted from a wire loop coupled to an optional wire loop unit to define a wire loop boundary. A unit affixed to the animal selectively administers appropriate aversive stimuli effective to deter encroachment of the boundaries in accordance with predetermined conditions based on the coding and timing of RF signals received from the transmitters and/or the wire loop. In the event of a break in the wire loop, the wire loop unit automatically switches excitation of the wire loop to an AM signal thereby facilitating location of the site of the break for repair purposes using a conventional AM radio receiver.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

57 Claims, 15 Drawing Sheets

Microfiche Appendix Included
(2 Microfiche, 113 Pages)

U.S. PATENT DOCUMENTS

| Patent No. | Date | Inventor | Class |
|---|---|---|---|
| 3,631,442 | 12/1971 | Fearon | 340/572.2 |
| 3,631,484 | 12/1971 | Augenblick | 342/46 |
| 3,665,449 | 5/1972 | Elder et al. | 340/572.1 |
| 3,689,885 | 9/1972 | Kaplan et al. | 340/825.34 |
| 3,707,711 | 12/1972 | Cole et al. | 340/572.2 |
| 3,711,848 | 1/1973 | Martens | 340/572.2 |
| 3,753,421 | 8/1973 | Peck | 119/721 |
| 3,754,226 | 8/1973 | Fearon | 340/572.3 |
| 3,820,103 | 6/1974 | Fearon | 340/572.2 |
| 3,836,842 | 9/1974 | Zimmerman et al. | 324/239 |
| 3,859,624 | 1/1975 | Kriofsky et al. | 340/941 |
| 3,895,368 | 7/1975 | Gordon et al. | 340/572.4 |
| 3,968,272 | 7/1976 | Anand | 438/570 |
| 4,063,229 | 12/1977 | Welsh et al. | 340/571 |
| 4,087,791 | 5/1978 | Lemberger | 340/825.54 |
| 4,129,855 | 12/1978 | Rodrian | 340/825.34 |
| 4,136,338 | 1/1979 | Antenore | 340/551 |
| 4,262,632 | 4/1981 | Hanton et al. | 119/51.02 |
| 4,274,089 | 6/1981 | Giles | 340/572.2 |
| 4,302,846 | 11/1981 | Stephen et al. | 455/19 |
| 4,331,957 | 5/1982 | Enander et al. | 342/22 |
| 4,335,682 | 6/1982 | Gonda et al. | 119/719 |
| 4,399,821 | 8/1983 | Bowers | 600/301 |
| 4,413,254 | 11/1983 | Pinneo et al. | 340/572.6 |
| 4,471,344 | 9/1984 | Williams | 340/572.2 |
| 4,503,399 | 3/1985 | Carr | 340/573.3 |
| 4,510,495 | 4/1985 | Sigrimis et al. | 340/825.54 |
| 4,618,861 | 10/1986 | Gettens et al. | 340/825.54 |
| 4,642,640 | 2/1987 | Woolsey et al. | 342/187 |
| 4,644,286 | 2/1987 | Torre | 340/572.4 |
| 4,656,478 | 4/1987 | Leuenberger | 342/51 |
| 4,670,740 | 6/1987 | Herman et al. | 340/572.2 |
| 4,679,046 | 7/1987 | Curtis et al. | 342/51 |
| 4,733,633 | 3/1988 | Yarnall, Sr. et al. | 119/721 |
| 4,736,207 | 4/1988 | Siikarla et al. | 343/895 |
| 4,745,882 | 5/1988 | Yarnall, Sr. et al. | 119/721 |
| 4,766,847 | 8/1988 | Venczel et al. | 119/721 |
| 4,777,478 | 10/1988 | Hirsch et al. | 340/573.3 |
| 4,783,646 | 11/1988 | Matsuzaki | 340/572.5 |
| 4,802,482 | 2/1989 | Gonda et al. | 119/720 |
| 4,814,751 | 3/1989 | Hawkins et al. | 340/573.1 |
| 4,847,592 | 7/1989 | Esch et al. | 340/572.8 |
| 4,885,571 | 12/1989 | Pauley et al. | 340/573.4 |
| 4,890,111 | 12/1989 | Nicolet et al. | 342/51 |
| 4,898,120 | 2/1990 | Brose | 119/721 |
| 4,910,500 | 3/1990 | Carr | 340/573.3 |
| 4,918,425 | 4/1990 | Greenberg et al. | 340/539 |
| 4,924,211 | 5/1990 | Davies | 340/573.4 |
| 4,952,913 | 8/1990 | Pauley et al. | 528/272 |
| 4,967,695 | 11/1990 | Giunta | 119/721 |
| 4,967,696 | 11/1990 | Tobias | 119/719 |
| 4,980,671 | 12/1990 | McCurdy | 340/568.1 |
| 4,992,794 | 2/1991 | Brouwers | 342/51 |
| 5,027,107 | 6/1991 | Matsuno et al. | 340/572.7 |
| 5,030,940 | 7/1991 | Siikarla | 340/572.2 |
| 5,054,428 | 10/1991 | Farkus | 119/720 |
| 5,061,918 | 10/1991 | Hunter | 340/573.2 |
| 5,065,138 | 11/1991 | Lian et al. | 340/572.2 |
| 5,067,441 | 11/1991 | Weinstein | 119/721 |
| 5,241,923 | 9/1993 | Janning | 119/721 |
| 5,575,242 | 11/1996 | Davis et al. | 340/573.3 |
| 5,794,569 | 8/1998 | Titus et al. | 119/721 |

OTHER PUBLICATIONS

Microchip Publication No. DS30189D entitled *EEPROM Memory Programming Specification* (pp. 1–5), Copyright 1996, Microchip Technology, Inc.

Microchip Publication No. DS00589A entitled "A PC–Based Development Programmer for the PIC16C84" (pp. 1–6) copyright 1994 Microchip Technology Inc.

Microchip Publication No. DS30081B entitled "8–Bit CMOS EEPROM Microcontroller" (pp. 1–64) copyright 1993 Microchip Technology Incorporated.

*Antenna Engineering Handbook 2nd Ed.*, pp. 14–4 thru 14–19, publication date unknown.

"Zero Bias Silicon Schotcky Barrier Detector Diodes," *M/A–Com Semiconductor Products Operation*, pp. 2–55 thru 2–58.

"Zero Bias Detector Diodes," *M/A–Com Semiconductor Products Operation*, pp. 6–93 thru 6–99, publication date known.

Brochure entitled "Pet Alert™ Dog and Cat Containment System" by Future–Tech, Inc., Columbus, Ohio, publication date unknown.

Brochure entitled "Freedom Fence™ for Dogs" by Freedom Fence™ Inc., North Adams, MA, publication date unknown.

Training Manual; Dog Guard for the Life of Your Dog, publication date unknown.

Installation Manual; Dog Guard for the Life of Your Dog, publication date unknown.

Leaflet entitled "IF–Invisible Fencing"—The Invisible Fence Co., Cinti, OH, publication date unknown.

Leaflet entitled "Is Your Dog Important to You?", publication date unknown.

Advertisement for K–9 Hidden Fence, REACH® Magazine, "Reward–Some Dogs Will Stop At Nothing," Dogwatch, Inc., publication date unknown.

Brochure entitled "An Innovative Concept in Fencing," Pet Perimeters, Fenceless Boundary Systems, Hudson, Ohio, publication date unknown.

Borchure entitled "Everyday Reasons to Get Invisible Fencing®," copyright 1990.

Leaflet entitled "The Great Freedom Fence™ Raw Hamburger Test," publication date unknown.

Advertisement "Underground Pet Containment System," publication date unknown.

Brochure, SAW Delay Lines, ©1988, Sawtek Inc., dated Jan., 1988.

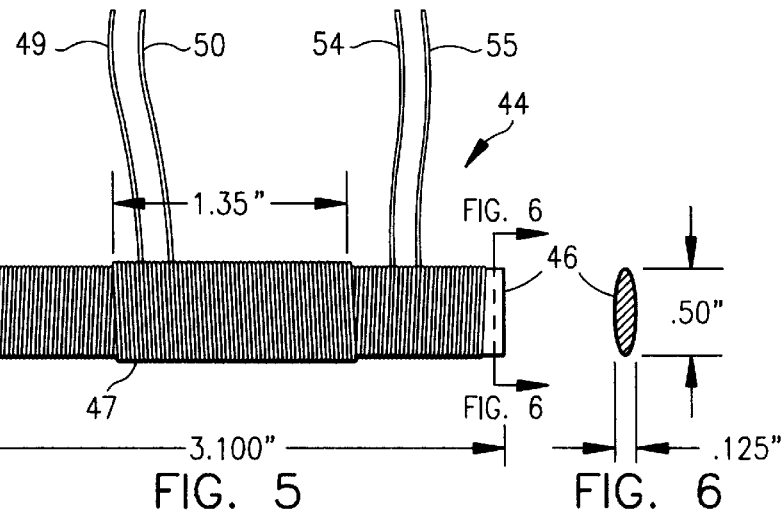
FIG. 5
FIG. 6
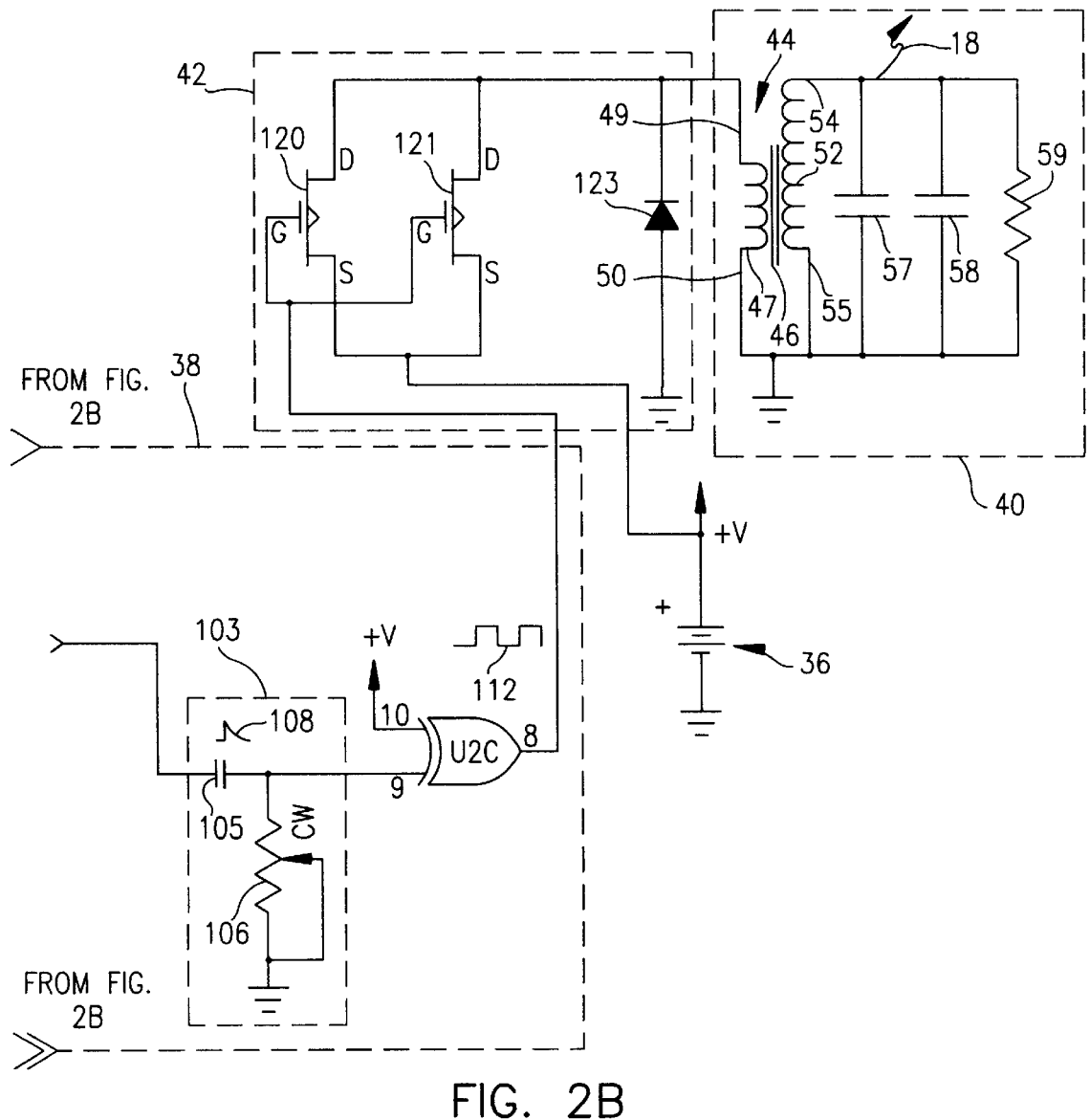
FIG. 2B

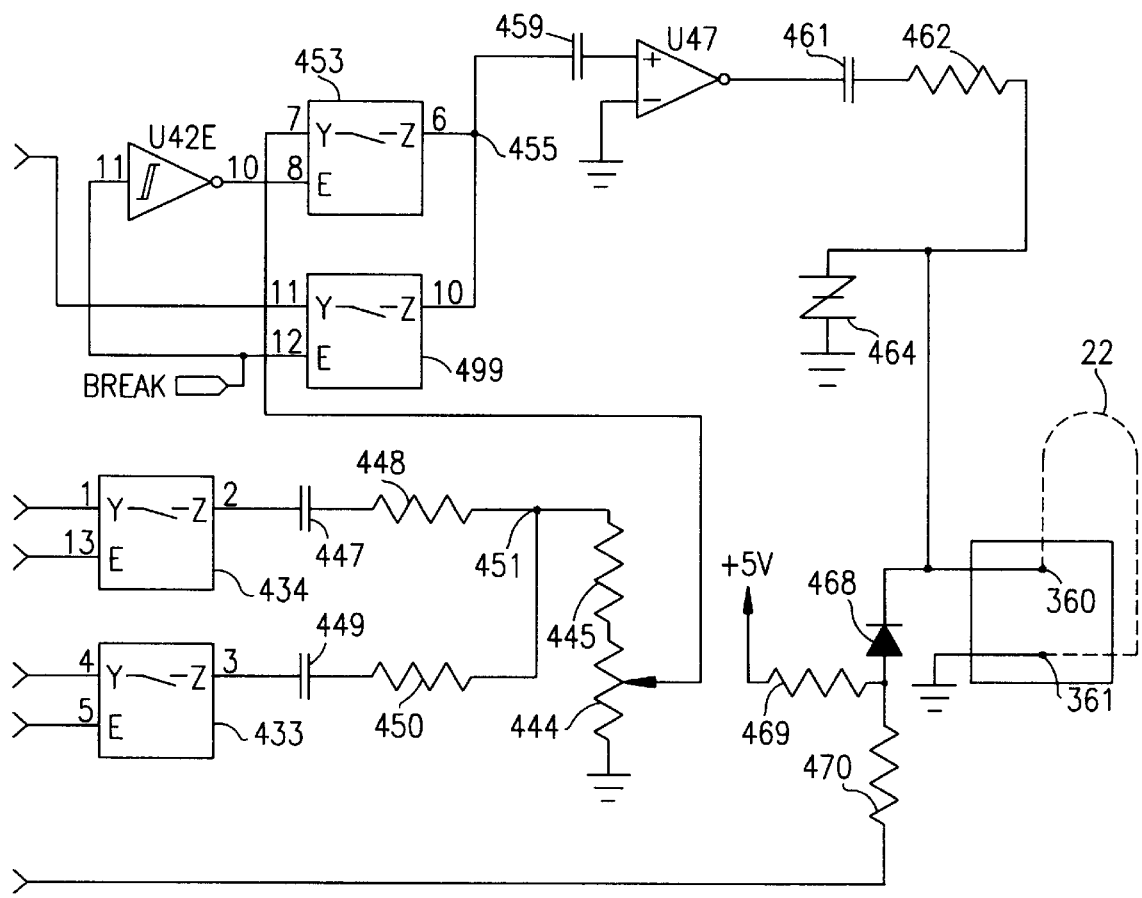
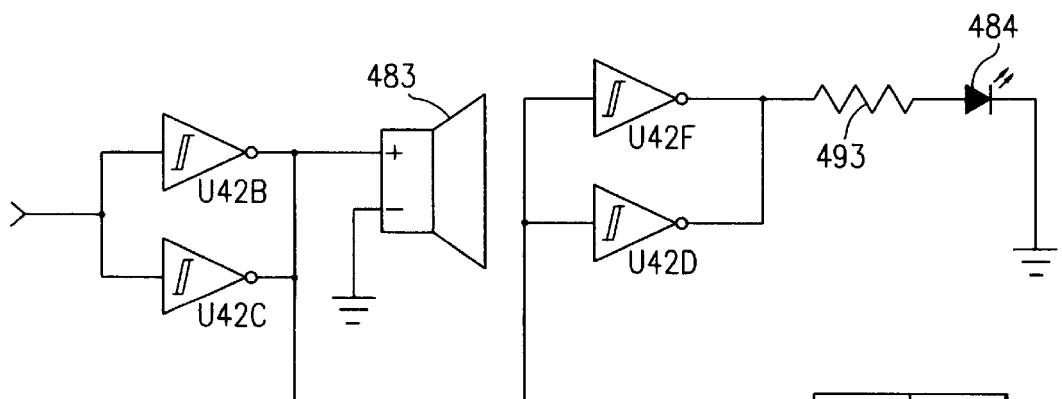
FIG. 11B
| FIG. 11A | FIG. 11B |
FIG. 11C

RF SIGNALING SYSTEM AND SYSTEM FOR CONTROLLING THE WHEREABOUTS OF ANIMALS USING SAME

CROSS REFERENCE TO RELATED APPLICATIONS

Priority under 35 U.S.C. § 119(e) is hereby claimed to commonly-assigned U.S. Provisional Application No. 60/029,464, filed Oct. 25, 1996, and entitled "Low Power, Low Frequency Control of Animal Whereabouts" which is expressly incorporated herein by reference in its entirety to form part of the present disclosure.

Priority under 35 U.S.C. § 119(e) is also hereby claimed to commonly-assigned U.S. Provisional Application No. 60/060,370, filed Sep. 29, 1997 and entitled "Apparatus and Method for Transmitting an Encoded Signal Through a Metal Surface and Vending System Incorporating Same" which is expressly incorporated herein by reference in its entirety to form part of the present disclosure.

REFERENCE TO MICROFICHE APPENDIX

This disclosure includes a Microfiche Appendix containing computer program listings consisting in total of two (2) sheets of microfiche including one hundred thirteen (113) total frames which are expressly incorporated herein by reference in their entirety to form part of the present disclosure.

FIELD OF THE INVENTION

The invention relates to a novel RF signaling apparatus and method and to systems for controlling the whereabouts of pets or other animals by using radio frequency transmissions to establish boundaries for animals and by applying stimuli to the animals when they move into proximity of such a boundary to deter them from traversing it. More particularly, the present invention relates to RF animal whereabouts control systems which are highly efficient, consume little power, exhibit excellent immunity to noise and signal propagation anomalies, permit different animals in the same vicinity to be subjected to different confinement conditions and are readily adaptable for use with new or preexisting wire loop boundary installations.

BACKGROUND OF THE DISCLOSURE

Traditionally, the whereabouts of animals have been controlled by erecting physical barriers such as walls, fences or gates at the site of a boundary the animal is to be prevented from crossing. Such barriers must not only be high enough to prevent the animal from jumping over and dense enough to prevent the animal from passing through any gaps but also substantial enough to withstand attempts by the animal to breach the barrier by physical force. The latter requirement is a serious limitation in that in addition to requiring considerable time and labor to erect, substantial physical barriers are often impracticable due to shortage of materials suitable for their construction.

Those limitations have been overcome to some extent by the development of avoidance-inducing physical barriers, of which, barbed wire and high voltage charged fences are well-known examples. Rather than relying solely on physical strength to defeat attempted breaches, animals quickly learn that contact with such barriers is associated with an aversive stimulus such as being shocked or pricked by sharp barbs. They therefore avoid repeated or sustained attempts to breach them. Physical barriers of the avoidance-inducing type have permitted the fencing of large areas with the expenditure of only a fraction of the time, effort and materials which had previously been necessary. However, avoidance-inducing physical barriers also suffer from some important limitations.

First, like all physical barriers, posts and wires or other above-ground structures are required to erect an avoidance-inducing physical barrier. In some applications, such as the confinement of household pets or guard dogs within a property line, these structures can be unsightly and are sometimes forbidden by deed restrictions or local regulations. Like all physical barriers, avoidance-inducing physical barriers are non-selective. A physical barrier sufficient to control the whereabouts of a particular animal also tends to impede the ingress and egress of persons or other animals except at locations where a gate may be provided. Moreover, the animal can traverse the barrier if the gate is inadvertently left open. Electrified or barbed wire fences intended for controlling the whereabouts of animals can also shock or injure persons, especially young children.

Various electronic systems which do not require the erection of above-ground barrier structures and which are at least somewhat selective in their operation are also known. In these systems, selectivity is achieved by equipping only the animal (or animals) whose whereabouts are to be controlled with an electronic unit capable of sensing when the animal moves into predetermined proximity of a defined boundary and then delivering one or more aversive stimuli to deter the animal from traversing the boundary. Such stimuli commonly comprise an electric shock either alone or in combination with an advance audible tone. A number of types of such electronic systems are known in the prior art. In most widespread use today are those of the "wire loop" type.

Various wire loop systems for controlling the whereabouts of animals are exemplified by U.S. Pat. Nos. 3,753,421 to Peck; 4,136,338 to Antenore; 4,733,633 to Yarnall, Sr. et al.; 4,745,882 to Yarnall, Sr. et al.; 4,766,847 to Venczel et al. and 4,967,695 to Giunta. In such systems, one or more continuous wire loops are routed along an arbitrary path to define a boundary. In some cases the wires are run above ground, in others they are buried. A controller connected directly to the loop generates an amplitude modulated (AM) signal which flows through the loop and causes an AM radio signal to radiate from the loop at a predetermined carrier frequency which is typically in the range of about 8 KHz to about 20 KHz. These systems operate by simple on/off keying. When a battery-powered receiver unit affixed to the animal receives an AM signal at a magnitude indicating close physical proximity of the animal to the boundary loop, the receiver initiates a generation of a tone and/or shock to deter the animal from crossing the loop. When an AM signal of such magnitude is not present at the receiver, no stimuli are applied to the animal.

Many AM wire loop systems which operate in this manner have been installed and are in operation at the present time. In certain of these systems, the animal's approach to the wire, as indicated by a received signal strength above a predetermined threshold, initiates application of a first and relatively mild aversive stimulus (such as generation of a tone) which terminates if the animal retreats from the boundary. If on the other hand, the animal moves closer yet toward the loop, a higher threshold of signal strength is exceeded and a stronger aversive stimulus such as an electric shock is administered in order to repel the animal from the boundary as defined by the location of the wire.

The low RF frequency AM modulation used in prior art wire loop systems provides a number of advantages. Their low frequency AM radio signals propagate through soil well enough to provide acceptable signal range above ground. Low frequencies are also less likely to reflect from non-metallic obstructions which might otherwise create "shadows" or gaps in the boundary field. Another advantage of low frequency AM modulation is that if the wire loop is inadvertently cut or breaks, the localized electrical field emitted across the break enables one to easily locate the break using an ordinary AM radio receiver. However, the low frequency AM wire loop boundary systems of the prior art also suffer from a number of disadvantages and limitations.

For example, AM systems are highly susceptible to electrical interference from a variety of common sources including motor vehicles, motor operated appliances, light dimmers, and television sets. Such interference can cause an animal to be shocked even when it is not near the boundary. This undesired shocking is not only unnecessary and inhumane if persistent, but can also confuse the animal and interfere with its being trained to associated the aversive stimulus with the intended boundary. In order to provide an acceptable margin against reception of false signals due to interference, AM systems of the prior art require a large received field intensity. Hence, the loop must be made to radiate a commensurately intense field.

Because a wire loop does not act as an efficient AM antenna at the low frequencies at which AM wire loop systems operate, a relatively large current, typically about two hundred (200) to about eight hundred (800) milliamps, must flow through the loop to generate a suitable boundary field. This not only consumes excessive power, making the system more expensive to operate but also precludes the possibility of powering the controller driving the loop using primary or backup batteries of reasonable size and cost. As a result, the controller must be mounted at a location, usually indoors, near an A.C. power outlet and an A.C. power outage renders the entire system inoperable. When this occurs, the entire boundary is breached not merely a localized portion of it making it much more likely that the animal will locate and exploit the breach. Also, since the closest point on the desired boundary may be some distance away from an available A.C. outlet, installation of wire loop systems is made more difficult, time consuming and expensive. The relatively large current flowing through the loop also creates a commensurately large low frequency electrical field. Some have suggested that such fields may pose health risks to humans or animals.

Installing the wire loop represents a substantial portion of the cost of a wire loop system. As noted above, a continuous length of wire must be run from the controller, around the desired boundary and back to the controller which is usually located at an indoor location remote from any point on the desired boundary. The wire must be installed around or through any intervening walls or other obstacles. Even with special equipment built for the purpose, it is not a trivial task to bury a wire loop encompassing the perimeter of a large property. Installation is further complicated by the necessity of twisting the loop wires together wherever they must pass through locations where no boundary field is desired. Since the currents in any twisted portions of the wires flow in opposing directions, their fields cancel sufficiently that the unit affixed to the animal does not initiate application of an aversive stimulus even when the animal is nearby. Thus, by twisting portions of the loop together, a boundary located remotely from the controller and/or one having two or more distinct portions lying physically separated from one another can be formed using a single loop of wire connected to a single controller.

Remote broadcast systems are another class of electronic system known in the prior art for controlling the whereabouts of animals. These do not require installing a loop of wire to define a boundary. Instead, a boundary is established by broadcasting an RF signal from a central location toward an intended outer perimeter boundary. The location of the boundary is defined based on the strength of that broadcast signal as sensed by a unit affixed to the animal. For example, U.S. Pat. No. 5,067,441 to Weinstein describes an animal restraining system including a radio frequency transmitter, a transmitting antenna located inside an area in which the animal is to be restrained and a collar unit worn by the animal. A coaxial cable is run between the transmitter unit and the transmitting antenna. When the animal strays from the transmitting antenna a distance sufficient to permit the signal strength received by the collar unit to fall below a predetermined level, a first aversive of stimulus, such as a beeping tone, is generated. If the animal strays further from the antenna by a distance sufficient to cause the signal strength to fall below a second predetermined threshold, a stronger stimulus such as a shock is administered to the animal to deter its departure from the area. A similar system is described in U.S. Pat. No. 4,898,120 to Brose.

A fundamental shortcoming of remote broadcast type systems for controlling animal whereabouts is that the collar unit worn by the animal does not detect proximity of the animal to a structure or object whose physical location reliably indicates the location of the intended boundary. Instead, such systems rely on measuring signal strength as an indicator of the distance the animal from a transmitting antenna which may be located a considerable distance from the boundary. Consequently, that indication is not always reliable. One reason is that because such systems operate in a far-field regime, the magnitude of the field decreases only in proportion to the square of distance from the transmitting antenna and does not vary significantly over distances on the order of several feet. Another reason is that the strength of the received signal can change due to constructive and destructive interference generated by signal reflections, shadowing by metallic objects and other uncontrollable variations in local reception conditions. Since local reception conditions can fluctuate, the size, shape and location of the boundary loci at which stimuli will be administered can also fluctuate. For example, if the signal path between the transmitting antenna is temporarily altered by an automobile which pulls into one's driveway, the animal may receive a shock even if the animal remains within an intended perimeter boundary. Remote broadcast systems also tend to require significant amounts of electrical power and thus, like wire loop systems, do not lend themselves to battery operation. This disadvantage stems in part from the need to broadcast a sufficiently strong signal to the most remote portion of the boundary and renders these systems, like AM loop systems, vulnerable to A.C. power failures.

Remote broadcast systems are also limited with respect to the sizes and shapes of perimeter boundaries they can define. While generally circular boundaries or ones conforming to the radiation pattern of a particular antenna can be implemented, continuous perimeter boundaries encompassing jutting regions or other well defined irregularities would be extremely difficult, if not impossible to establish using a remote broadcast type system. Another limitation of such systems is that because signal strength values are not unique to individual locations within the field of the transmitter, they are not well suited for excluding an animal only from arbitrarily located discrete positions, such as the site of one's prized rose bush for example. While wire loop systems offer greater flexibility and predictability of boundary shape, they are subject to the problems and limitations described above.

Another significant limitation of both the wire loop systems and the remote broadcast systems described above is that they are only capable of defining boundaries whose positions remained essentially fixed. Prior art U.S. Pat. No. 5,241,923 to Janning described for the first time an animal whereabouts control system which, while suitable for defining discrete and/or continuous fixed boundaries, was also capable of defining boundaries which moved with a mobile agent such as a child or another animal so that a particular animal such as a dog could be kept separated from child or other animal while otherwise allowing both dog and child complete freedom of movement. The systems described in Janning '923 operated at relatively high frequencies such as 915 Mhz where high antenna efficiencies could be obtained so as to reduce power requirements sufficiently to permit the system to operate on battery power. In such a system, individual active or passive high frequency transponders could be placed singly to exclude the animal from a specific location or arranged in mutually spaced arrays to form closed or partially closed continuous perimeter boundaries of virtually any desired size and shape. The transponders could be encapsulated for burial in the earth outdoors or packaged for placement beneath carpets, furniture cushions or area rugs or near entrances to rooms from which an animal was to be excluded.

Being of small size, light weight, and completely self-contained, the transponders disclosed in Janning '923 required no external wiring. Those transponders could also be provided with adhesive backing or with clips, pins or other attachment devices for securing them at a desired fixed location or to a mobile agent such as a child, an automobile or another animal which one might desire keeping separated from a particular animal. Using a collar or other suitable means of attachment, there could be affixed to the latter-mentioned animal a battery powered unit incorporating a receiver coupled to a stimulator for delivering a tone and/or a shock to the animal being controlled. Mounted either remotely or within the battery powered unit affixed to the controlled animal was a transmitter which generated an incident signal in the form of intermittent bursts of continuous wave (CW) energy at 915 MHz. Upon receiving this incident signal, the transponders would generate a return signal. When the distance separating the animal from one of the transponders became sufficiently close, the return signal would be picked up by the receiver affixed to the animal and cause the stimulator to deliver an appropriate aversive stimulus. Optionally, one or more of the transponders could be provided with a delay line or surface acoustical wave device which could be used to encode the return signal so as to identify to the receiver the particular transponder from which the return signal is emanated so as to enable different animals to be subjected to different boundary constraints by a single system.

While representing a major breakthrough in the art due to their unprecedented flexibility, effective performance and simple, low-cost installation, systems for controlling animal whereabouts using transponders as disclosed in Janning '923 were subject to limitations. In particular, placement of transponders at certain locations, such as those adjacent or wholly or partially surrounded by metallic surfaces, sometimes resulted in blocked reflected or otherwise anomalous signal propagation manifested in undesired variations in distance sensitivity (i.e., boundary range) or the complete inability to establish an effective boundary at such locations.

Like all other known prior art systems (except for wire loop systems themselves), the systems described in Janning '923 also lacked the ability to function with a wire loop boundary. Accordingly, they could not be used to replace or upgrade existing AM wire loop systems of which, despite the disadvantages noted above, large numbers have been and continue to be installed in the field.

SUMMARY OF THE INVENTION

In view of the foregoing problems and limitations of the prior art, it is an object of the present invention to provide an RF signaling system capable of generating and broadcasting an RF signal with high energy efficiency.

It is another object of the invention to provide an RF signaling system which provides a high degree of immunity from noise and reception of false signals.

It is yet another object of the invention to provide a system for controlling the whereabouts of animals utilizing the RF signaling system of the invention to provide highly efficient operation affording long battery life.

A further object of the invention is to provide a system for controlling the whereabouts of animals in which the RF signaling system of the invention is adapted to provide extremely reliable data communications, even in the vicinity of metallic surfaces, with high immunity from noise and reception of false signals.

Another object of the invention is to provide a system for controlling the whereabouts of animals utilizing the efficient RF signaling system of the invention operating in a near-field regime to establish stable and distinct electronic boundaries which are unobtrusive, do not require the erection of physical barriers or other extensive installation, which may either be discrete or continuous in form and which may either be fixed or movable in location.

A further object of the invention is to provide a system for controlling the whereabouts of animals which fulfills the foregoing objectives while being additionally capable of being used to establish a wire loop boundary in either new or preexisting wire loop installations and thus be capable of retrofitting, upgrading and/or expanding a wire loop boundary system easily and at low cost.

A further object of the invention is to provide a system for controlling the whereabouts of animals which is highly energy efficient permitting the entire system, including any wire loop boundary portions thereof, to operate for sustained periods entirely from battery power and thus remain fully effective in the event of an A.C. power outage.

A further object of the invention is to provide a system for controlling the whereabouts of animals which fulfills the foregoing objectives while facilitating location of the site of any break in a wire loop boundary using a conventional AM radio.

The invention provides an RF signaling system which operates with extremely high energy efficiency. In accordance with one important aspect of the invention, this is achieved by providing a transmitter with a resonant circuit, such as a tank circuit, which includes an antenna and which is tuned to resonate at a desired RF carrier frequency and by delivering to the antenna circuit a train of brief pulses of electrical energy repeated substantially at the aforementioned RF frequency. Upon delivery of each pulse, the antenna is caused to resonantly ring, thereby radiating energy in the form of an RF signal at the desired RF carrier frequency. The duration of each driving pulse is preferably as brief as possible to minimize damping of the antenna and thus, facilitate maximum radiation of RF energy. The duty cycle of the pulse train is ideally as small as possible while still providing pulses containing sufficient energy to deliver at the RMS RF power level required by a particular application. This duty cycle is preferably less than about five percent (5%) and is most preferably less than about one percent (1%). Where higher levels of transmitted power are required, the duty cycle of the pulse train may be increased at the expenses of some efficiency but should not exceed about fifteen percent (15%).

The invention is to be contrasted with prior art RF drive circuits would typically drive the output tank or antenna with an approximately 50% duty cycle (square wave). In such a case the output transistors of the drive circuit would be in conduction 50% of the time. If sinusoidal excitation were used, the output transistors could be in conduction up to 100% of the time. During such time, the output transistors would be loading the output tank with their output impedance, which could be quite low. In contrast, the present invention drives the output tank with very short pulses of current. The remainder of the time, the circuit is free to "ring" at its resonant frequency. This operation is analogous to striking a tuning fork or church bell with a clapper to make it "ring". If the clapper were held against the bell for a large percentage of the time, most of the acoustical energy would be dissipated by the clapper. Instead, a single impulse hit by the clapper is the most efficient way to generate the most sound with the least amount of input energy. Likewise in the present invention the "clapper" (current pulse) is of very short duration in order to increase the efficiency of radiated energy and greatly reduce the amount of energy dissipated by the drive transistors.

According to another important aspect of the invention, loading of the resonant circuit by the drive circuit which would otherwise damp the resonant ringing of the antenna and thereby decrease the energy efficiency of the system is substantially avoided by isolating the antenna circuit from the drive circuit during at least a portion, and preferably substantially the entirety, of the intervals between the driving pulses. This is achieved by providing an isolation circuit which is operably interposed between the drive circuit and the resonant circuit.

In the preferred embodiment, the isolation circuit is implemented using a pair of field effect transistors (FETs) connected mutually in parallel with one another between the drive circuit and the resonant circuit which includes the transmitting antenna. These FETs are selected to exhibit extremely low impedance when in conduction and thus facilitate delivery of high-current drive pulses to the resonant circuit with little forward loss. During the intervals between drive pulses however, both FETs are in a cutoff state in which they exhibit a nearly infinite output impedance. This serves to effectively decouple the resonating antenna from the drive circuit, thus electrically isolating the resonant circuit from any loading influence of the drive circuit.

The efficiency achieved by use of these aspects of the invention can be illustrated by considering for example an RF signal to be transmitted at ten kilohertz (10 KHz). A tank circuit including the antenna of the transmitter is tuned to resonate at 10 KHz. One microsecond high energy pulses are fed to the antenna at the desired RF frequency (i.e., a 10 KHz rate) from a drive circuit by way of an isolation circuit which exhibits a high output impedance during the intervals between pulses. Under such conditions, it can be appreciated that the circuitry driving the antenna draws current only 1% of the time (a 1% duty cycle). In contrast, a typical prior art system such as an AM system broadcasting at the same frequency with 100 Hz square wave modulation would draw current 50% of the time. The invention thus provides a comparative 50:1 reduction in drain on the battery or other power source supplying the transmitter thereby significantly increasing the ratio of radiated RF power to D.C. power consumed by the system. Because the drive circuit is effectively coupled to the antenna only during the brief intervals during which the drive pulses occur and is effectively decoupled therefrom during the overwhelmingly major portion of the cycle, the drive circuit loads the resonant circuit only for a correspondingly brief portion of the cycle. Thus, the invention not only draws less power but also permits the transmitting antenna to ring without being subjected to significant damping due to loading effects of the drive circuit in order to maximize the efficiency of the conversion of D.C. power to radiated RF power.

Other important aspects of the invention relate to systems for controlling the whereabouts of animals. In a preferred embodiment, the efficient RF signaling system of the invention is employed in a system using one or a plurality of small, battery-powered transmitters to transmit an RF signal establishing a boundary in the vicinity of the transmitter. A unit affixed to the animal includes a receiver capable of detecting the RF signal. Upon determining, based on information derived from the RF signal, that at least one predetermined condition indicating encroachment of the boundary has been satisfied, the unit delivers at least one aversive stimulus to the animal to deter such encroachment. These transmitters preferably utilize the RF signaling system of the invention to provide extremely long operating life using a small, low cost battery.

As applied to such a system, the invention achieves even further improvements in energy efficiency by recognizing that an electronic boundary need not be present continuously without interruption in order to remain fully effective. According to this aspect of the invention, the RF signal establishing a boundary for the animal is interrupted by inactive intervals during which very little energy is consumed by the transmitter. In the preferred embodiment, the inactive intervals are in the range of about thirty to about one hundred milliseconds. However, for certain applications, particularly those involving indoor boundaries, much longer intervals, up to about five (5) seconds or longer can be used.

According to another important aspect of the invention, the transmitters operate in a near-field regime transmitting an RF signal whose magnetic field component is not only much larger than its electrical field component, but which also exhibits a magnetic field whose magnitude decreases substantially in proportion to the cube of increasing distance from the transmitter. To do so, the transmitters operate at a low frequency, preferably about ten kilohertz (10 KHz) or less and most preferably about eight point one nine kilohertz (8.19 KHz), and include a transmitting antenna which is electrically small (i.e. of a size to fit inside a radiansphere). Because the magnitude of the detectable boundary field established by such an RF signal decreases so rapidly as distance from the transmitter increases, the boundary field is not only well localized, but is also sharply defined and therefore, positionally distinct. Moreover, because the field is predominantly magnetic in character and is established at such a low frequency, it is highly immune to blockage, reflections and distortion due to the presence of nearby metallic objects. These characteristics afford establishment of an electronic boundary capable of being detected positively, reliably and repeatably at a substantially unique locus of points in the vicinity of the transmitter. To even further enhance reliable detection of the RF signal, such as one defining an electronic boundary, a further aspect of the invention contemplates use of a modulation scheme in which the amplitude of the RF signal is bounded by an imaginary envelope of substantially constant magnitude at all times when the RF signal is actively transmitted.

Yet another object of the invention is to provide a system for controlling the whereabouts of animals in which a unit affixable to an animal is capable of administering an aversive stimulus in response to encroachment of a boundary established by RF signals emanating either from a wire loop or from one or more small, battery powered transmitters of the type referred to above. This is achieved by providing, in addition to such transmitters, a wire loop unit connectable to a wire loop whose path traverses the midst of a desired wire loop boundary. The wire loop unit excites the wire loop with radio frequency electrical energy and causes the wire loop to emit a constant envelope RF signal which the unit affixed to the animal can detect and respond to in the same manner as an RF signal emitted by any of the transmitters.

Since the RF signal which the wire loop unit generates and applies to a wire loop to establish a wire loop boundary is not an amplitude modulated (AM) signal, it cannot be used to locate the site of a break in the wire loop. Accordingly, the wire loop unit includes circuitry which continuously monitors the continuity of the wire loop. In the event a break in the wire loop is detected, an audible and visible indication of the break is provided. At the same time, the wire loop unit decouples from the wire loop the RF signal which establishes the boundary and couples the wire loop to a source of amplitude modulated (AM) radio frequency electrical energy which enables one to locate the site of the break for repair purposes using a conventional AM radio receiver.

Another object of the invention is to provide a system for controlling the whereabouts of animals in which the RF signals referred to above are encoded such that the unit affixed to the animal can discriminate the boundary established by a wire loop from one established by any of the transmitters and/or can discriminate between the boundaries established by different ones of the transmitters. This enables different animals to be subjected to different boundary constraints and permits the form, intensity and/or other parameters associated with the stimulation delivered by the unit can be selected in accordance with the location of the particular boundary encroached upon by the animal.

According to the preferred embodiment, this is achieved by encoding the RF signals emanating from the wire loop as well as those emanating from each of the transmitters with an assignable digital code. The unit affixed to each animal to be controlled is programmed to determine whether or not to apply aversive stimulation when an RF signal is received from either the wire loop or one of the transmitters based on the particular digital code associated with that RF signal. By programming different ones of such units to respond to different Boolean combinations of these digital codes, different animals, even ones in the same general physical area, can be simultaneously subjected to different boundary constraints. The nature of the stimulation applied in response to reception of a particular digital code by a particular unit affixed to an animal can also be preprogrammed.

These and other objects and advantages of the invention will become apparent to the person of ordinary skill in the art upon review of the following detailed description of a preferred embodiment taken in conjunction with the appended drawings in which like reference numerals designate like items.

BRIEF DESCRIPTION OF THE DRAWINGS

FIG. 2B is a continuation of the circuit schematic of FIG. 2A.

FIG. 5 is a top plan view of the antenna of the transmitter circuit of FIG. 2A and FIG. 2B.

FIG. 6 is a cross-sectional view through the core of the antenna of FIG. 5 as viewed from line 6—6 of FIG. 5.

FIG. 11B is a continuation of the circuit schematic of FIG. 11A.

FIG. 11C is a diagram illustrating the aligning relationship of FIG. 11A and FIG. 11B.

DETAILED DESCRIPTION OF A PREFERRED EMBODIMENT

Figure 1:
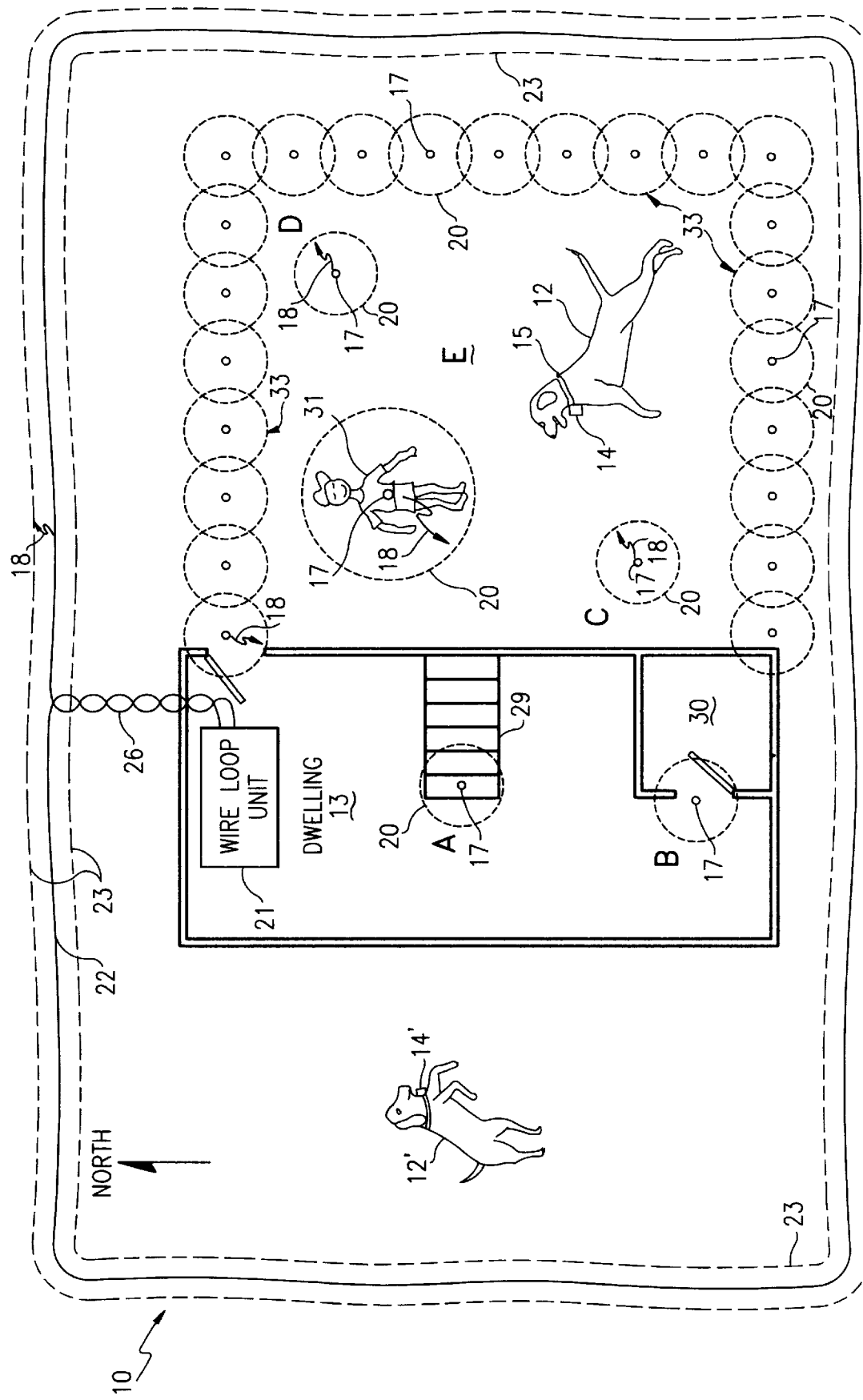
FIG. 1 is a schematic diagram illustrating a preferred embodiment of a system for controlling the whereabouts of animals in accordance with the present invention in a typical installation.

Referring to FIG. 1, there is illustrated an installed system 10 for controlling the whereabouts of an animal 12 according to the principles of the present invention in the vicinity of a dwelling 13 and surrounding areas. System 10 includes at least one receiver/stimulator unit 14 which may be mounted on a collar 15 or other suitable means of removably affixing unit 14 to animal 12. System 10 further includes one or more small, lightweight battery powered transmitters 17. Each transmitter 17 intermittently emits a digitally encoded, low frequency RF signal 18 capable of being received by receiver/stimulator unit 14 in order to establish an electronic boundary 20 which generally surrounds each transmitter 17. Transmitters 17 are preferably packaged inside a sealed case of plastic or other suitable material and/or are potted to permit them to be used outdoors, either above ground or buried, as well as indoors. Transmitters 17 can be packaged and positioned in the same manner as taught with respect to the transponders described in commonly owned prior art U.S. Pat. No. 5,241,923 to Janning, which is expressly incorporated herein by reference in its entirety to form part of the present disclosure.

According to the invention, system 10 also includes an optional wire loop unit 21 capable of being connected to a newly installed or preexisting wire loop 22. Wire loop 22 acts as an antenna which emits a digitally encoded, low frequency, RF signal 18 generated by wire loop unit 21 for the purpose of establishing an electronic wire loop boundary 23 which generally surrounds wire loop 22. While wire loop 22 is typically buried a few inches beneath the soil in order to provide for its concealment and mechanical protection, all or portions of it may be installed above ground, either indoors or outdoors, to establish one or more wire loop boundaries 23 of arbitrary size and shape in a desired location. Wire loop 22 may be twisted in the manner illustrated at area 26 in order to cancel the emitted field and thereby provide for desired discontinuities in wire loop boundary 23.

Animal 12 may roam freely unless and until it moves into sufficiently close proximity of either wire loop 22 or any of transmitters 17 as to enable receiver/stimulator unit 14 to detect the digital code associated with RF signal 18. When this occurs, unit 14 determines whether one or more predetermined conditions associated with that code is satisfied. If no such condition is satisfied, unit 14 does not provide any form of stimulation and animal 12 remains free to roam about without being influenced by system 10. If such a predetermined condition is satisfied however, unit 14 responds by administering one or more aversive stimuli to animal 12 to deter it from traversing the boundary 23 or 20 which has been approached.

System 10 affords a high degree of flexibility in establishing effective boundaries of virtually any size, shape or location. Although capable of defining boundaries indoors and/or in relatively small areas, the use of a wire loop unit 21 in combination with a wire loop 22 is particularly well suited to the establishment of large outdoor boundaries such as one paralleling the perimeter of a property. By providing twisted areas such as the one illustrated in FIG. 1 at area 26, a wire loop boundary 23 located a considerable distance from wire loop unit 21 and/or one defining two or more distinct boundary areas physically separated from one another can readily be provided using a single wire loop unit 21 connected to a single wire loop 22. Among other important distinctions over the prior art, the invention is novel in that the same receiver/stimulator unit 14 used to control the whereabouts of an animal 12 using a wire loop 22 can also be made responsive to the electronic boundaries 20 established by one or more discrete transmitters 17. The ability to establish boundaries using discrete transmitters 17 alone or in combination with a new or preexisting wire loop 22 affords system 10 unprecedented flexibility permitting system 10 to replace, upgrade or expand prior art AM wire loop boundary systems at low cost and with minimal installation.

As FIG. 1 illustrates, transmitters 17 can be positioned at desired locations within a dwelling 13 or other structure so as to exclude animal 12 from specific locations therein, such as depicted at areas A and B which correspond, respectively, to the foot of a stairway 29 and the entrance of a room 30. Other areas or items such as a rug or a piece of furniture may be similarly protected if desired. In addition or in the alternative, one or more transmitters 17 can be positioned to establish boundaries 20 at discrete fixed outdoor locations, such as the locations C and D indicated in FIG. 1. Such outdoor locations may correspond for example to a garden or outdoor dining area. Transmitters 17 can also be affixed to a mobile agent such as an automobile, another animal or a child 31 which animal 12 is to be deterred from approaching. By placing a plurality of transmitters 17 in an open or closed array, such that at least a portion of the boundaries 17 associated with adjacent transmitters 17 at least partially overlap one another, continuous open or closed linear boundaries of virtually any desired shape and size, such as the linear boundary 33 illustrated in FIG. 1 can also readily be formed for purposes of confining animal 12 within an area E such as a portion of a backyard. Animal 12 may thus roam freely within backyard area E inside of boundary 33 except for any locations where its passage may be forbidden by any boundaries 20 such as those established by the transmitters 17 present at locations C and D of FIG. 1., or those attached to a child 31.

System 10 affords further flexibility in that receiver/stimulator unit 14 can be configured in the field to select a type and intensity of stimulation most appropriate for a given animal 12. The preferred embodiment for example can be configured to administer either an audible tone only or an audible tone in combination with either a less intense or more intense, yet harmless, electrical shock. For example, the receiver/stimulator unit 14 worn by animal 12, which might be a large, aggressive animal, can be configured to administer a tone and a more intense electrical shock. System 10 can also include more than one receiver/stimulator unit 14 in order to control the whereabouts of a plurality of animals simultaneously. As FIG. 1 illustrates, a second animal 12' can be equipped with a second receiver/stimulator unit 14' configured to administer only an audible tone or whichever of the other available types of aversive stimulation may be most appropriate considering the size and temperament of animal 12'.

System 10 also affords flexibility in that it permits different animals to be subjected to correspondingly different boundary constraints. Different boundary constraints can be imposed not only to confine different animals to or exclude different animals from mutually separated areas but also to control the whereabouts of animals in physical areas which partially or entirely overlap. This is achieved by assigning each transmitter 17, as well as optional wire loop unit 21, with an identifiable code. This code is transmitted by way of RF signal 18 and used to determine the administration of aversive stimulation according to Boolean criteria applied by each particular receiver/stimulator unit 14 or 14'.

By way of example, the system 10 of FIG. 1 can be configured to confine animal 12 to area E, excluding it entirely from the interior of dwelling 13 as well as from child 31 and outdoor locations C and D. At the same time, second animal 12' may be permitted contact with child 31 and allowed to roam freely anywhere within wire loop boundary 23 with the exceptions of room 30 and the second floor of dwelling 13. This can be achieved in several different ways including by identifying the RF signals 18 emanating from wire loop unit 21 as well as those emitted by the transmitters 17 located at the foot of stairway 28 and the entrance of room 30 with an identical first code. The receiver/stimulator unit 14' affixed to second animal 12' is programmed to respond to that first code upon detection of same by administering an appropriate aversive stimulus to animal 12' without responding to an RF signal 18 representing any other code. At the same time, all the other transmitters 17 of system 10, including those on boundary 33, those at locations C and D and the one affixed to child E, emit an RF signal 18 encoded with a second code which is different from the first code. The above-described boundary constraints could then be achieved simply by programming the receiver/stimulator unit 14 worn by animal 12 to stimulate animal 12 only in the event the second code is detected. Preferably, however, unit 14 would also be programmed to likewise respond to detection of the first code. This would ensure that animal 12 would at least be confined within perimeter boundary 23 and would be excluded from room 30 as well as the second floor of dwelling 13 if animal 12 somehow escaped backyard area E. Under normal circumstances however, the transmitter 17 located at the northeast entrance of dwelling 13 and those forming linear boundary 33 would operate to exclude animal 12 from dwelling 13 entirely.

An important aspect of the present invention relates to a novel and improved radio frequency (RF) signaling apparatus and method which are incorporated in system 10 to establish highly energy efficient and reliable remote communication between transmitters 17 and receiver/stimulator unit 14 and/or 14'. While described herein as applied to system 10, those skilled in the art will appreciate that these aspects of the invention can be applied to great advantage in a wide variety of applications in addition to controlling the whereabouts of animals. Moreover, while disclosed herein as utilizing a particular form of constant envelope modulation known as binary phase shift keying (BPSK), those skilled in the art will readily appreciate that the invention can readily be implemented in forms utilizing other modulation schemes including without limitation other constant envelope modulation schemes such as pulse width modulation (PWM), minimum shift keying (MSK), and other forms of phase shift keying (PSK).

As noted above, each transmitter 17 intermittently transmits a digitally encoded RF signal 18 at a desired carrier frequency. In the preferred embodiment, RF signal 18 is preferably transmitted in a near-field regime using an antenna which is electrically small and transmitting at a low RF carrier frequency, preferably one of about 10 KHz or less, such as 8.19 KHz. This provides a number of important advantages. The field associated with an RF signal of such a low frequency in a near-field regime is predominantly magnetic rather than electric in nature and exhibits a magnetic field whose magnitude decreases in proportion to cube of distance ($r^3$) rather than the square ($r^2$) of distance from its source. This facilitates the establishment of electronic boundaries 20 which are both localized and positionally well-defined. The use of such a low RF frequency has also been found to afford high immunity to signal blockage, reflection and/or other signal propagation anomalies in areas adjacent to wholly or partially surrounded by metallic surfaces.

Figure 2A:
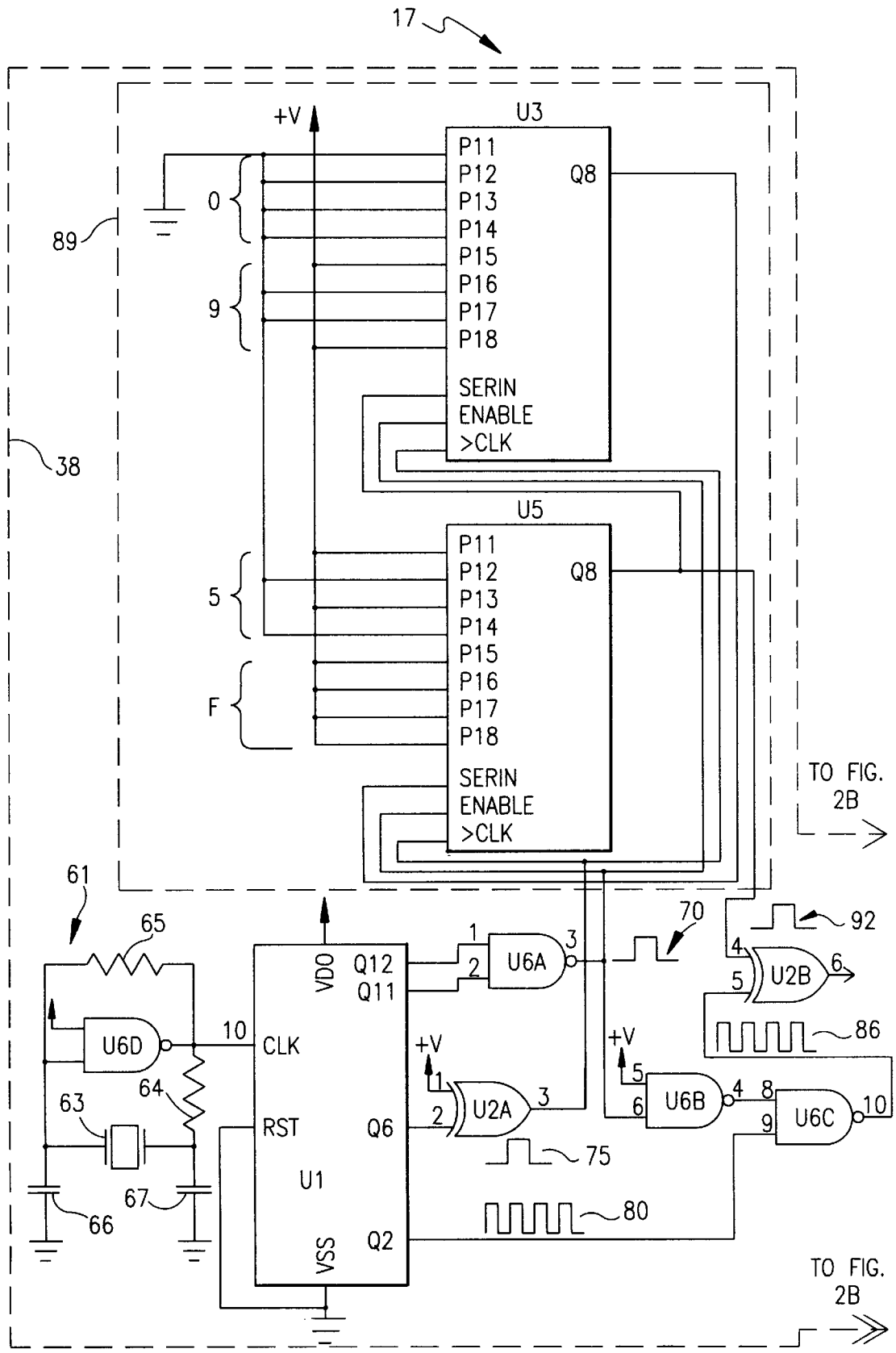
FIG. 2A is a circuit schematic illustrating the electronic circuit of each of the transmitters shown in FIG. 1.

Referring to the circuit schematic of FIG. 2A and FIG. 2B, the structure and operation of a typical transmitter 17 will now be described. Transmitter 17 generates and transmits a digitally encoded RF signal 18 at an RF carrier frequency of 8.19 KHz with power derived solely from a small, long life lithium battery 36. Each transmitter 17 includes a drive circuit 38, a resonant circuit 40 and an isolation circuit 42 interposed between the drive circuit 38 and the resonant circuit 40. Resonant circuit 40 includes a transmitting antenna 44 and preferably takes the form of a tank circuit tuned to resonate at the RF carrier frequency. Antenna 44 includes a ferrite core 46 upon which is wound both a primary winding 47, terminating in a pair of leads 49 and 50, and a secondary winding 52, terminating in a pair of leads 54 and 55. Resonant circuit 40 consists further of a pair of capacitors 57 and 58 and a resistor 59, all connected mutually in parallel across secondary winding 52. For best efficiency, antenna 44 should have the highest possible quality factor, Q, and the overall Q factor of resonant circuit 40 is reduced as necessary by the loading effects of resistor 59 whose resistance is selected to provide a Q factor yielding the minimum bandwidth necessary to accommodate the data transfer rate required by a particular application. In the preferred embodiment, resonant circuit 40 has an overall quality factor of about forty three (Q=43).

Drive circuit 38 includes an oscillator circuit 61 which serves as a master clock. Oscillator circuit 61 includes a NAND gate, U6D, connected to a crystal 63 by way of resistors 64 and 65 and capacitors 66 and 67 as shown. Oscillator circuit 61 generates a 32.768 KHz master clock signal which is applied to the clock (CLK) input of a twelve stage ripple counter, U1. Ripple counter U1 serves as a frequency divider operable to generate several properly timed signals required by driver circuit 38.

Outputs Q11 and Q12 of ripple counter U1 are connected to respective inputs of a NAND gate U6A to provide, at output pin 3 thereof, a duty cycle control signal 70. According to an important aspect of the invention, inactive intervals are interposed between at least some and preferably each of the successive transmissions of RF signal 18. In the preferred embodiment, both the duration of each transmission of RF signal 18 and length of the inactive intervals between the intermittent transmissions of RF signal 18 are determined by duty cycle control signal 70. To minimize the drain on battery 36 and thus provide transmitters 17 with long operating life, duty cycle control signal 70 is timed to provide the shortest duration of individual transmissions of RF signal 18 and to maximize the inactive intervals between successive transmissions. In the preferred embodiment, duty cycle control signal 70 also serves to deactivate as much of the circuitry of transmitter 17 as possible during the inactive intervals between successive transmissions of RF signal 18 thereby enhancing the efficiency at which transmitter 17 converts D.C. power from battery 36 to useful radiated RF energy.

Figure 3:
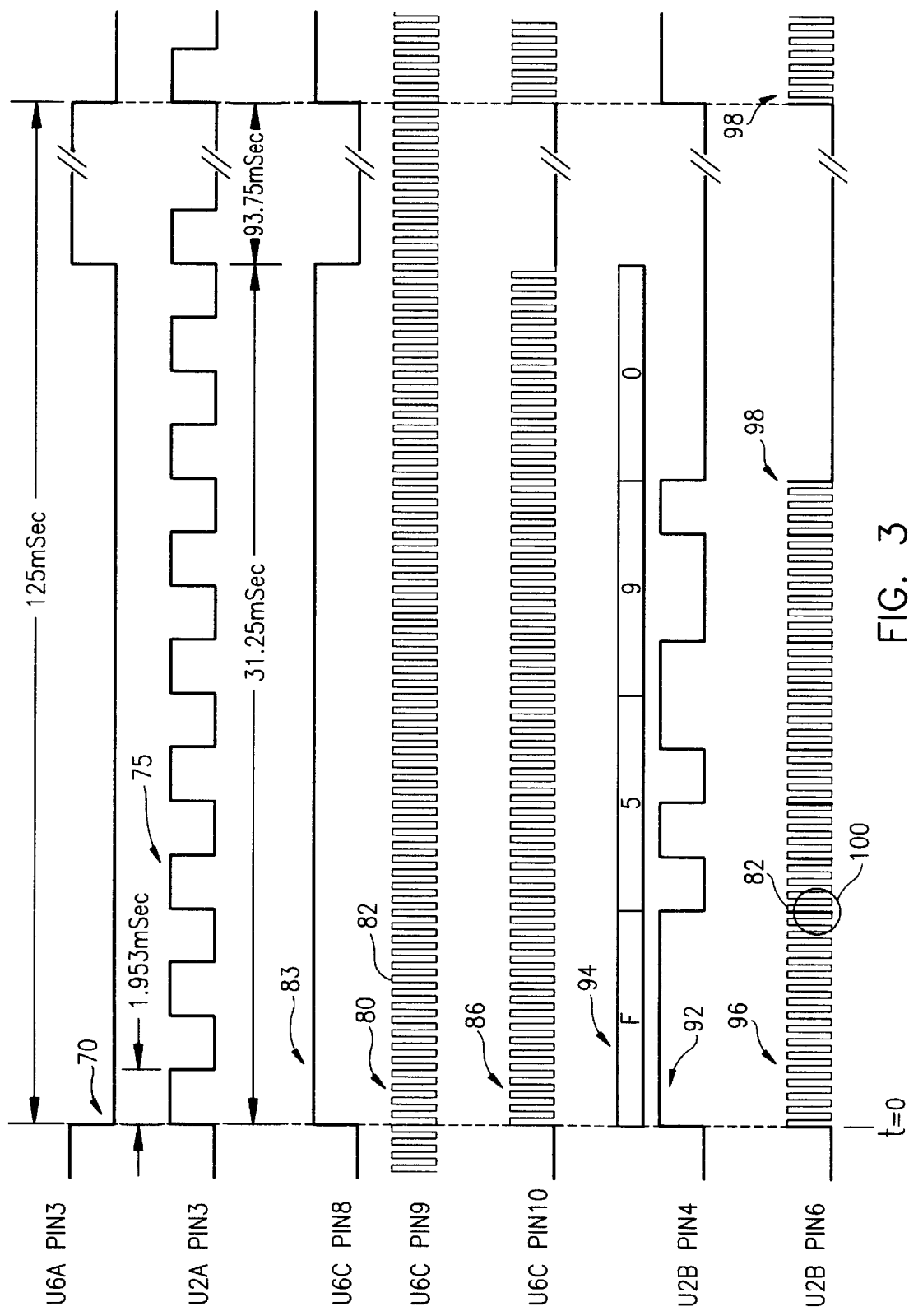
FIG. 3 is a timing diagram illustrating the operation of the transmitter circuit of FIG. 2A and FIG. 2B.

As illustrated in the timing diagram of FIG. 3, duty cycle control signal 70 takes the form of a periodic signal which assumes a low logic level for thirty-one and one-quarter milliseconds (31.25 mSec) and a high logic level for the remainder of its total period of one hundred twenty-five milliseconds (125 mSec). In the preferred embodiment, the 31.25 millisecond interval represents the maximum duration of each RF signal 18 while the remainder of the period (i.e., 93.75 milliseconds) corresponds to the inactive intervals between successive transmissions. The duration of the inactive intervals between successive transmissions of RF signal 18 is preferably maximized in order to maximize energy savings but is limited by the amount of time a particular boundary can remain inactive yet still be effective in a particular application. This will depend on a variety of factors such as the location of the boundary, the maximum expected speed of the animal in the vicinity of the boundary and the temperament of the animal. Preferably the inactive intervals between successive transmissions are selected to be in a range from about thirty milliseconds (30 mSec) to about one hundred milliseconds (100 mSec) or more. Indeed, in the case of certain indoor boundaries, inactive intervals of up to about five seconds (5 Sec) or more may be suitable.

By establishing predetermined time intervals between transmissions of RF signal 18, duty cycle control signal 70 also plays an important role in avoiding the possibility of reception of false signals which might otherwise result in shocking animal 12 in error. As will be explained hereinafter, receiver/stimulator verifies reception of a valid RF signal 18 by requiring at least one subsequent RF signal 18 to be received within a limited time window occurring a predetermined time after an initial reception of RF signal 18. Preferably, the width of such a time window only slightly exceeds the duration of transmission of each RF signal 18 and begins at a time following reception of a prior RF signal 18 which is consistent with the duration of the inactive intervals between successive transmissions. If a subsequent RF signal 18 is not received within the predetermined time window receiver/stimulator unit 14 will not allow stimulation of animal 12 to occur.

Output Q6 of ripple counter U1 oscillates between high and low logic levels at 512 Hz and is connected to the input of pin 2 of an Exclusive OR gate U2A which serves as a buffer and an inverter by virtue of having a second input tied to the positive supply, +V. Output pin 3 of U2A provides a 512 Hz data clock signal 75. Ripple counter U1 also generates, by way of its output Q2, an RF carrier signal 80 which is applied to the input of a NAND gate U6C at pin 9 thereof. RF carrier signal 80 consists of a continuous stream of carrier pulses 82 (FIG. 3) occurring at a frequency of 8.19 KHz which corresponds as closely as possible to the resonant frequency of resonant circuit 40. NAND gate U6C includes a second input at pin 8 thereof. The input at U6C pin 8 is coupled to the output pin, pin 3, of NAND gate U6A by way of a NAND gate, U6B. NAND gate U6B has an input at pin 5 tied to the positive supply, +V, and a second input, pin 6, connected to pin 3 of NAND gate U6A to receive duty cycle control signal 70. NAND gate U6B inverts duty cycle control signal 70 thereby delivering to the input at pin 8 of a NAND gate U6C, a signal 83 which takes the form of 31.25 millisecond pulses occurring every 125 milliseconds. NAND gate U6C logically combines these pulses with the RF carrier signal 80 continuously present at its other input, U6C pin 9, in order to generate at its output, U6C pin 10, a signal 86 in the form of successive, 31.25 millisecond bursts of 8.19 KHz RF carrier signal repeated once every 125 milliseconds. Output pin 10 of NAND gate U6C, in turn, is connected to a first input at pin 5 of an Exclusive OR gate U2B whose operation will be explained shortly.

In order to provide RF signal 18 with an identifiable digital code as described above, the drive circuit 38 of each transmitter 17 includes a code generator 89. In the preferred embodiment, code generator 89 is implemented using a pair of 8-stage shift registers, U3 and U5 connected in cascade with one another. This is achieved by connecting the serial output, Q8 of shift register U3 to the serial input (SERIN) of shift register U5 and by connecting the serial output Q8 of shift register U5 to the serial input (SERIN) of U3. In order to minimize drain on battery 36 imposed by shift registers U3 and U5, duty cycle control signal 70 is applied to an ENABLE input at pin 9 of both shift registers U3 and U5. Doing so allows shift registers U3 and U5 to operate and draw power only during the relatively short intervals when duty cycle control signal 70 is in its low logic state. Each shift register U3, U5 includes a clock (CLK) input which is tied to pin 3 of gate U2A in order to receive 512 Hz data clock signal 75 which controls the rate at which code data is delivered from code generator 89.

Shift registers U3 and U5 also each include a respective series of eight inputs, identified as P11 through P18, which are selectively connected either to the positive supply voltage, +V, or to circuit ground in order to define an arbitrary 16 bit binary (four digit hexidecimal) digital code. In the particular transmitter 17 illustrated in FIGS. 2A and 2B, these inputs are configured to generate the hexidecimal code "F590." This is achieved by connecting inputs P18, P17, P16, P15, P13 and P11 of U5 and inputs P18, P15 of U3 all directly to the positive supply, while connecting inputs P14 and P11 of U5 and inputs P17, P16, P14, P13, P12 and P11 of U3 all directly to circuit ground. To facilitate assignment and/or changing of digital codes, one or more of the inputs P11 through P18 of shift registers U3 and/or U5 could alternatively be connected to the positive supply, +V, by way of high resistance pull-up resistors while being selectively connectable to ground by way of miniature switches, severable links or jumper wires. Such an arrangement would permit a single circuit board layout to be used to fabricate transmitters 17 capable of being identified by any of a number of different codes. It would also allow simple and rapid assignment or changing of codes in the field.

The operation of code generator 89 is such that each time data clock signal 75 undergoes a logic level transition during an interval when duty cycle control signal 70 is in a low logic state, individual binary bits of the assigned digital code are successively clocked out of the serial output Q8 of U5 as modulation data 92 as illustrated in FIG. 3 beneath its corresponding hexadecimal representation 94.

In order to modulate RF signal 18 with modulation data 92, the serial output Q8 of shift register U1 is connected to a second input of Exclusive OR gate U2B at pin 4 thereof. As described above, Exclusive OR gate U2B includes a first input at U2B pin 5 which receives a 31.25 millisecond burst of 8.19 KHz RF carrier signal once every 125 milliseconds. Exclusive OR gate U2B operates as a binary phase shift modulator which mixes the RF carrier bursts appearing at U2B pin 5 with the modulation data 92 presented by code generator 89 at U2B pin 4. In so doing, Exclusive OR gate U2B induces a phase shift of one hundred eighty degrees (180°) in the RF carrier whenever the modulation data 92 undergoes a logic level transition thus generating a binary phase shift keyed (BPSK) signal 96 at its output, U2B pin 6. BPSK signal 96 takes the form of intermittent bursts 98 of binary phase shift-encoded carrier pulses 82 occurring nominally at the RF carrier frequency of 8.19 Khz. In accordance with duty cycle control signal 70, each burst persists for no more than 31.25 milliseconds and repeats every 125 milliseconds The occurrence of the phase shifts of pulses 82 is indicated schematically in FIG. 3 by the heavy vertical lines appearing at several points in BPSK signal 96. A portion, indicated by reference numeral 100 in FIG. 3, of a typical one of such bursts at a typical data transition is illustrated in the expanded time scale timing diagram in FIG. 4. Additional reference will now be made to FIG. 4 as the structure and operation of the transmitter 17 circuit of FIG. 2A and FIG. 2B is further explained.

Figure 4:
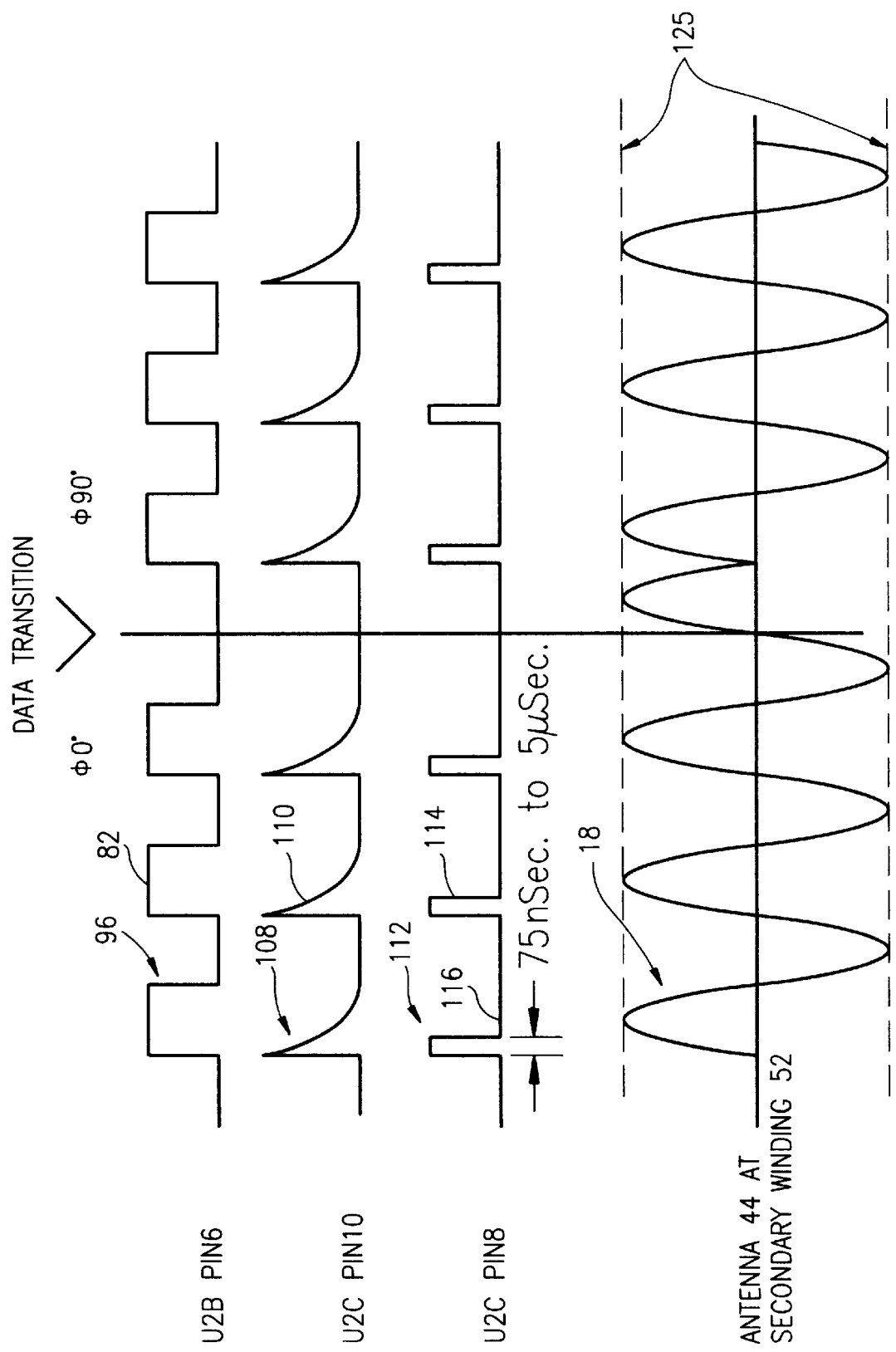
FIG. 4 is a timing diagram of expanded time scale relative to FIG. 3 further illustrating the operation of the transmitter circuit of FIG. 2A and FIG. 2B.

In order to adjust the range of RF signal 18 and thus the distance between each transmitter 17 and its associated electronic boundary 20, transmitter 17 includes a variable time constant differentiator circuit 103. Differentiator circuit 103 takes the form of a capacitor 105 and a variable resistor 106. One side of capacitor 105 is connected to pin 6 of Exclusive OR gate U2B to receive BPSK signal 96 therefrom while its other side is connected to ground through variable resistor 106. As FIG. 4 illustrates, differentiator circuit 103 differentiates each of the carrier pulses 82 of BPSK signal 96 to generate a differentiated BPSK signal 108 characterized by sharply peaked pulses 110 which bear a fixed phase relationship to the corresponding carrier pulses 82 of BPSK signal 96. While not shown in FIG. 4, peaked pulses 110 will actually be shifted in phase by a constant amount relative to carrier pulses 82. That phase shift is immaterial however because it is constant. The peaks of differentiated BPSK signal 108 decay exponentially at a rate determined by the time constant of differentiator circuit 103 which can be adjusted by means of variable resistor 106. Variable resistor 106 thus serves to adjust the amount of energy contained in pulses and thus, the effective range of transmitter 17.

Differentiator circuit 103 is connected to the input of an Exclusive OR gate U2C at pin 10 thereof in order to apply differentiated BPSK signal 108 thereto. Exclusive OR gate U2C includes a second input at U2C pin 9 which is tied to the positive supply, +V. Exclusive OR gate U2C serves as a squaring amplifier which converts differentiated BPSK signal 108 into a BPSK driving signal 112 appearing at the output pin 8 of U2C. As shown in FIG. 4, BPSK driving signal 108 takes the form of a train of brief, rectangular, drive pulses 14 mutually separated by intervals 116 of time. Drive pulses 114 correspond in phase to peaked pulses 10 and thus repeat substantially at the RF carrier frequency of 8.19 KHz. By adjusting variable resistor 106, the width of drive pulses 114 can be varied within a range from about seventy five nanoseconds (75 nSec) to about five microseconds (5 μSec).

When BPSK driving signal 112 is applied to resonant circuit 40, it causes resonant circuit 40, including antenna 44, to resonantly ring thereby transmitting RF signal 18. To minimize the damping effect of each drive pulse 114 on resonant circuit 40, the invention contemplates that each drive pulse 114 be as brief as practicable while still containing a sufficient amount of energy to deliver the amount of radiated RMS power required by a particular application. Widening of drive pulses 114 any more than is necessary tends to increase their damping effect on resonant circuit 40 and thus decrease the efficiency at which transmitter 17 converts D.C. power to useful radiated RF power. In accordance with the invention, the duty cycle of BPSK driving signal 112 should be less than about fifteen percent (15%) and preferably less than about five percent (5%). Most preferably, BPSK driving signal 112 has a duty cycle of less than about one percent (1%). In the preferred embodiment, for example, the width of drive pulses 114 can be adjusted using variable resistor 106 such that the duty cycle of BPSK driving signal 112 ranges from about six hundredths of one percent (0.06%) to about four point one percent (4.1%).

In order to further enhance the efficiency of transmitter 17, a further aspect of the invention permits drive pulses 114 to be delivered at high current while minimizing any loading effects of drive circuit 38 which could otherwise damp the ringing of resonant circuit 40. To do so, the invention effectively electrically isolates drive circuit 38 from resonant circuit 40 during at least a portion, and preferably substantially the entirety, of the intervals 116 between drive pulses 114. This is done by operably interposing isolation circuit 42 between drive circuit 38 and resonant circuit 40.

In the preferred embodiment, isolation circuit 42 takes the form of a pair of DMOS field effect transistors (FETs) 120 and 121, each having respective gate (G), drain (D) and source (S) terminals connected mutually in parallel with one another as illustrated in FIG. 2B. The gates of FETs 120 and 121 are each connected to U2C pin 8 to receive BPSK driving signal 112. The output of isolation circuit 42 is coupled to resonant circuit 40 by connecting the common drains of FETs 120 and 121 to lead 49 of the primary winding 47 of antenna 44 and to ground by way of a clamping diode 123. The common source terminals of FETs 120 and 121 are connected to the positive supply, +V.

In operation, FETs 120 and 121 remain in a cutoff state until a drive pulse 114 of BPSK driving signal 112 is delivered to their gates from the output of Exclusive OR gate U2C. When a drive pulse 114 appears at their gates, FETs 120 and 121 are driven rapidly into full conduction providing a very low resistance current path from the +V supply to the primary winding 47 of antenna 44. In doing so, isolation circuit 42 allows driving pulses 114 to effectively be delivered to resonant circuit 40 at high current with very little forward loss. Current continues to be delivered to primary winding 47 until the present drive pulse 114 terminates. At that time, FETs 120 and 121 both abruptly enter a cutoff state in which substantially no conduction occurs. Clamping diode 123 serves to maintain this cutoff state during the entire interval 116 until the next successive drive pulse 114 occurs by blocking any voltages reflected to primary winding 47 due to ringing of the secondary winding 52 of antenna 44. FETs 120 and 121 remain in the cutoff state during each interval 116 between drive pulses 114 so that during intervals 116, isolation circuit 42 presents a substantially infinite impedance to resonant circuit 40 which prevents drive circuit 38 from loading resonant circuit 40 during intervals 116. In sum, isolation circuit functions essentially as a current amplifier in the form of a switch which closes to deliver the drive pulses 114 of BPSK driving signal 112 to resonant circuit 40 and which selectively opens during intervals 116 to avoid damping the ringing of resonant circuit 40 by drive circuit 48 during intervals 116.

In response to the delivery of the drive pulses 114 of BPSK driving signal 112 by way of isolation circuit 42, resonant circuit 40, including the secondary winding 52 of antenna 44, is caused to resonantly ring at the desired RF carrier frequency in the manner illustrated in FIG. 4 thereby transmitting a corresponding RF signal 18. Whenever the modulation data 92 generated by code generator 89 undergoes a data transition such as one as illustrated at reference numeral 100 in FIG. 3 and more clearly by the data transition indicated in FIG. 4, BPSK signal 96 undergoes a phase shift of one hundred eighty degrees (180°). This phase shift is reflected in differentiated BPSK signal 108, in BPSK driving signal 112 and ultimately in RF signal 18 as indicated. It is in this manner that the digital code provided by code generator 89 is ultimately imparted to RF signal 18.

As can be seen with reference to FIG. 4, RF signal 18 does not vary in amplitude as a result of its modulation. Instead, RF signal 18 is bounded by an imaginary envelope 125 of substantially constant magnitude. Use of such a "constant envelope" modulation scheme offers improved reliability over amplitude modulated (AM) communications by providing a signal which is always detectable at its maximum amplitude. Moreover, the energy efficiencies afforded by the invention are such that quiescent current consumption of the entire circuit of transmitter 17 at its minimum range setting is only 5.5 microamperes. A typical transmitter 17 constructed according to the preferred embodiment is capable of continuous operation for up to 7.7 years on a single 550 milliampere-hour battery 36.

Referring now to FIG. 5 and FIG. 6, the construction of antenna 44 will now be described in further detail. The secondary winding 52 of antenna 44 consists of one thousand thirty (1030) turns of #32 AWG magnet wire wound around ferrite core 46 and terminating in secondary leads 54 and 55. Ferrite core 46 may suitably comprise one such as a part number 81400 available from Morely Transformer of Muncie, Ind. Ferrite core 46 has a magnetic permeability of eight hundred (800), an overall length of 3.1 inches and an elliptical cross section 0.5 inch wide with a maximum thickness of about 0.125 inch as illustrated in FIG. 6. Core 46 may suitably be fabricated from material designated SPX 4803000 available from National Magnetics Group of Bethlehem, Pa. or equivalent. As FIG. 5 shows, the central portion of secondary winding 55 is overlaid by primary winding 47 which consists of one hundred twenty five (125) turns of #32 AWG magnet wire terminating in primary leads 49 and 50. Primary winding 47 occupies the central 1.35 inches of secondary winding 52. In the preferred embodiment, antenna 44 has a quality factor, Q, of about eighty (Q=80).

Table 1 below is a parts listing for the transmitter circuit of FIGS. 2A and 2B.

TABLE 1

| Reference | Description | Quantity | Manufacturer | Manufacturer's Part Number |
|---|---|---|---|---|
| 106 | 100 Kohm variable resistor | 1 | Bourns Inc. (Riverside CA) | 3352T-104-ND |
| 44 | antenna | 1 | | see FIG. 5 & FIG. 6 |
| 120, 121 | −1.5 V P channel DMOS FET | 2 | Zetex Inc. (Commack NY) | BSS84 |
| U1 | 12 stage ripple counter | 1 | National Semiconductor Corp. (Santa Clara CA) | CD4040BM |
| 36 | 3 volt 500 mA hour lithium battery | 1 | Duracell USA (Bethel CT) | DL2450 |
| 123 | diode, DL-35, SM | 1 | Diodes Inc. (Westlake Village CA) | DL4148 |
| U6A–U6D | Quad NAND gate | 1 | Motorola, Inc. (Schaumburg IL) | MC14011UBD |
| U3–U5 | 8-stage shift register | 2 | Motorola, Inc. (Schaumburg IL) | MC14021BD |
| U2A–U2C | Quad Exclusive-OR gate | 1 | Motorola, Inc. (Schaumburg IL) | MC74HC86D |
| 57 | 1000 pF, 0805 Pkg., 10%, capacitor | 1 | Surface Mountable Electronic Comonents, Inc. (Austin TX) | MCCE102K3NR-T1 |
| 67 | 20 pF, 0805 Pkg., 5%, capacitor | 1 | Surface Mountable Electronic Components, Inc. (Austin TX) | MCCE200J2NO-T1 |
| 66 | 5 pF, 0805 Pkg., 5%, capacitor | 1 | Surface Mountable Electronic Components, Inc. (Austin TX) | MCCE5R1D2NO-T1 |
| 105 | 68 pF, 0805 Pkg., 5%, capacitor | 1 | Surface Mountable Electronic Components, Inc. (Austin TX) | MCCE680J2NO-T1 |
| 65 | 10 Megohm 0805 Pkg., 5%, resistor | 1 | ROHM Co., LTD. (Antioch TN) | MCR10-EZH-JW-106 |
| 59 | 16 Kohm, 0805 Pkg., 5%, resistor | 1 | ROHM Co., LTD. (Antioch TN) | MCR10-EZH-JW-163 |
| 64 | 470 Kohm, 0805 Pkg., 5%, resistor | 1 | ROHM Co., LTD. (Antioch TN) | MCR10-EZH-JW-474 |
| 58 | 0.01 uF, 0805 Pkg., 5%, plastic capacitor | 1 | NIC Components Corp. (Amityville NY) | NSPC103J50TRB2 |
| 63 | 32 KHz Crystal | 1 | Raltron (Miami FL) | R38-32.768 KHz |

Receiver/stimulator units 14, 14' operate to deliver an appropriate aversive stimulus in the event animals 12 or 12' encroach upon an electronic boundary 20 or 23 defined by an RF signal 18 identified by modulation data 92 to which a particular receiver/stimulator unit 14, 14' is programmed to respond. Each receiver/stimulator unit 14, 14' includes a microprocessor based control and stimulation subsystem 130, an RF receiver 133 and a quadrature demodulator 136 which are housed in a common housing secured to a collar for affixation to animal 12, 12'.

Figure 7:
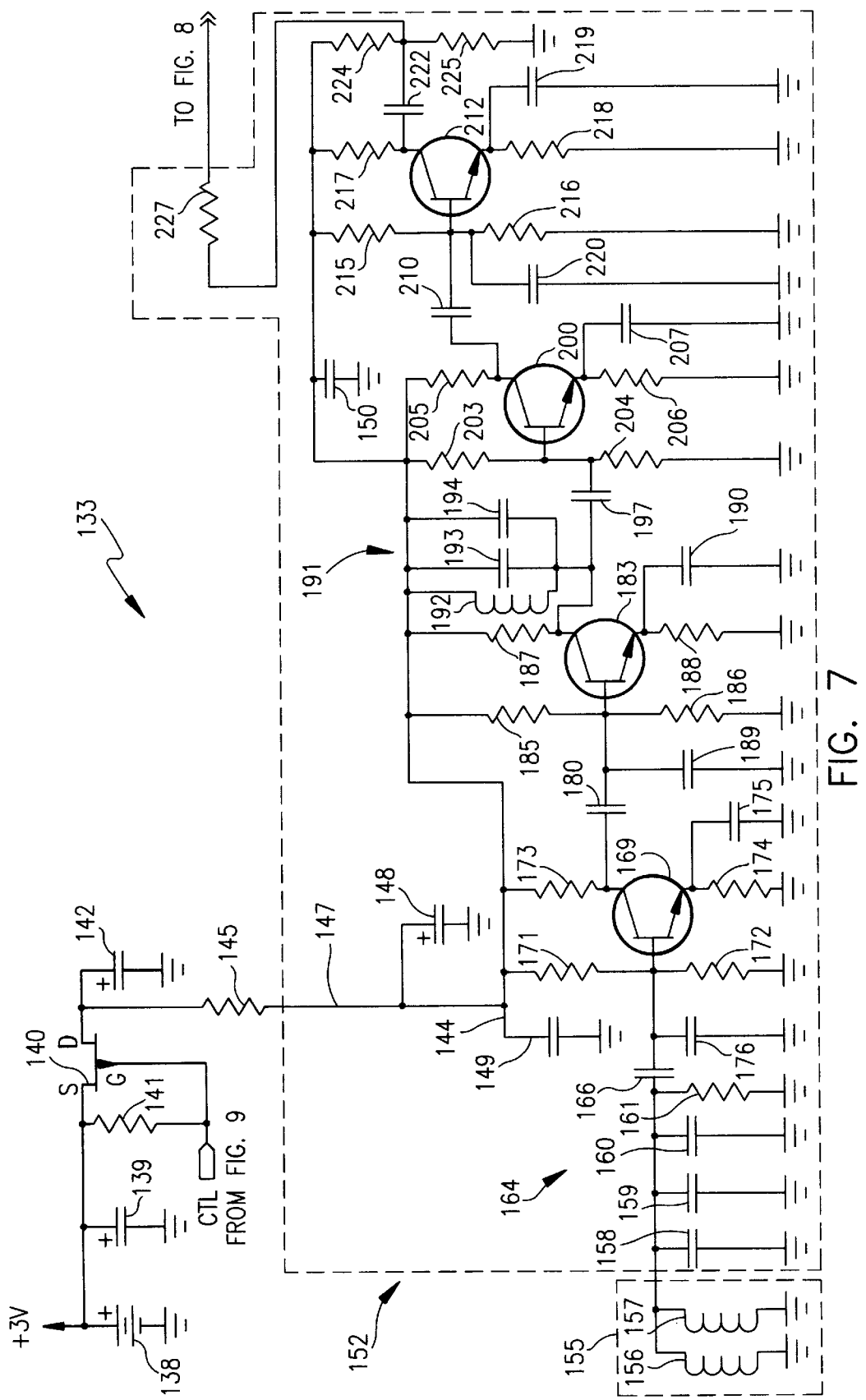
FIG. 7 is a circuit schematic illustrating the receiver of the receiver/stimulator units of FIG. 1.

Referring to FIG. 7, the structure and operation of the receiver 133 of a typical receiver/stimulator unit 14 will now be described. Receiver 133 as well as all other circuitry of receiver/stimulator unit 14, are powered by a single replaceable battery 138 connected in parallel with a filter capacitor 139. Battery 138 also supplies the operating power requirements of quadrature demodulator 136 and control and stimulation subsystem 130. In order to conserve battery 138, the flow of operating current from battery 138 to the remainder of the circuitry of receiver 133 is controlled by means of a field effect transistor (FET) 140 whose gate (G) is connected to an output line, CTL, of control and stimulation subsystem 130 which will be described in further detail below with reference to FIG. 9. A high resistance pull-up resistor 141 is connected between the gate and source terminals of FET 140. FET 140 also includes a drain (D) terminal which is bypassed to ground through a capacitor 142. The drain (D) of FET is connected to a positive supply rail 144 by way of a current limiting resistor 145 by way of a line 147 bypassed to ground through a capacitor 148. Positive supply rail 144 is itself bypassed to ground by a pair of capacitors 149 and 150. As indicated in FIG. 7, line 147 traverses an RF shield 152 which takes the form of an enclosure formed of copper sheet which encloses the circuitry indicated and serves to shield it from noise.

The circuitry of receiver 133 described thus far operates to selectively control the flow of electrical power from battery 138 to positive supply rail 144. When the CTL line from control/stimulation subsystem 130 is in a low logic state, FET 140 is driven into conduction to provide a path for delivering current from battery 138 to positive supply rail 144 by way of resistor 145. When control and stimulation subsystem 130 drives its CTL line to a high logic state, FET 140 is rapidly cut off thereby blocking the flow of current from battery 138 to positive supply rail 144. In the event of a failure in the control and stimulation subsystem 130, pull-up resistor 141 serves to hold FET 140 in a cutoff state in order to conserve battery 138.

In order to intercept an RF signal 18 when animal 12 encroaches upon either an electronic boundary 20 associated with a transmitter 17 or the wire loop boundary 23 emitted by wire loop 22, receiver 133 includes an antenna 155. Antenna 155 consists of a pair of mutually orthogonally positioned, twelve millihenry (12 mH) inductors 156 and 157. Inductors 156 and 157 are connected electrically in parallel both with one another and with a series of parallel capacitors 158, 159 and 160 and a resistor 161 to form a resonant front-end filter circuit 164. Capacitors 158, 159 and 160 are selected to resonate with inductors 156 and 157 at the RF carrier frequency of 8.19 KHz. Resistor 161 loads the resonant circuit in order to lower its quality factor, Q, to a value which widens its bandwidth sufficiently to pass the frequency components of interest associated with the modulation data 92 component of the RF signal 18 intercepted by antenna 155.

Front end filter circuit 164 is connected to coupling capacitor 166 which delivers the RF signal 18 intercepted by antenna 155 to a class A, common emitter amplifier stage consisting of an NPN type bipolar junction transistor 169 connected in the conventional manner to the positive supply rail 144 and circuit ground by way of associated biasing resistors 171, 172, 173 and 174 as well as bypass capacitors 175 and 176 as shown. This first stage of amplification imparts a voltage gain of about twenty-nine decibels (29 dB) to the RF signal 18 presented by front end filter circuit 164.

The collector of transistor 169 is connected by way of an a.c. coupling capacitor 180 to a second class A, common emitter amplifier stage consisting of an NPN type bipolar junction transistor 183, associated biasing resistors 185, 186, 187 and 188 as well as bypass capacitors 189 and 190. This second stage of amplification imparts an additional voltage gain of about twenty nine decibels (29 dB) to the RF signal 18. In order to reduce the out-of-band noise which might otherwise cause a false indication that an appropriately encoded RF signal 18 has been received, the emitter of transistor 183 is connected to a resonant bandpass filter 191. Filter 191 consists of an inductor 192, a capacitor 193 and a capacitor 194 all of which are connected mutually in parallel between the emitter of transistor 183 and positive supply rail 144. Filter 191 resonates at a center frequency of 8.19 KHz and is characterized by a quality factor, Q, of about four point four (Q=4.4) to provide a bandwidth of about 1.86 KHz.

Having been stripped of out-of-band noise by the action of bandpass filter 191, RF signal 18 is amplified further. This is achieved by connecting the collector of transistor 183 by way of an a.c. coupling capacitor 197 to a third, and subsequently to a fourth, class A common emitter amplifier stage, each of which provides an additional voltage gain of about twenty-nine decibels (29 dB). The third stage consists of an NPN type bipolar junction transistor 200 connected conventionally to supply rail 144 and ground by way of biasing resistors 203, 204, 205 and 206 and bypass capacitor 207. The fourth amplification stage is connected to the collector of amplifier 200 by way of an a.c. coupling capacitor 210. This fourth stage consists of an NPN type bipolar junction transistor 212, connected in the conventional manner to supply rail 144 and ground by way of associated biasing resistors 215, 216, 217 and 218 and bypass capacitors 219 and 220 as shown.

Figure 8:
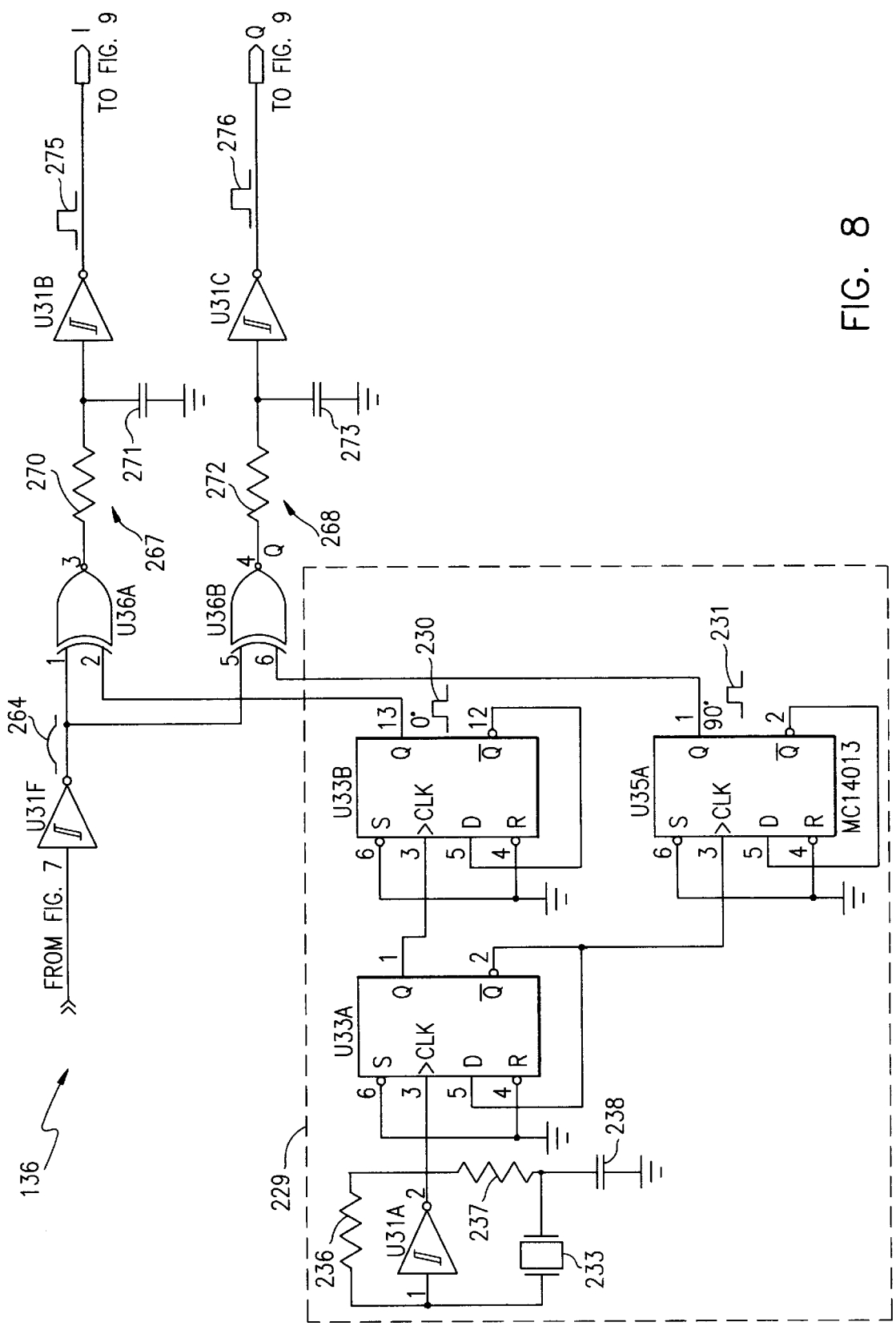
FIG. 8 is a circuit schematic illustrating the quadrature demodulator of the receiver/stimulator units of FIG. 1.

A fully amplified rendition of the received RF signal 18 appears at the collector of transistor 212. As a further precaution against an erroneous determination that a properly encoded RF signal 18 has been received, a D.C. offset voltage of about 0.53 Volts is imparted to this signal. This is achieved by connecting the collector of transistor 212 through an a.c. coupling capacitor 222 to the center of a voltage divider formed by a pair of resistors 224 and 225 connected in series with one another between positive supply rail 144 and circuit ground. The junction between resistors 224 and 225 is in turn connected to quadrature demodulator 136 by way of a current-limiting resistor 227. Referring to FIG. 8 the structure and operation of quadrature demodulator 136 will now be described.

Quadrature demodulator 136 is driven by a clock circuit 229 which generates a pair of 8.19 KHz signals 230 and 231 which are ninety degrees (90°) out of phase with one another. Clock circuit 229 includes a crystal 233 connected across an inverter U31 by way of a network consisting of resistors 236 and 237 and a capacitor 238 to form an oscillator which generates a free running 32.768 KHz signal at the output of U31A. The output of U31A is connected to the clock (CLK) input of a D-type flip-flop U33A configured as a frequency divider. Flip-flop U33A has an output, Q at pin 1 thereof which provides a first 16.384 KHz signal. Flip-flop U33A has a second output, Q, at pin 2 thereof which provides a second 16.384 KHz signal ninety degrees (90°) out of phase with aforementioned first 16.384 KHz signal. The output Q at pin 1 of flip-flop U33A is connected to the clock (CLK) input at pin 3 of a second flip-flop, U33B which is likewise configured as a frequency divider. Second flip-flop U33A includes an output Q at pin 13 thereof which provides one of the aforementioned 8.19 KHz signals 230 which serves as a phase reference. In a similar fashion, the output Q at pin 2 of flip-flop U33A is connected to the clock (CLK) input at pin 3 of a third flip-flop, U35A, likewise configured as a frequency divider. Third flip-flop U35A includes an output Q at pin 1 thereof which provides quadrature 8.19 KHz signal 231. Pin 13 of second flip-flop U33B is connected to pin 2 at the input of a first Exclusive OR gate, U36A to deliver signal 230 thereto. Pin 1 of third flip-flop U35A is similarly connected to a corresponding input at pin 6 of a second Exclusive OR gate U36B to apply quadrature signal 231 thereto.

An inverter U31F includes an input which is connected to the resistor 227 of FIG. 7 to receive an amplified and slightly D.C. offset rendition of RF signal 18 therefrom. Inverter U31F serves as a hard limiter which clips the peaks from the amplified RF signal 18 to generate a clipped BPSK signal 264. The portions clipped away include any noisy portions thereof raised beyond the clipping threshold by virtue of the D.C. offset applied by the action of resistors 224 and 225 of FIG. 7. The output of inverter U31F is connected to the input at pin 1 of first Exclusive OR gate U36A as well as to the input at pin 5 of second Exclusive OR gate U36B. Exclusive OR gates U36A and U36B serve to the clipped BPSK signal delivered at the output of U1F with phase reference signal 230 and quadrature signal 231. The outputs of Exclusive OR gates U36A and U36B are connected to respective low pass filters 267 and 268 which respectively consist of a resistor 270 and a capacitor 271 and a resistor 272 and a capacitor 273. Low pass filters 267 and 268 each have a −3 dB cutoff frequency of about 1 KHz thereby serving to recover from the clipped BPSK signal 26 both a code data signal 275 and a quadrature code data signal 276 which are buffered by respective inverters U31B and U31C connected to the output sides of low pass filters 267 and 26, respectively. The outputs of inverter U31B and U31C are connected to respective in-phase and quadrature (Q) inputs of the control and stimulation subsystem 130. Since the true phase of the clipped BPSK signal 264 is not known, either code data signal 275 or quadrature data signal 276 will faithfully represent the modulation data signal 92 shown in FIG. 3 which identifies a particular transmitter 17 or, as will be explained hereinafter, wire loop 22.

Figure 9:
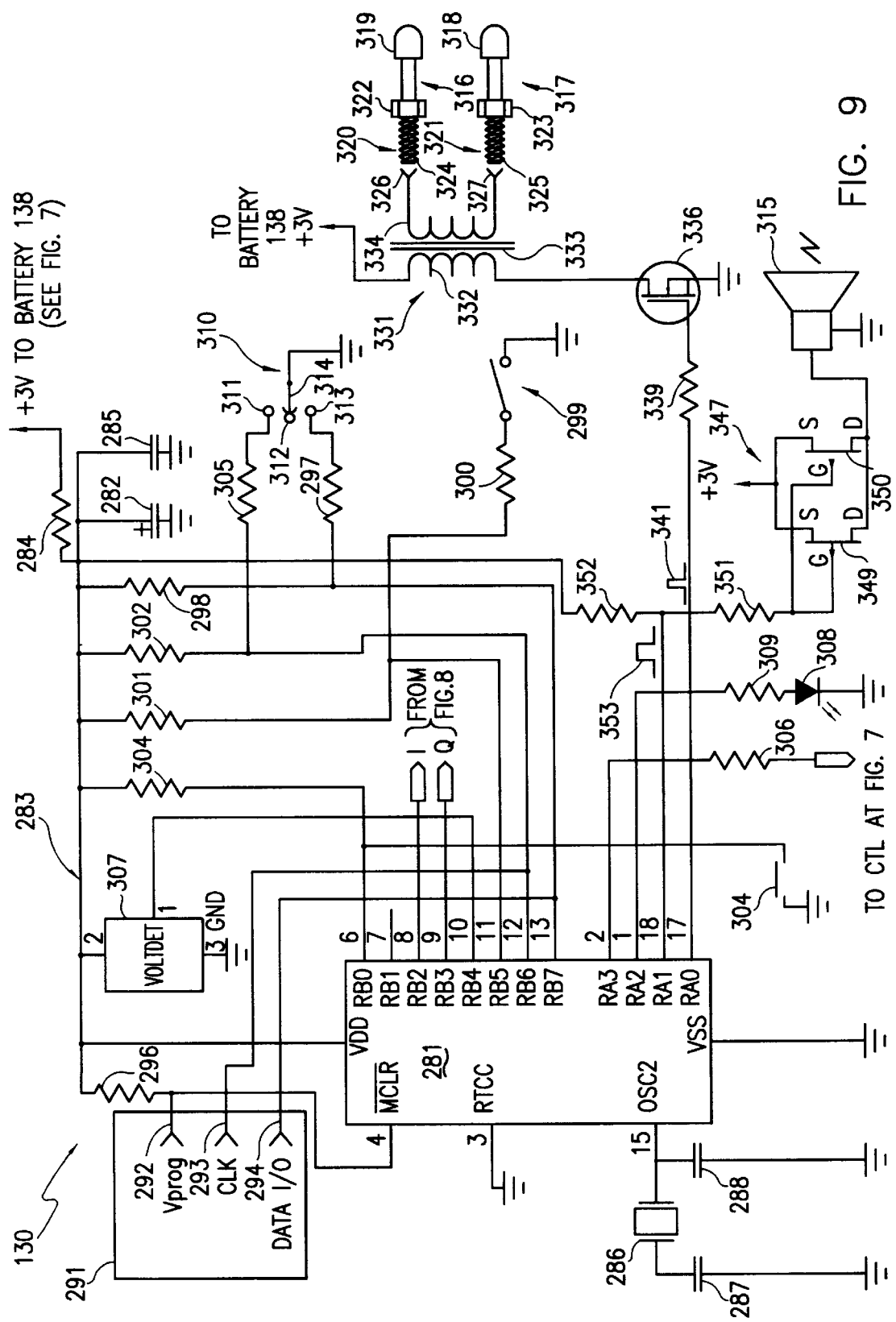
FIG. 9 is a circuit schematic illustrating the control and stimulation subsystem of the receiver/stimulator units of FIG. 1.

Referring now to FIG. 9, control and stimulation subsystem 130 is powered entirely from battery 138 which is connected to a positive supply rail 283 by way of a current-limiting resistor 284. Power supply rail 283 is bypassed to circuit ground by way of a pair of capacitors 282 and 285. Subsystem 130 includes a programmed microprocessor 281 which receives operating power by virtue of connections to positive supply rail 283 and to circuit ground at pins designated VDD and VSS, respectively. Microprocessor 281 internally includes sufficient program memory and data memory as well as an arithmetic and logic unit, input/output facilities, a data bus, an address bus and other conventional timing and control facilities. Microprocessor 281 operates at a clock speed of 400 KHz established by a crystal 286 connected to an external oscillator input (OSC 2) at pin 15 of microprocessor 281 and to circuit ground by way of a pair of capacitors 287 and 288. A real time clock/counter (RTCC) input at pin 15 of the preferred microprocessor 281 identified in Table 2 below is not used and is tied to ground. Microprocessor 281 is programmed to have stored therein an operating program and certain data as set forth in detail in the relevant portions of the Software Appendix referred to above in order to control the operation of subsystem 130 in accordance with various inputs in the manner to be described. For that purpose, microprocessor further includes a plurality of bidirectional input/output (I/O) ports identified as RA0 through RA3 and RB0 through RB7. Individual ones of these ports are configured either as input ports or as output ports according to the stored operating program.

In order to allow microprocessor 281 to be programmed serially in the field, subsystem 130 includes programming port 291 physically accessible through the battery compartment of receiver/stimulator unit 14. Programming port 291 includes a series of three pins 292, 293 and 294 which may be used to program microprocessor 281 in the manner more fully described in programming specification DS30189 using hardware described in publication DS00589A, both of which are available from Microchip Incorporated of Dallas, Tex. and which are expressly incorporated herein by reference in their entirety to form part of the present disclosure. Pin 291 is connected to positive supply rail 283 by way of a pull-up resistor 296 as well as to reset pin 4 of microprocessor 281 while pins 293 and 294 are connected respectively to I/O ports RB6 at pin 6 and RB7 at pin 7 of microprocessor 281.

Receiver/stimulator units 14, 14' conserve battery 138 by selectively shutting down circuits which are non-essential at times when animal 12 is not moving. For that purpose, subsystem 130 is provided with a highly sensitive, single pole, single throw motion switch 299. One side of motion switch 299 is connected to circuit ground while its other side is connected to positive supply rail 283 by way of a voltage divider consisting of a resistor 300 and a resistor 301. To enable microprocessor 281 to read the state of motion switch 299, resistors 300 and 301 are connected at their common junction to an input port at RB5 at pin 11 of microprocessor 281. Motion switch 299 is mounted on the printed circuit board associated with subsystem 130 and opens and closes frequently when animal 12 is moving about. To selectively disable the battery conserving function associated with motion switch 299 for convenience in troubleshooting or testing system 10, one can install a jumper 304 to selectively tie I/O port RB0 at pin 6 to circuit ground. Port RB0 at pin 6 of microprocessor 281 is configured as an input port and is connected to positive supply rail 283 by way of a pull-up resistor 304 which acts to hold port RB0 at a high logic state at all times when jumper 304 is not installed, thereby enabling the battery conserving function associated with motion switch 299. That function is implemented using I/O port RA3 at pin 2 of microprocessor 281 which is configured as an output port and is connected by way of a resistor 306 to the control (CTL) input at the gate of FET 140 shown in FIG. 7.

When no jumper 304 is installed and animal 12 is determined by microprocessor 281 to be moving based on the inputs received from motion switch 299 by way of I/O port RB5, microprocessor 281 drives I/O port RA3 at pin 2 to a low logic level state thereby delivering operating power to receiver 133. Conversely, when the input received from motion switch 299 indicates animal 12 is not moving, there is no need for subsystem 130 to continue monitoring for encroachment of a boundary 20 or 23 as long as animal 12 remains not in motion. In that event, microprocessor 281 drive I/O port RA3 at pin 2 to a high logic level to cut off power to portions of circuitry of receiver 133.

To monitor the condition of battery 138, subsystem 130 includes a voltage detector 307 connected to positive supply rail 283 and circuit ground at pins 2 and 3 of detector 307, respectively. Voltage detector 307 includes an output pin, pin 1, which is connected to I/O port RB4 at pin 10 of microprocessor 283 which is configured as an input port. When power supply rail 283 drops to a voltage below a threshold of about 2.35 volts, pin 1 of voltage detector 307 undergoes a logic level transition which microprocessor 281 senses by sampling the signal at port RB4. To avoid the possibility of unpredictable operation in the event positive supply rail 283 drops below a second predetermined threshold voltage, a brownout protection circuit (not shown) may optionally be provided to reset microprocessor 281. Such a brownout protection circuit is described in detail in publication DS30081B available from Microchip Incorporated of Dallas, Tex. which is expressly incorporated herein by reference in its entirety to form part of the present disclosure. A visible indication that battery 138 is in need of being replaced, subsystem 130 is provided by a light-emitting diode (LED) 308 whose cathode is connected to circuit ground and whose anode is connected by way of a resistor 309 to port RA2 at pin 2 of microprocessor 281. Port RA2 is configured as an output port which remains in a low logic state during normal operation. In the event the voltage on positive supply rail 283 drops below the threshold determined by voltage detector 307, voltage detector 307 applies a signal to the input port RB4 of microprocessor 281. In response to that signal, the operating program stored in microprocessor 281 toggles output port RA2 to blink LED 308 which is mounted so as to be visible exteriorly of receiver/stimulator unit 14.

Control/stimulation subsystem 130 provides for the administration of various forms of aversive stimulation to an animal 12 in the event microprocessor 281 determines that an RF signal 18 satisfying one or more predetermined conditions has been received by receiver 133. In order to permit such a determination to be made, the outputs of inverters U31B and U31C shown in FIG. 8 are connected respectively to I/O ports RB2 and RB3 of microprocessor 281 at pins 8 and 9 thereof, respectively. Ports RB2 and RB3 are configured as input ports to enable microprocessor 281 to read code data signal 275 and quadrature code data signal 276, respectively. The manner in which microprocessor 281 determines whether an RF signal 18 satisfying predetermined conditions has been received will be explained in further detail below with reference to the flowchart of FIG. 15.

In the preferred embodiment, stimulation can take the form either solely of a tone audible to animal 12 or as an audible tone and administered substantially simultaneously with a harmless electrical shock. The appropriate form and intensity of stimulation can be selected in accordance with the size and/or temperament of the animal 12 to be controlled. For example, a larger and/or more aggressive animal 12 can be administered a more intense ("High") shock of about five kilovolts (5 KV) in magnitude. Such "High" shocks preferably take the form of a thirty to ninety millisecond burst of individual pulses about six hundred microseconds (600 µSec) each in duration. A smaller and/or less aggressive animal 12' can be administered only an audible tone or an audible tone combined with a less intense ("Low") shock of about two point five (2.5) kilovolts (2.5 KV) in magnitude. Such shocks preferably take the form of a series of individual pulses of about six hundred microseconds (600 µSec) each in duration. The form and intensity of stimulation is selectable in the field according to the position of a three position selector switch 310 having a movable wiper 314 one end of which connected permanently to circuit ground. Selector switch 310 further includes a series of terminals 311, 312 and 313. Terminal 311 is connected by way of a resistor 305 to I/O port RB6 at pin 12 of microprocessor 281. Port RB6 is configured as an input port and is connected to positive supply rail 283 by way of a pull-up resistor 302 which serves to maintain port RB6 at a high logic level except when wiper 314 is moved into contact with terminal 311. When wiper 314 is moved into contact with terminal 311, the voltage at port RB6 of microprocessor 281 drops to a low logic level. In a similar manner, terminal 313 of selector switch 310 is connected by way of a resistor 297 to I/O port RB7 at pin 6 of microprocessor 281. Port RB7 is also configured as an input port and is connected to positive supply rail 283 by way of a pull-up resistor 298 (R28). Resistor 298 serves to maintain the voltage at port RB7 at a high logic level except when it is dropped to a low logic level by moving the wiper 314 of selector switch 310 into contact with terminal 313. Terminal 312 of switch 310 is open. Positioning of the wiper 314 of selector switch 310 at terminal 312 thus results in input ports RB6 and RB7 both remaining in a high logic level state.

The stored operating program causes microprocessor 281 to read the position of selector switch 310 to determine the appropriate form and intensity of stimulation to be delivered. To do so, microprocessor 281 reads the logic level states of inputs RB6 and RB7. If RB6 is determined to be in a high logic level state, the wiper 314 of selector switch 310 is determined to be in contact with terminal 310. Microprocessor 281 is thereby instructed to administer stimuli in the form of both an audible tone and a "High" intensity electrical shock. When the wiper 314 of selector switch 310 is in contact with terminal 313, port RB7 is determined to be in a low logic level state. This instructs microprocessor 281 that stimuli in the form of an audible tone and a "Low" intensity electrical shock are to be delivered. When microprocessor 281 determines that input ports RB6 and RB7 both remain at a high logic level, microprocessor 281 is instructed to administer stimulation only in the form of an audible tone. For administering electrical and audible stimuli, subsystem 130 includes both an audio transducer 315 and a pair of mutually spaced electrodes 316 and 317.

Electrodes 316 and 317 preferably take the form of stainless steel pins about three quarters to about one inch in length and about one eighth of an inch in diameter. Each electrode 316, 317 has a respective distal end 318, 319 which is blunted to minimize discomfort and avoid irritation to the skin of animal 12. Each electrode 316 and 317 has a proximal end 320, 321 which is preferably provided with a hexagonal head 322, 323 terminating in male threaded portion 324, 325 engageable with a threaded female socket 326, 327. In this way, sets of interchangeable electrodes 316 and 317 of different lengths accommodating animals having coats of either short, long and medium length hair can be provided. Electrodes 316 and 317 are mounted to protrude normally from the surface of an injection molded housing mechanically affixed to animal collar 15. This housing (not shown) includes a user accessible battery compartment to accommodate battery 138 and encloses all the remaining components of receiver/stimulator 14 including those of control and stimulation subsystem 130 as well as receiver 133 and quadrature demodulator 136. Collar 15 holds electrodes 316 and 317 in sufficiently close contact with the skin of animal 12 to effectively administer electrical shock stimulation.

High voltage electrical shock pulses are generated by a step-up transformer 331 having a primary winding 332, a magnetic core 333 and a secondary winding 334. In the preferred embodiment, the primary to secondary turns ratio of transformer 331 is about 100:1. Secondary winding 334 is connected electrically in parallel across female sockets 326 and 327 in order to deliver high voltage shocks to animal 12 by way of electrodes 316 and 317. One side of primary winding 332 is connected directly to the positive side of battery 138 while the opposite side of primary winding 332 is connected to the source terminal of a power MOSFET 336 the drain terminal of which is connected to circuit ground. In order to allow microprocessor 281 to selectively control the flow of current through primary winding 332, MOSFET 336 is connected at its gate terminal to I/O port RA0 at pin 17 of microprocessor 281 by way of a resistor 339. Port RA0 of microprocessor 281 is configured as an output port.

Figure 10:
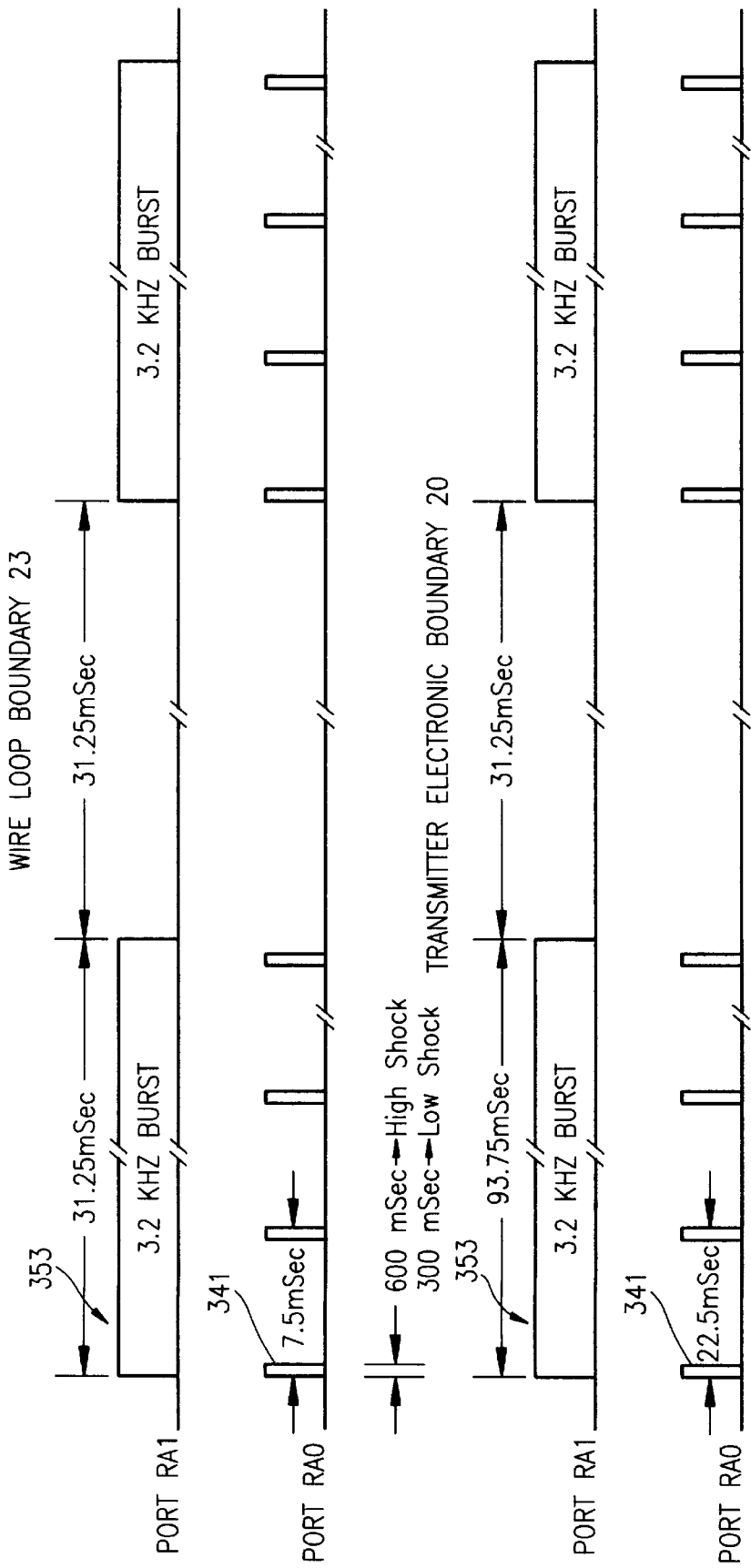
FIG. 10 is a timing diagram illustrating the administration of aversive stimuli by the control and stimulation subsystem of FIG. 9.

When microprocessor 281 determines a shock is to be administered, mutually spaced bursts of appropriately timed, logic level, shock pulses 341 are generated by microprocessor 281 at output port RA0 as illustrated in FIG. 10. Each shock pulse 341 drives MOSFET 336 into conduction delivering a corresponding pulse of high current to primary winding 332 which drives transformer 331 into saturation. When each shock pulse 341 terminates, MOSFET 336 is rapidly cut off, abruptly terminating the flow of current through primary winding 332 resulting in generation of a high kickback voltage across secondary winding 334 and hence, electrodes 316 and 317. The duration of each shock pulse 341, the intervals between pulses 341, the duration of each burst of shock pulses 341 and the intervals between such bursts are all determined by microprocessor 281 under program control.

For generating aversive audio stimuli, subsystem 130 includes an audio transducer 314 is connected electrically in series to circuit ground by way of a driver circuit 347 which consist of a pair of FET's 349 and 350 connected mutually in parallel with one another as shown. The drains of FET's 349 and 350 are each connected to audio transducer 314 while their source terminals are each connected to the positive side of battery 138. The gates of FET's 349 and 350 are connected directly to one another and are each connected to I/O port RA1 of microprocessor 281 by way of a resistor 351. Port RA1 is configured as an output port which is normally maintained at a high logic level state by microprocessor 281 and pull-up resistor 352 connected between I/O port RA1 and positive supply rail 283. This holds FET's 349 and 350 in a cutoff state preventing audio transducer 314 from sounding. When microprocessor 281 determines that an audio tone is to be delivered, microprocessor 281 generates an audio drive signal 353 by toggling output port RA1 at an audio rate, such as 3.2 KHz, in thirty to ninety millisecond bursts at mutually spaced intervals of about thirty milliseconds.

A parts listing for the circuitry of receiver/stimulator 14 including the receiver 133 of FIG. 7, the quadrature demodulator 136 of FIG. 8 and the control and stimulation subsystem 130 of FIG. 9, is set forth below in Table 2.

TABLE 2

| Reference | Description | Quantity | Manufacturer | Manufacturer's Part Number |
|---|---|---|---|---|
| 331 | transformer | 1 | Microcomp Inc. (Beaverton OR) | 129-3141-EA |
| 192 | 22 mH inductor | 1 | J W Miller Magnetics (Gardenia CA) | 9250-226 |
| 140, 349, 350 | P channel JFET | 3 | Zetex Inc. (Commack NY) | BSS84ZX |
| 138 | 1300 mAH battery | 1 | Duracell USA (Bethel CT) | DL123A |

TABLE 2-continued

| Reference | Description | Quantity | Manufacturer | Manufacturer's Part Number |
|---|---|---|---|---|
| 331 | DPDT switch | 1 | | GT13MABKE |
| 308 | Light emitting diode | 1 | Panasonic industrial Co. (Div. of Matsushita Electric Corp. of America) (Secaucus NY) | LN28RP |
| U33A, U33B, U35A | Dual D-type flip-flop | 2 | Motorola, Inc. (Schaumburg IL) | MC14013BCD |
| U36A, U36B | Exclusive NOR gate | 1 | Motorola, Inc. (Schaumburg IL) | MC14077BCD |
| U31A–U31F | HEX Schmitt-trig inverter | 1 | Motorola, Inc. (Schaumburg IL) | MC14106BCD |
| 238 | 10 pF, 603 Pkg., .5%, capacitor | 1 | Surface Mountable Electronic Components, Inc. (Austin TX) | MCCE100D1NO-T1 |
| 189, 220 | 100 pF, 603 Pkg., 5%, capacitor | 2 | Surface Mountable Electronic Components, Inc. (Austin TX) | MCCE101J1NO-T1 |
| 180, 197, 210, 222 | 1000 pF, 603 Pkg., 10%, capacitor | 4 | Surface Mountable Electronic Components, Inc. (Austin TX) | MCCE102K1NR-T1 |
| 166 | .01 uF, 603 Pkg., 10%, capacitor | 1 | Surface Mountable Electronic Components, Inc. (Austin TX) | MCCE103K1NR-T1 |
| 149, 219, 207, 190, 285, 152, 142 | .1 uF, 603 Pkg., 5%, capacitor | 8 | Surface Mountable Electronic Components, Inc. (Austin TX) | MCCE104Z1NV-T1 |
| 287, 288 | 220 pF, 603 Pkg., 5%, capacitor | 2 | Surface Mountable Electronic Components, Inc. (Austin TX) | MCCE221J1NO-T1 |
| 176 | 33 pF, 603 Pkg., 5%, capacitor | 1 | Surface Mountable Electronic Components, Inc. (Austin TX) | MCCE330J1NO-T1 |
| 271, 273 | 560 pF, 603 Pkg., 5%, capacitor | 2 | Surface Mountable Electronic Components, Inc. (Austin TX) | MCCE561J1NR-T1 |
| 194 | 6800 pF, 603 Pkg., 5%, capacitor | 1 | Surface Mountable Electronic Components, Inc. (Austin TX) | MCCE682J1NR-T1 |
| 236 | 10 Meg ohm, 805 Pkg., 5%, resistor | 1 | Surface Mountable Electronic Components, Inc. (Austin TX) | MCR03-EZH-J-106 |
| 145 | 100 ohm, 603 Pkg., 5%, resistor | 1 | ROHM Co., LTD. (Antioch TN) | MCR03-EZH-JW-101 |
| 309 | 2.7 Kohm, 603 Pkg., 5%, resistor | 1 | ROHM Co., LTD. (Antioch TN) | MCR03-EZH-JW-272 |
| 284 | 51 ohm, 603 Pkg., 5%, resistor | 1 | ROHM Co., LTD. (Antioch TN) | MCR03-EZH-JW-510 |
| 169, 183, 200, 212 | Low noise signal transistor | 4 | ROHM Co., LTD. (Antioch TN) | MMST5089 |
| 315 | 3.2 KHz piezo transducer | 1 | Star Micronics Inc./OEM (Piscataway NJ) | MUT-01A |
| 304 | Jumper | 1 | N/A | N/A |
| 193, 159 | .01 uF, 1206 Pkg., 5%, plastic capacitor | 2 | NIC Components Corp. (Amityville NY) | NSPC103J50TRB2 |
| 160 | .01 uf, 1206 Pkg., 5% (select in test) | 1 | NIC Components Corp. (Amityville NY) | NSPC103J50TRB2 |
| 158 | 0.047 uf, 1206 Pkg., 5%, plastic capacitor | 1 | NIC Components Corp. (Amityville NY) | NSPC473J16TR83 |
| 156, 157 | 12 mH Inductor | 2 | Coilcraft Inc. (Cary IL) | PCH-27-126 |
| 281 | 8 bit CMOS microprocessor | 1 | Microchip Technology, Inc. (Chandler AZ) | PIC16LC84-XT/SO |
| 233 | 32.768 KHz crystal | 1 | Raltron (Miami FL) | R38-32.768 KHz |
| 172, 186, 204, 216, 227 | 100 Kohm, 603 Pkg., 5%, resistor | 5 | Surface Mountable Electronic Components, Inc. (Austin TX) | RC73L2X100KOH MJT |
| 352 | 10 Kohm, 603 Pkg., 5%, resistor | 1 | Surface Mountable Electronic Components, Inc. (Austin TX) | RC73L2X10KOH MJT |
| 171, 185, 203, 215, | 180 Kohm, 603 Pkg., 5%, resistor | 4 | Surface Mountable Electronic Components, Inc. (Austin TX) | RC73L2X180KOH MJT |
| 296, 300, 351, 339, 305, 297, 306 | 1 Kohm, 603 Pkg., 5%, resistor | 7 | Surface Mountable Electronic Components, Inc. (Austin TX) | RC73L2X1KOHM JT |
| 141 | 1 Meg ohm, 603 Pkg., 5%, resistor | 1 | Surface Mountable Electronic Components, Inc. (Austin TX) | RC73L2X1MOH MJT |
| 217, 205, 187, 173 | 20 Kohm, 603 Pkg., 5%, resistor | 4 | Surface Mountable Electronic Components, Inc. (Austin TX) | RC73L2X20KOH MJT |
| 270, 272 | 270 Kohm, 603 Pkg., 5%, resistor | 2 | Surface Mountable Electronic Components, Inc. (Austin TX) | RC73L2X270KOH MJT |
| 161 | 3.3 Kohm, 603 Pkg., 5%, resistor | 1 | Surface Mountable Electronic Components, Inc. (Austin TX) | RC73L2X3.3KOH MJT |
| 237, 304, | 470 Kohm, 603 Pkg, | 5 | Surface Mountable | RC73L2X470KOH MJT |

TABLE 2-continued

| Reference | Description | Quantity | Manufacturer | Manufacturer's Part Number |
|---|---|---|---|---|
| 301, 302, 298 | 5%, resistor | | Electronic Components, Inc. (Austin TX) | |
| 174, 188, 206, 218 | 7.5 Kohm, 603 Pkg., 5%, resistor | 4 | Surface Mountable Electronic Components, Inc. (Austin TX) | RC73L2X7.5KOHMJT |
| 224 | 130 kohm, 603 Pkg., 5%, resistor | 1 | Surface Mountable Electronic Components, Inc. (Austin TX) | RC73M2X130KOHMJT |
| 225 | 270 kohm, 603 Pkg., 5%, resistor | 1 | Surface Mountable Electronic Components, Inc. (Austin TX) | RC73M2X270KOHMJT |
| 336 | Power Mosfet | 1 | Harris Semiconductors (Melbourne FL) | RFD12N06RLE |
| 307 | 2.35 V | 1 | | S-8052ALO-LG-S |
| 299 | Motion switch | 1 | Sensormatic Electronics Corp. (Deerfield Beach FL) | |
| 139 | 100 uF SMD D size tantalum capacitor | 1 | Surface Mountable Electronic Components, Inc. (Austin TX) | TCC100M4D |
| 148, 282 | 33 uF SMD C size tantalum capacitor | 2 | Surface Mountable Electronic Components, Inc. (Austin TX) | TCC33M4C |
| 286 | Crystal $C_{load}$ = 12 pF | 1 | Toko American Inc. (Mount Prospect IL) | TK9940 |

As FIG. 10 further illustrates, system 10 also permits aversive stimulation to be varied depending on the location of the boundary being encroached upon. The code generator 89 of each transmitter 17 can be configured as explained above to transmit an RF signal 18 bearing any one of nearly sixty five thousand unique digital codes. As will be explained shortly, a unique code can also be assigned to the RF signal 18 emitted by wire loop 22. By assigning different codes to some or all of the transmitters 17 as well as the wire loop 22, the wire loop boundary 23 can be distinguished from any of the electronic boundaries 20 associated with transmitters 17. In addition, groups and/or individual ones of boundaries 20 can also be distinguished from one another as may be desired. The operating program associated with microprocessor 281 determines which particular one of a plurality of possible digital codes is represented by the code signal 275 and quadrature code signal 276 applied to input ports RB2 and RB3, respectively. Microprocessor 281 then drives output ports RA0 and/or RA1 in a particular preprogrammed manner which the operating program determines corresponds to a particular one of such codes. For example, it may be desired to deliver a stronger aversive stimulus in response to an encroachment of the perimeter wire loop boundary 23. As FIG. 10 illustrates, microprocessor 281 achieves this by delivering shock pulses 341 at port RA0 at a repetition rate of one shock pulse 341 about every seven point five milliseconds (7.5 mSec) in the event of encroachment of wire loop boundary 23. In contrast, shock pulses 341 are delivered at intervals of twenty two point five milliseconds (22.5 mSec) in the event of encroachment of an electronic boundary 23 associated with a transmitter 17. As FIG. 10 further illustrates, the preferred embodiment of system 10 delivers audio stimulation in ninety millisecond (90 mSec) bursts when an electronic boundary 20 established by a transmitter 17 is encroached upon but in only thirty millisecond (30 mSec) bursts when wire loop boundary 23 is encroached upon. Preferably, such audio bursts are loud; on the order of about eighty decibels (80 dBA). Other alternatives are also possible. For example, to avoid disturbing the human occupants of dwelling 13, microprocessor 281 can be programmed to provide audio stimulation of a form less noticeable to humans upon recognition of a digital code corresponding to one of the transmitters 17 located inside dwelling 13 such as those located at the foot of stairway 29 and/or the entrance to room 30. This can be readily achieved by programming microprocessor 281 to provide an audio drive signal 353 consisting of fewer and/or shorter bursts and/or one at an elevated frequency inaudible to humans but capable of being heard by animal 12'.

Microprocessor 281 is preferably programmed to strictly limit the amount of time any form of stimulation can be administered pursuant to any single boundary encroachment episode or series of episodes occurring very closely in time to one another. This can readily be done using a timer implemented in software or a counter which limits the number of times a stimulation loop is executed. This will ensure that the animal 12 will not be traumatized if for any reason the animal does not or is unable to promptly withdraw from a boundary 20 or 23 to terminate all stimuli by the animal's own volition. Microprocessor 281 is also preferably programmed to terminate all stimuli substantially immediately upon the withdrawal of the animal from a boundary 20 or 23. Doing so not only serves to minimize any discomfort to animal 12, but also helps avoid the possibility that the animal 12 will associate the stimulus with a behavior or condition other than its encroachment of the boundary 20 or 23. Before explaining the operation of system 10, and in particular the programming of microprocessor 281 in further detail, the structure and operation of wire loop unit 21 will now be described with reference to FIG. 11 and FIG. 12.

Wire loop unit 21 includes a pair of five-way binding posts 360 and 361 connectable to opposite ends of wire loop 22 as shown. Wire loop unit 21 derives its normal operating power from an A.C. power outlet (not shown) by way of a conventional step-down transformer (not shown) which delivers 6 volts A.C. by way of a female plug connector (not shown) connectable to a mating male input jack 366. Jack 366 is connected to a full wave rectifier 368 by way of a one-half half ampere resettable fuse 369. The D.C. output side of rectifier 368 establishes an unregulated 6 volt D.C. supply rail 370 which is connected in parallel with a filter capacitor 371 and a six volt battery 372. Battery 372 which may suitably comprise a six volt gel cell type battery serves as a backup power source capable of operating wire loop unit 21 for sustained periods of time in the event of an A.C. power outage. The unregulated six volt D.C. supply rail 370 is connected in turn to the input of a five volt, voltage regulator 381. The output side of five volt regulator 381 is paralleled with a filter capacitor 386 to establish a regulated five volt D.C. supply rail 388.

A crystal 395 connected to a NAND gate U43A by way of a pair of resistors 397, 398 and a pair of capacitors 399, 400 generates a 32.768 KHz signal at the output of NAND gate U43A. The output of NAND gate U43A is connected to the input at pin 10 of a twelve stage ripple counter 402 as well as to the input at pin 8 of a NAND gate U43C and to the external oscillator input, OSC2 of a programmed microprocessor 404. Ripple counter 403 operates as a frequency divider and includes an output, Q2 at pin 7, which provides a signal at the RF carrier frequency of 8.19 KHz. Ripple counter also includes an output, Q11 at pin 15 which generates a signal which oscillates at about 16 Hz and an output Q12 at pin 1 which oscillates at about 8 Hz.

Microprocessor 404 internally includes sufficient program memory and data memory as well as an arithmetic and logic unit, input/output facilities, a data bus, an address bus and other conventional timing and control facilities. Microprocessor 404 is connected between supply rail 388 and circuit ground by way of a pair of power supply inputs identified as VDD and VSS, respectively and includes a reset input at pin 4 which is tied to supply rail 388 by way of a resistor 405. Microprocessor 404 further includes a real time clock/counter (RTCC) input at pin 3 which is unused and is connected to circuit ground. Microprocessor 404 is programmed in the manner set forth in relevant portions of the Software Appendix and includes a set of four bidirectional input/output (I/O) ports located at pins 17, 14, 1 and 2 which are identified as ports RA0, RA1, RA2 and RA3, respectively. Ports RA0, RA1, RA2 and RA3 are each configured as input ports. Input port RA0 is connected to supply rail 388 by way of a pull-up resistor 406 and is also selectively connectable to circuit ground by way of switch 407 which forms part of a manually operable, quad, dual-inline-packaged (DIP) switch unit 408. In a similar fashion, output ports RA1, RA2 and RA3 of microprocessor 404 are connected to supply rail 388 by way of respective resistors 409, 410 and 411 and are selectively connectable to circuit ground by way of switches 412, 413 and 414, respectively. Microprocessor 404 also includes a pair of bidirectional input/output (I/O) ports configured as output ports: RB1 at pin 7 and RB2 at pin 8. Port RB1 is connected to a reset (RST) input at pin 11 of ripple counter 403. Output port RB2 is connected to an input pin, pin 1, of an inverter U42A as well as to the control input (E) at pin 5 of an analog switch U48A.

The positions of switches 407, 412, 413 and 414 of switch unit 408 control the logic level of the voltages at input ports RA0, RA1, RA2 and RA3. By reading states of those inputs, the operating program stored within microprocessor 404 determines which one of up to sixteen preprogrammed, sixteen bit (four digit hexidecimal) codes microprocessor 404 will repetitively present at output its port RB2. Each of these codes is analogous to the modulation data 92 delivered by the code generator 89 associated with each transmitter 17. In a manner which will be explained, the digital code presented at port RB2 of microprocessor 404 is imparted to the RF signal 18 emitted by wire loop 22 to permit receiver/stimulator unit 14 to distinguish wire loop boundary 23 from a boundary 20 established by a transmitter 17.

Figure 12:
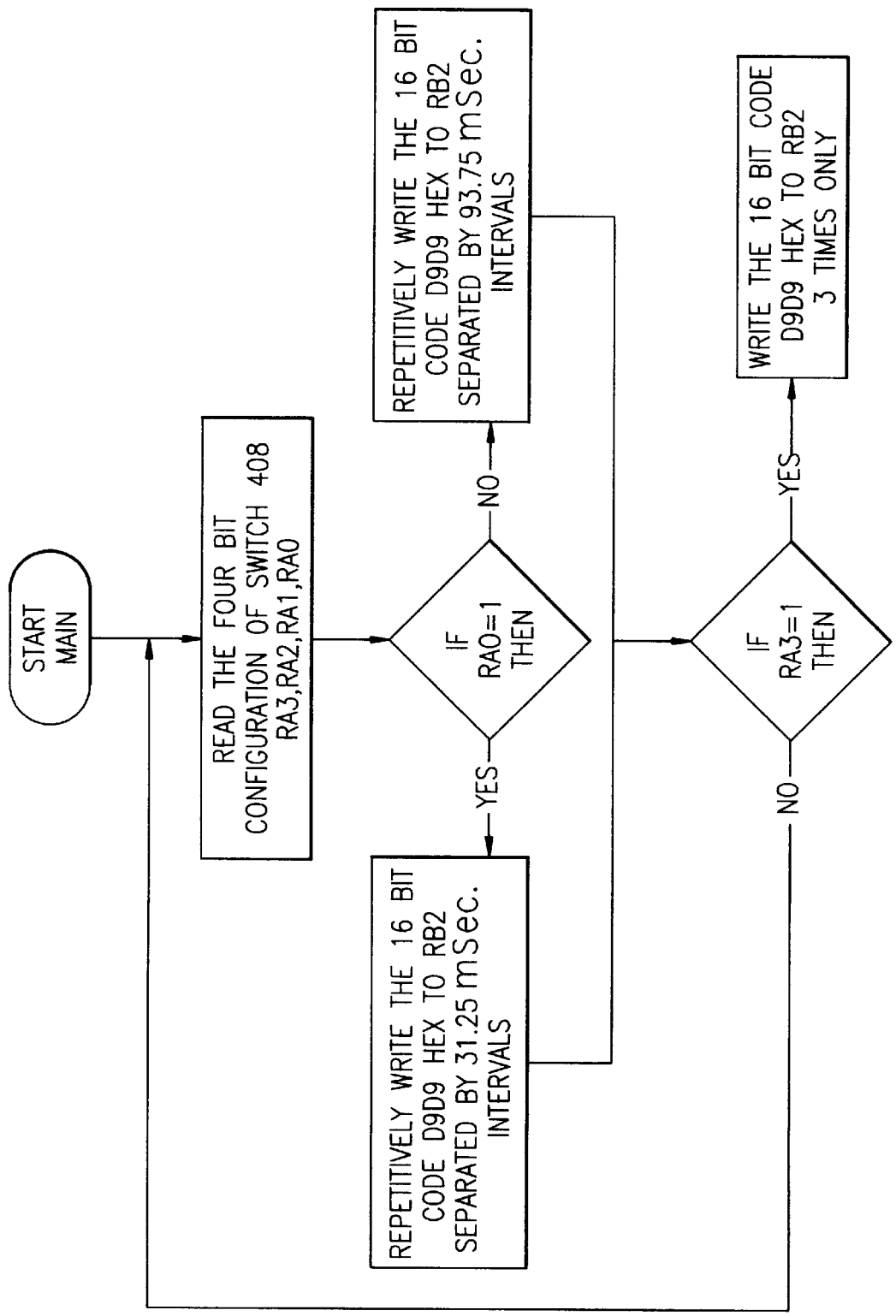
FIG. 12 is a flowchart illustrating the programming of the microprocessor of the wire loop unit of FIG. 11A and FIG. 11B.

As the flowchart of FIG. 12 illustrates, microprocessor 404 reads input ports RA0, RA1, RA2 and RA3 immediately following power-up to determine the configuration of switch unit 408. Opening switches 407 and 414 while closing switches 412 and 413 cause microprocessor 404 to repetitively deliver the hexidecimal code "D9D9" at port RB2. Each bit of the code appears at port RB2 for about 1.953 mSec before being replaced by the next succeeding bit of the code. Thus, the entire sixteen bit code is presented over an interval of about thirty-one and one-quarter milliseconds (31.25 mSec). Once the entire code has been presented, port RB2 assumes a low logic level for an inactive interval of about thirty-one and one-quarter milliseconds (31.25 mSec) before repeating the code. This cycle repeats as long as wire unit 21 remains energized or until the configuration of switch unit 408 is changed. Alternatively, as FIG. 12 further shows, in the event switches 407, 412, 413 and 414 all in an open position, microprocessor 404 repetitively generates the hexidecimal code "F590" at output port RB2 once every one hundred twenty five milliseconds (125 mSec). Since the code itself is presented over an interval of thirty-one and one-quarter milliseconds (31.25 mSec), an inactive interval of ninety-three and three-quarters milliseconds (93.75 mSec) elapses before this code begins to repeat. Under such conditions, the output of port RB2 of microprocessor 404 is virtually identical to the modulation data signal 92 associated with one of transmitters 17 and the RF signal 18 emitted by wire loop 22 cannot be distinguished by receiver/stimulator unit 14 from a similarly encoded RF signal 18 emanating from a transmitter 17. This capability is useful in situations where it is not desired to distinguish wire loop boundary 23 from an electronic boundary 20.

As a convenient means of verifying the operability of wire loop unit 21, a special testing mode can be established by closing switch 414 of switch unit 408. Closing switch 414 causes the voltage at input port RA3 to assume a "high" or logic level "1" state. As FIG. 12 shows, microprocessor 404 reads port RA3 and determines whether or not it is in a high logic level state. If not, microprocessor 404 responds by determining further action based on the state of port RA0. If port RA3 is at a logic "1" state, however, microprocessor 404 responds by writing the hex code "D9D9" to output port RB2 three times only. Provided wire loop unit 21 and receiver/stimulator unit 14 are working properly, this results in delivery of a readily recognizable brief "burst" of audio stimulation from the audio transducer 315 of receiver/stimulator unit 14.

With reference once again to FIG. 11A and FIG. 11B, it can be seen that output Q2 at pin 7 of ripple counter 403 is connected by way of a resistor 421 to a tank circuit 422 which is coupled to ground by way of a capacitor 424. Tank circuit 422 is tuned to resonate at the RF carrier frequency of 8.192 KHz and consists of an inductor 426 connected in parallel with a capacitor 427. Tank circuit 422 resonates in response to the 8.192 KHz delivered from output Z2 at pin 7 of ripple counter 403 to generate a sinusoidal 8.192 KHz RF carrier signal 430.

Wire loop unit 21 modulates RF carrier signal 430 according to the digital code generated at output port RB2 at pin 8 of microprocessor 404 using binary phase shift keying (BPSK). To do so, wire loop unit 21 is provided with an inverter U42A, and a pair of amplifiers U44A and U44B whose outputs are connected respectively to the line side (Y) of a pair of analog switches 433 and 434, respectively. Tank circuit 422 is connected as shown to the noninverting input of amplifier U44B which is configured as a unity gain buffer by virtue of a connection between its output and its inverting input. The output of amplifier U44B thus delivers a sinusoidal RF carrier signal at zero phase shift ($\phi=0°$) to the line side (Y) of analog switch 433. In a complementary fashion, a sinusoidal RF carrier signal at a relative positive phase shift of ninety degrees ($\phi=+90°$) is delivered to the load side (Y) of analog switch 434. This is achieved by connecting tank circuit 422 by way of a coupling capacitor 436 and a resistor 437 to the noninverting input of amplifier U44A. Amplifier U44A has its inverting input connected to the center of a voltage divider formed of a pair of resistors 439 and 440 connected in series with one another between supply rail 388 and circuit ground to establish an offset voltage for amplifier U44A. Amplifier U44A is configured as a unity gain, inverting amplifier by virtue of a resistor 441 connected between its output and its non-inverting input as shown. The output of amplifier U44A thus delivers to the line side (Y) of analog switch 434 a sinusoidal RF carrier frequency signal bearing a positive ninety degree phase shift to the corresponding signal present at the line side (Y) of analog switch 433. Analog switches 433 and 434 operate as normally open relays which close in response to application of a logic level signal at their respective control inputs (E) which are located at pins 5 and 13 of switches 433 and 434, respectively.

In order to generate a BPSK signal modulated with the code generated at output port RB2 at pin 8 of microprocessor 404, port RB2 is connected directly to the control input (E) at pin 13 of analog switch 434 and is connected by way of an inverter, U42A to the control input (E) at pin 5 of analog switch 433. Inverter U42A serves to ensure that analog switches 433 and 434 are never both open or both closed at the same time. When the code signal appearing at output port RB2 at pin 8 of microprocessor 404 is at a low logic level (i.e., data bit=0), analog switch 434 opens and analog switch 434 closes. This causes the RF carrier signal at zero degrees phase shift ($\phi=0°$) to be applied to the load side (Z) of analog switch 433. Conversely, when the code signal appearing at output port RB2 at pin 8 of microprocessor 404 is at a high logic level (i.e., data bit=1) analog switch 433 opens and analog switch 434 closes. This causes the RF carrier signal at a positive ninety degree phase shift ($\phi=+90°$) to be applied to the load size (Z) of analog switch 434.

To facilitate adjustment of the effective range of the RF signal 18 emitted by wire loop 22 and thus, the effective width of wire loop boundary 23, wire loop unit 21 includes a potentiometer 444 which is connected to a limiting resistor 445 as shown. Resistor 445 is connected at a summing junction in series to the load side (Z) of analog switch 434 by way of a coupling capacitor 447 and a series resistor 448. Resistor 445 is similarly connected in series with the load side (Z) of analog switch 433 by way of a coupling capacitor 449 and a series resistor 450. The common connection point of resistors 448 and 450 defines a summing junction 451 at which the outputs of analog switches 433 and 434 are effectively summed to define an 8.192 KHz sinusoidal BPSK signal whose instantaneous phase is correlated to the digital code repetitively presented at output port RB2 of microprocessor 404. By adjusting potentiometer 444, the amplitude of the BPSK signal applied to the wiper of potentiometer 444 from summing junction 451 by way of resistor 445 can be adjusted.

The wiper of potentiometer 444 is connected to the load side (Y) of an analog switch 453 whose load side (Z) defines a node 455. In normal operation, analog switch 453 remains closed so long as wire loop 22 remains continuous thereby delivering the aforementioned BPSK signal to node 455. Node 455 is in turn connected to the non-inverting input of an amplifier U47 by way of a coupling capacitor 459. The output of amplifier U47 is connected in series with wire loop 22 by way of a coupling capacitor 461 and a current limiting resistor 462. Resistor 462 is connected to the binding post 360 connected to one end of wire loop 22. The opposite end of wire loop 22 is connected to circuit ground by way of binding post 361. A metal oxide varistor 464 is connected between binding post 360 and circuit ground to protect wire loop unit 21 from any high voltage transients which might be picked up by wire loop 22 in the event of a lightning strike. Amplifier U47 serves to amplify the sinusoidal BPSK signal whose instantaneous phase varies in accordance with the code data generated by microprocessor 404 at output port RB2. This amplified BPSK signal is then applied to wire loop 22 which serves as a transmitting antenna which broadcasts this digitally encoded BPSK signal as an RF signal 18. While the RF signal 18 emitted by wire loop 22 has a continuous sinusoidal component, the encoded portion thereof continuously repeats following brief delay intervals of about thirty-one and one-quarter milliseconds (31.25 mSec). When potentiometer 444 is set such that RF signal 18 has a range establishing a wire loop boundary 23 extending radially from wire loop a distance of about six feet, an RMS current of only about thirteen milliamperes flows through wire loop 22. Adjusting potentiometer 444 to increase that distance to about twenty feet requires an RMS current of only about forty-four milliamperes. This contrasts very favorably to the AM wire loop boundary systems of the prior art in which currents on the order of about eight hundred milliamperes were required to be circulated through a wire loop to establish an AM boundary field extending radially six to eight feet from the wire loop. Due to the dramatic reduction in operating current required using the invention, back-up battery 372 allows wire loop unit 21 to operate and wire loop boundary 23 to be maintained fully effective for sustained periods of time in the event of an A.C. power failure.

The continuity of wire loop 22 is monitored by a break detector circuit 466 which is connected to wire loop 22 by way of a diode 468 whose cathode is connected to binding post 360 and whose anode is connected to the center of a voltage divider consisting of a pair of resistors 469 and 470. Resistor 469 serves as a pull-up resistor and is connected to positive supply rail 388 as shown. As long as wire loop 22 remains continuous, the anode of diode 468 remains at a voltage only slightly above circuit ground. In the event wire loop 22 breaks however, the voltage at the anode of diode 468 rises to charge a capacitor 471 which is connected in series between resistor 470 and circuit ground.

The voltage across capacitor 471 is monitored by an operational amplifier U44C configured as a comparator. The non-inverting input of amplifier U44C is connected to the positive side of capacitor 471 by way of a resistor 473 and is connected to the output of amplifier U44C through a feedback resistor 475. The inverting input of amplifier U44C is connected to the center of a voltage divider consisting of a pair of resistors 477 and 478 connected in series with one another between supply rail 388 and circuit ground as shown. Resistors 477 and 478 serve to maintain the inverting input of amplifier U44C at a predetermined threshold voltage. Amplifier U44C continuously compares that threshold voltage to the voltage at its non-inverting input to define a break indicating signal at a "BREAK" terminal 480 at the output of amplifier U44C. In normal operation, wire loop 22 remains unbroken and the voltage across capacitor 471 remains sufficiently below the constant threshold voltage at the inverting input of amplifier U44C to cause amplifier U44C to hold the voltage at BREAK terminal 480 at a low logic level voltage. In the event the electrical continuity of wire loop 22 is broken however, the voltage at the non-inverting input of amplifier rises sufficiently to cause the output amplifier U44C at BREAK terminal 480 to assume a high logic level voltage.

Wire loop unit 21 includes an audio transducer 483 and a light emitting diode (LED) 484 which provide audible and visual indications, of a break in wire loop 22. For that purpose, BREAK terminal 480 is connected by way of a resistor 485 to the inverting input of an amplifier U44D. The non-inverting input of amplifier U44D is connected to a voltage divider network consisting of a pair of resistors 486 and 487 and a capacitor 488 connected as shown between supply rail 388 and circuit ground to establish a threshold voltage. The inverting input of amplifier U44D is also connected to the 8 Hz output Q12 at pin 12 of ripple counter 403 by way of a resistor 490. The output of amplifier U44D is connected to the inputs of a pair of hysteresis inverters U42B and U42C whose outputs are paralleled with one another and connected to the input of audio transducer 483. The outputs of inverters U42B and U42C are also connected to the inputs of a second pair of inverters U42F and U42D whose outputs are likewise paralleled and connected by way of a current limiting resistor 493 and LED 484 to circuit ground.

Provided loop wire 22 remains continuous, the voltage at the inverting input of amplifier U44D always remains below the threshold voltage applied to its non-inverting input. However, in the event of a break in wire loop 22, the voltage at BREAK terminal rises. The voltage at the non-inverting terminal of amplifier U44D is then biased sufficiently to cause the output of amplifier U44D to toggle at an 8 Hz rate. Driving amplifiers U42B, U42C and U42F, U42D cause audio transducer 483 to sound and LED 484 to flash at a corresponding rate to audibly and visibly signal the breakage of wire loop 22.

Since it is not an AM signal, the RF signal 18 normally emitted by wire loop 22 cannot be detected by a conventional AM radio to locate the site of a break in wire loop 22. To permit a user to locate a break in wire loop 22 using an AM radio, wire loop unit 21 includes facilities for selectively applying an AM signal to wire loop in the event such a break is detected by break detector 466. For this purpose, wire unit 21 includes a NAND gate U43C having a first input connected to BREAK terminal 480. NAND gate U43C includes a second input connected to the output of NAND gate U43A to receive the 32.768 KHz signal described above. The output of NAND gate U43C is thus normally at a constant low logic level state but oscillates at the rate of 32.768 KHz in the event BREAK terminal 480 assumes a high logic level due to a break in wire loop 22. The output of NAND gate U43C is connected to a first input of a NAND gate U43B. NAND gate U43B also includes a second input which is connected to output Q11 at pin 15 of ripple counter 403 to receive the 16 Hz signal described above. Consequently, the output of NAND gate U43B will normally remain in a constant low logic level state but will take the form of bursts of 32.768 oscillations repeating at a 16 Hz rate in the event BREAK terminal 480 assumes a high logic level indicating a break in wire loop 22. It will immediately be recognized that the pulsating 32.768 KHz signal generated by NAND gate U43B in the event of a break in wire loop 22 constitutes a 32.768 KHz AM signal at one hundred percent (100%) modulation.

The output of NAND gate U43B is connected by way of a coupling capacitor 495 to the center of a voltage divider consisting of a pair of resistors 496 and 497 connected in series with one another between positive supply rail 388 and circuit ground. Resistors 496 and 497 serve to apply a 2.5 volt D.C. offset to the AM signal delivered from the output of NAND gate U43B. The junction between resistors 496 and 497 is connected to the line side (Y) of an analog switch 499. Analog switch 499 includes a control terminal (E) which is connected directly to BREAK terminal 480. The load size (Z) of analog switch 499 is connected to node 455. The control terminal (E) of analog switch 453 is connected to BREAK terminal 480 by way of an inverter U42E. Since the voltage at BREAK terminal 480 remains in a low logic level state as long as wire loop 22 remains continuous, analog switch 499 normally remains open while inverter U42E apples a high logic signal to the control input (E) at pin 8 of analog switch 453 thereby maintaining analog switch 453 closed as described earlier. Under such normal operating conditions, analog switch 453 serves to apply the BPSK signal received by the wiper of potentiometer 444 by way of resistor 445 from node 451 to amplifier U47 which serves to deliver an amplified BPSK signal to wire loop 22 which emits a correspondingly encoded RF signal 18.

In the event of a break in wire loop 22, however, BREAK terminal assumes a high logic level which causes analog switch 453 to open thereby terminating the application of the amplified BPSK signal to wire loop 22. At substantially the same time analog switch 453 opens, analog switch 499 closes thus delivering the AM signal described above to node 455. This AM signal is then amplified by amplifier U47 and applied to wire loop 22 by way of coupling capacitor 461 and resistor 462. Being alerted to the breakage of wire loop 22 by the signals provided by audio transducer 483 and LED 484, a user may then use a conventional AM radio to accurately locate the site of the break in wire loop 22. This can be done by carrying an AM radio along the path of wire loop 22 and identifying the site at which distinctive 16 Hz pulses are heard at a maximum audio volume.

Figure 11A:
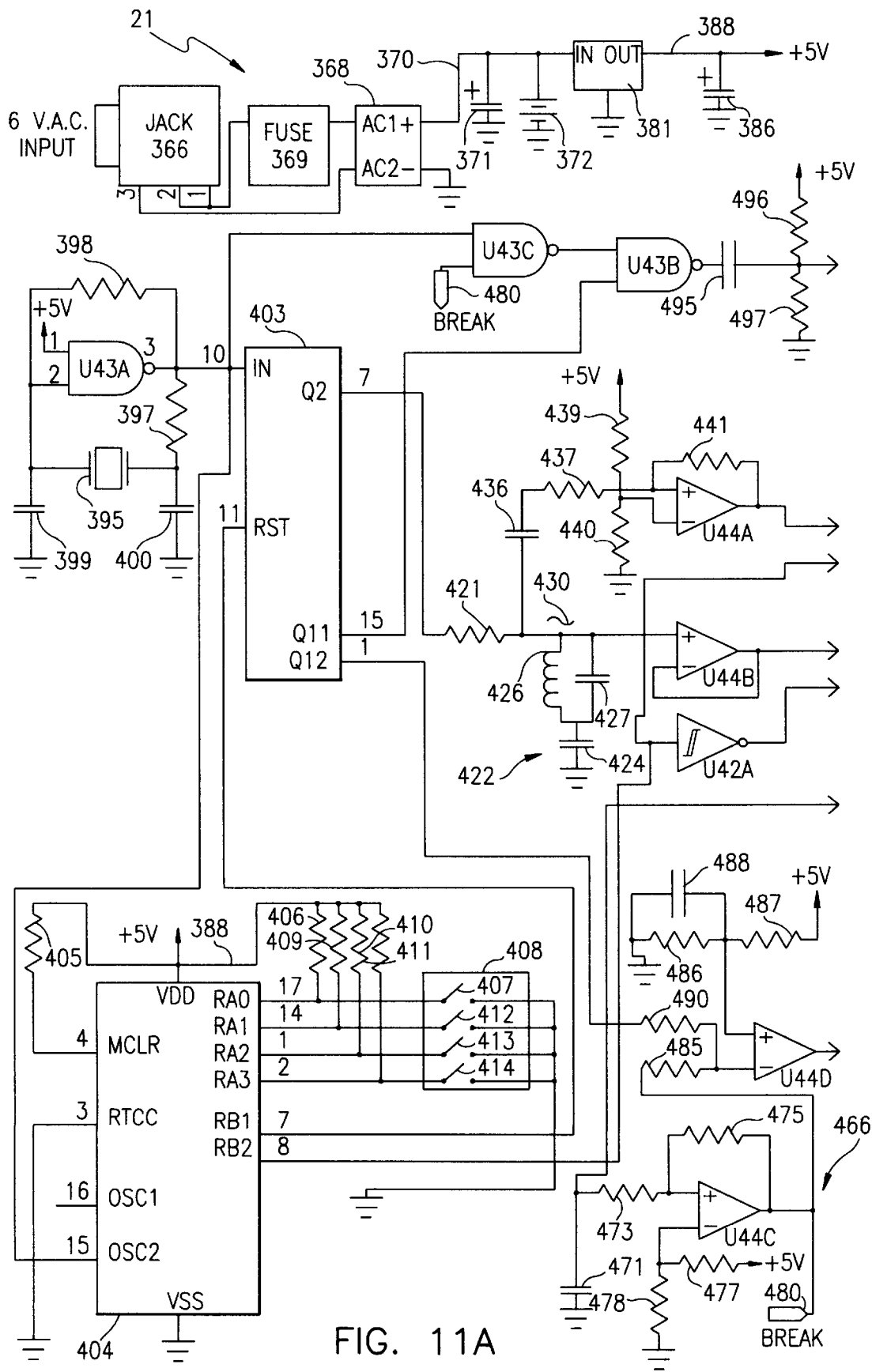
FIG. 11A is a circuit schematic illustrating the wire loop unit of FIG. 1.

A parts listing for the circuitry of the wire loop unit 21 of FIG. 11A and FIG. 11B is set forth below in Table 3.

TABLE 3

| Reference | Description | Quantity | Manufacturer | Manufacturer's Part Number |
|---|---|---|---|---|
| 464 | Metal Oxide Varistor | 1 | Panasonic Industrial Co. (Div. of Matsushita Electric Corp. of America) (Secaucus NY) | ERZ-VO5D39 |
| 468 | Axial diode | 1 | Diodes Inc. (Westlake Village CA) | 1N4148 |
| 462 | 50 Ohm leaded, 5%, resistor | 1 | ROHM Co., LTD. (Antioch TN) | 50E-ND |
| 360, 361 | Two terminal mounting post | 1 | Radio Shack | 2741-621 |
| 444 | 10 Kohm potentiometer | 1 | Clarostat Sensors & Controls (El Paso TX) | 392JA103 |
| 484 | Light emitting diode | 1 | Interconnect Devices Inc. (Kansas City KS) | 5100H5 |
| 426 | 8.2 mH inductor | 1 | J W Miller Magnetics (Gardenia CA) | 5300-48 |
| U43 | Quad 2-input NAND gate | 1 | National Semicondutor Corp. (Santa Clara CA) | CD4011BM |
| 403 | 12-stage binary counter | 1 | National Semiconductor Corp. (Santa Clara CA) | CD4040BCM |
| 408 | Four position DIP switch | 1 | CTS Corporation (Elkhart IN) | CTS 206-4 |
| 368 | Fullwave diode bridge | 1 | DIODES INC | DB102-ND |
| 371, 461 | 470 uF leaded capacitor | 2 | Panasonic Industrial Co. (Div. of Matsushita Electric Corp. of America) (Secaucus NY) | ECE-A1EFS471 |
| 386 | 10 uF 16VDC capacitor | 1 | Panasonic Industrial Co. (Div. of Matsushita Electric Corp. of America) (Secaucus NY) | ECS-F1CE106K |

TABLE 3-continued

| Reference | Description | Quantity | Manufacturer | Manufacturer's Part Number |
|---|---|---|---|---|
| 483 | 3.7 KHz piezo trancsducer | 1 | Panasonic Industrial Co. (Div. of Matsushita Electric Corp. of America) (Secaucus NY) | EFB-CB37C11 |
| U44A–U44D | Quad Low power op amp | 1 | National Semiconductor Corp. (Santa Clara CA) | LM324AM |
| U47 | amplifier | 1 | National Semiconductor Corp. (Santa Clara CA) | LM386 |
| 38 | 3-terminal, 5 volt regulator, 1 Amp | 1 | National Semiconductor Corp. (Santa Clara CA) | LM7805CT |
| 372 | Battery, 6 Volt gel cell | 1 | | |
| 447, 449 | 1000 pF, 1206 Pkg., 5%, capacitor | 2 | Surface Mountable Electronic Components, Inc. (Austin TX) | MCCE102J3NO |
| 488 | .01 uF, 1206 Pkg., 5%, capacitor | 1 | Surface Mountable Electronic Components, Inc. (Austin TX) | MCCE103J3NO |
| 459, 436 | .1 uF, 1206 Pkg., 5%, capacitor | 2 | Surface Mountable Electronic Components, Inc. (Austin TX) | MCCE104J3NR |
| 400 | 20 pF, 1206 Pkg., 5%, capacitor | 1 | Surface Mountable Electronic Components, Inc. (Austin TX) | MCCE200J3NO |
| 424, 471 | .22 uF, 1206 Pkg., 5%, capacitor | 2 | Surface Mountable Electronic Components, Inc. (Austin TX) | MCCE224J3NO |
| 495 | 39 pF, 1206 Pkg., 5%, capacitor | 1 | Surface Mountable Electronic Components, Inc. (Austin TX) | MCCE390J3NO |
| 399 | 5 pF, 1206 Pkg., .25%, capacitor | 1 | Surface Mountable Electronic Components, Inc. (Austin TX) | MCCE5R0C3NO |
| 497, 473, 440, 490, 485, 496 | 10 Kohm, 1206 Pkg., 5%, resistor | 6 | ROHM Co., LTD. (Antioch TN) | MCR18-EZH-JW-103 |
| 448, 450 | 100 Kohm, 1206 Pkg., 5%, resistor | 2 | ROHM Co., LTD. (Antioch TN) | MCR18-EZH-JW-104 |
| 475 | 1 Meg ohm, 1206 Pkg., 5%, resistor | 1 | ROHM Co., LTD. (Antioch TN) | MCR18-EZH-JW-105 |
| 398 | 10 Meg ohm, 1206 Pkg., 5%, resistor | 1 | ROHM Co., LTD. (Antioch TN) | MCR18-EZH-JW-106 |
| 470 | 1.3 Kohm, 1206 Pkg., 5%, resistor | 1 | ROHM Co., LTD. (Antioch TN) | MCR18-EZH-JW-132 |
| 441, 486, 405, 406, 409, 410, 421, 411 | 15 Kohm, 1206 Pkg., 5%, resistor | 8 | ROHM Co., LTD. (Antioch TN) | MCR18-EZH-JW-153 |
| 477, 445 | 20 Kohm, 1206 Pkg., 5%, resistor | 2 | ROHM Co., LTD. (Antioch TN) | MCR18-EZH-JW-203 |
| 469 | 470 ohm, 1206 Pkg., 5%, resistor | 1 | ROHM Co., LTD. (Antioch TN) | MCR18-EZH-JW-471 |
| 478 | 47K ohm, 1206 Pkg., 5%, resistor | 1 | ROHM Co., LTD. (Antioch TN) | MCR18-EZH-JW-473 |
| 397 | 470 Kohm, 1206 Pkg., 5%, resistor | 1 | ROHM Co., LTD. (Antioch TN) | MCR18-EZH-JW-474 |
| 493 | 510 ohm, 1206 Pkg., 5%, resistor | 1 | ROHM Co., LTD. (Antioch TN) | MCR18-EZH-JW-511 |
| 487 | 5.1 Kohm, 1206 Pkg., 5%, resistor | 1 | ROHM Co., LTD. (Antioch TN) | MCR18-EZH-JW-512 |
| U42A–U42F | Hex Schmitt Inverter | 1 | National Semiconductor Corp. (Santa Clara CA) | MM74HC14M |
| 433, 434, 453, 499 | Quad Bilateral Switch | 1 | National Semiconductor Corp. (Santa Clara CA) | MM74HC4066N |
| 427 | .047 uF, Temp. Stable Cap | 1 | NIC Components Corp. (Amityville NY) | NSPC473J1683K |
| 404 | 8 bit microprocessor | 1 | Microchip Technology, Inc. (Chandler AZ) | PIC16C54-LP\SO |
| 366 | 2.4 MM male jack | 1 | CUI Stack, Inc. (Beaverton OR) | PJ-002B |
| 395 | 32.768 KHz crystal | 1 | Raltron (Miami FL) | R38-32.768 KHz |
| 369 | 0.5 Amp Resettable fuse | 1 | Raychem Corp. (Menlo Park CA) | RXE110 |

Figure 13:
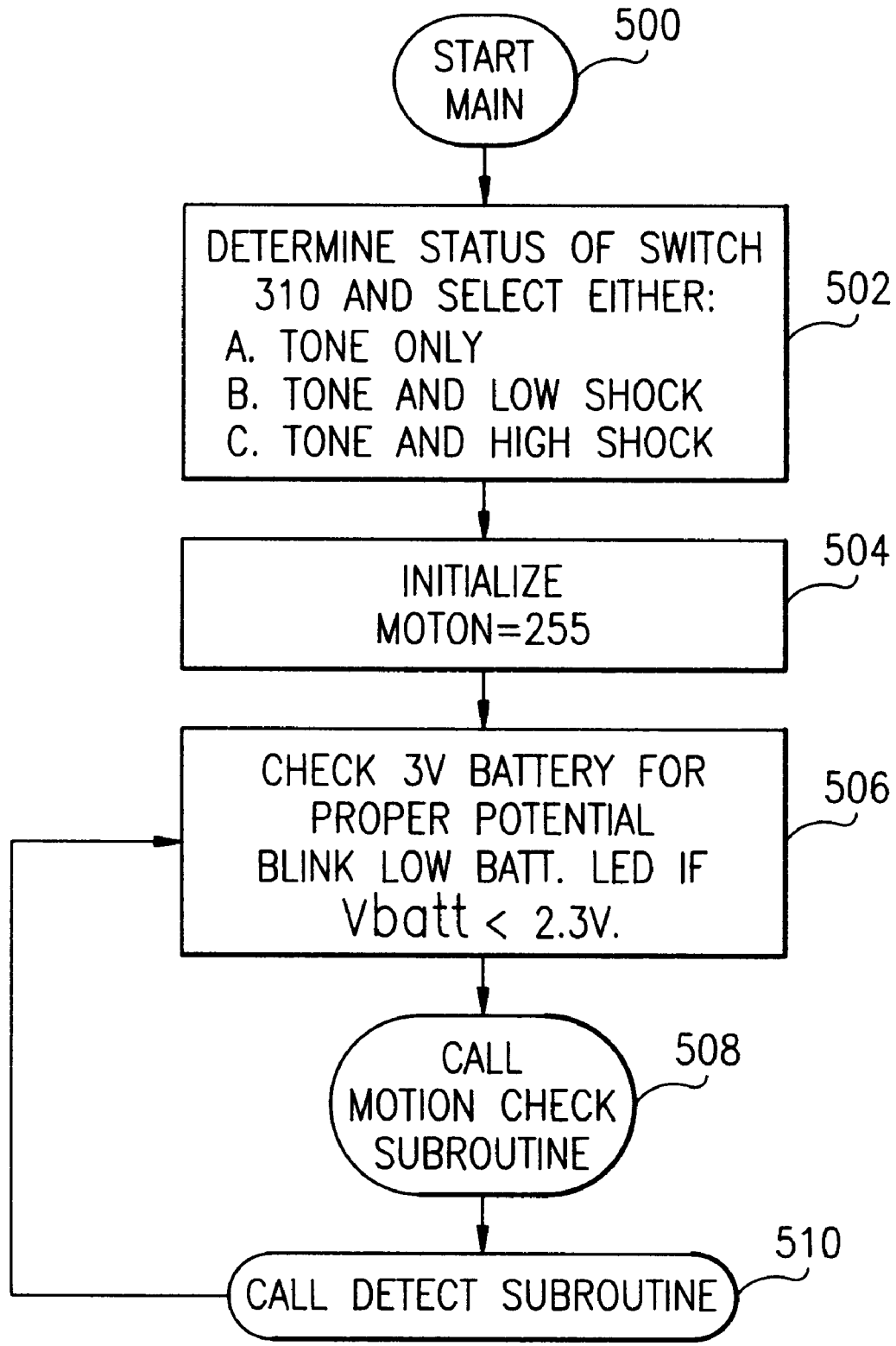
FIG. 13 is a flowchart illustrating Main Routine executed by the microprocessor of the control and stimulation subsystem of FIG. 9.

Having described the structure and operation of wire loop unit 21 in detail, it is now appropriate to discuss the operation of receiver/stimulator 14 in further detail including the manner in which the microprocessor 281 of control and stimulation subsystem 130 operates. Referring to FIG. 13, there is illustrated a Main Routine which is commenced by microprocessor 281, as indicated at block 500, immediately upon application of operating power to receiver/stimulator unit 14 by installing battery 138. As indicated at block 502, microprocessor 281 determines the status of switch 310 by reading the logic level status of ports RB6 and RB7 as described earlier and selecting an appropriate stimulation routine to be executed when microprocessor 281 determines that one or more programmed preconditions associated with the reception of an RF signal 18 have been satisfied. Such preconditions include, but are not necessarily limited to, an indication that receiver/stimulator unit 14 has received an RF signal 18 identified by a 16 bit (four digit hexidecimal) code which that particular receiver/stimulator unit 14 has been programmed to respond to by administering an aversive stimulus to animal 12. According to the status of ports RB6 and RB7, microprocessor 281 selects a stimulation routine for delivering either an audible tone only, an audible tone combined with a high intensity ("High") electrical shock or an audible tone combined with a lower intensity ("Low") electrical shock. Within a given stimulation routine, various stimulation parameters can be programmed to be selected based on which particular digital code receiver/stimulator unit 14 detects at a given time. Such parameters include the duration of audio tone bursts and the lengths of time intervals between successive bursts. Similarly, the repetition rate of shock pulses 341, the number of shock pulses 341 and/or the length of delay intervals between successive series of shock pulses 341 can all be determined on a preprogrammed basis according to which particular digital code is received by a particular receiver/stimulator unit 14 at any given time.

Figure 14:
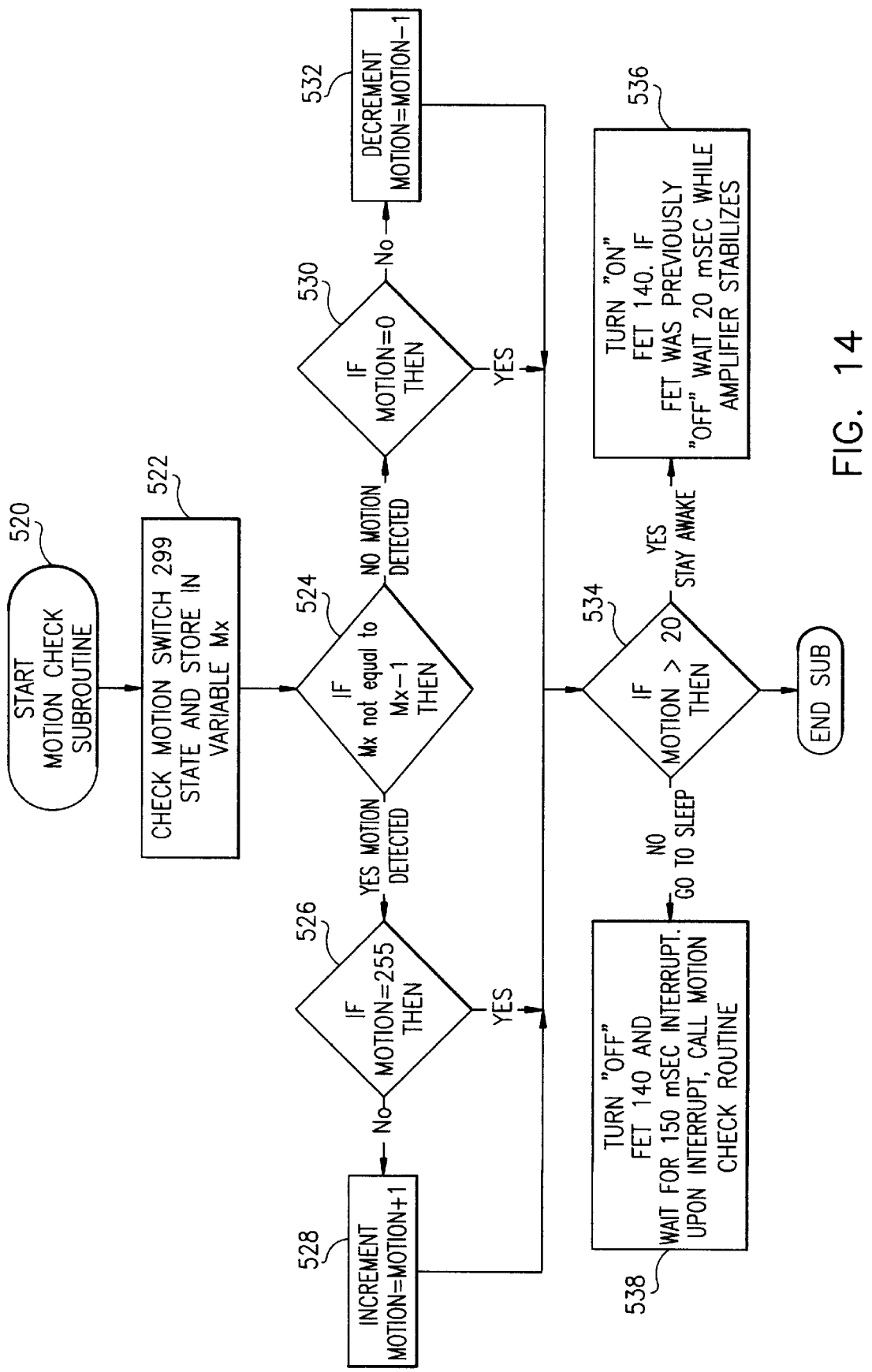
FIG. 14 is a flowchart illustrating the Motion Check subroutine of FIG. 13.

Once the appropriate stimulation routine is selected, microprocessor 241 initializes a counter referred to by the mnemonic "MOTION" to an initial numerical value as indicated at block 504. The purpose of doing so will become apparent upon explanation of the Motion Check subroutine of FIG. 15. As block 506 indicates, microprocessor 281 then checks for a low battery condition and causes LED 308 to blink if battery 138 is determined to be low. This is accomplished simply by reading input port RB4 at pin 10 of microprocessor 281 and generating an intermittent output signal at output port RA2 in the event the status of port RB4 indicates that low voltage detector 307 detects a voltage of less than 2.35 volts at power supply rail 283. The stored operating program then causes microprocessor 281 to successively call a Motion Check subroutine as indicated at block 508 and a Detect subroutine as indicated at block 510. Program flow then loops back to block 506 as indicated to repetitively perform the battery check and the subroutines Motion Check and Detect so long as operating power continues to be available to receiver/stimulator unit 14. The Motion Check subroutine will now be described with reference to FIG. 14.

The Motion Check subroutine serves to conserve battery 138 by selectively terminating the flow of operating power to portions of receiver/stimulator unit 14 during periods when animal 12 or 12' is determined not to be moving. As indicated at block 520, the Motion Check subroutine starts immediately upon being called by the Main routine of FIG. 13. As indicated at block 522, the status of motion switch 299 is checked by reading the status of input port RB5 and storing this status in a register designated by the variable name "Mx." As block 524 indicates, microprocessor 281 then compares the present status of register Mx to the value, Mx-1, stored during the immediately preceding execution of the Motion Check subroutine. If the two values differ, it is assumed that animal 12 is in motion. As blocks 526 and 528 show, the value of register MOTION is then checked and, provided this value does not exceed its predetermined maximum value of two-hundred fifty-five (255), the MOTION register is incremented. If the comparison of block 524 indicates the status of motion switch 299 has not changed, animal 12 is assumed not to be in motion. As blocks 530 and 532 indicate, the value of the MOTION register is then checked and decremented unless it already equals zero. After having been checked and, if necessary, incremented or decremented as a result of the execution of blocks 526 and/or 528 or blocks 530 and/or 532, the status of the MOTION register is again checked and compared with a predetermined numerical value such as twenty as indicated at block 534. In the event the present value stored in the MOTION register exceeds twenty, animal 12 is determined to be sufficiently active to warrant monitoring. In that event, a logical "0" value is written to port RA2 as indicated at block 536, thereby causing FET 140 to either continue conducting or begin conducting the flow of current from battery 138 to those portions of receiver 133 which consume significant amounts of power. In the event FET 140 was previously non-conducting, a twenty millisecond delay loop is executed to allow receiver 133 to stabilize before attempting to detect any encroachment of boundary 20 and/or 23. After block 536 is executed, the Motion Check subroutine ends as indicated at block 538 and program flow resumes with the Main Routine of FIG. 13. On the other hand, if the comparison performed at block 534 indicates the present value of the MOTION register does not exceed the predetermined threshold value of twenty, it is assumed that animal 12 has been sufficiently inactive as to warrant conserving power. In that event, as indicated at block 538, FET 140 is turned "off" by writing a logical "1" value to port RA2. A one hundred fifty millisecond delay loop is then entered and the Motion Check subroutine is again called in order to determine whether it is yet appropriate to turn FET 140 "on" and commence monitoring for an encroachment of a boundary 20 and/or wire loop boundary 20 due to an apparent resumption of movement on the part of animal 12. If and when animal 12 resumes movement, FET 140 will once again be turned on when block 536 is next executed. Upon ending the Motion Check subroutine at block 538, the Main Routine of FIG. 13 resumes at block 510 by calling the Detect Subroutine which will now be described with reference to FIG. 15.

Figure 15:
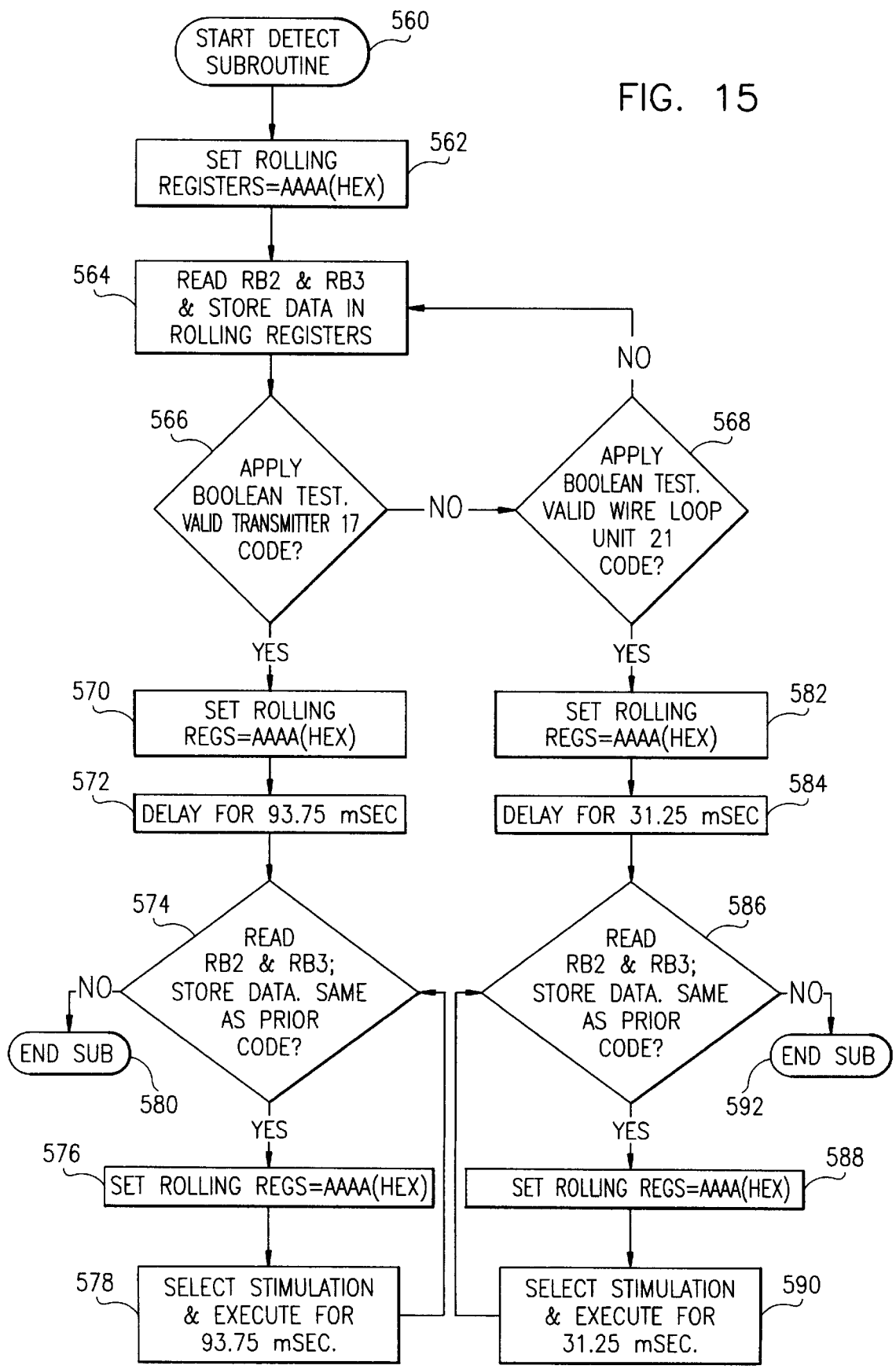
FIG. 15 is a flowchart illustrating the Detect subroutine of FIG. 13.

FIG. 15 summarizes the Detect subroutine which is executed by microprocessor 281 to determine whether certain preconditions associated with reception of an RF signal 18 have been satisfied and if so, to initiate administration of an appropriate form of aversive stimulation. Two such preconditions are imposed to reduce the possibility that the animal 12 will receive aversive stimulation even though it has not encroached upon any boundary 20 or 23. The first precondition which must be satisfied before microprocessor 281 will initiate any form of aversive stimulation is reception of an RF signal 18 bearing a sixteen bit (four digit hexidecimal) code to which the particular receiver/stimulator unit 14 has been programmed to respond. As noted previously, each receiver/stimulator unit may be programmed to respond to more than one such code according to preprogrammed Boolean criteria.

In order to determine whether and when such a first precondition is satisfied, the Detect subroutine starts as indicated at block 560 and proceeds immediately as indicated at block 562 to initialize two separate 16 bit (four digit hexidecimal) registers by loading each with data such as "AAAA" which does not correspond to any valid code receiver/stimulator unit 14 is to respond to but is otherwise arbitrary. These registers are referred to as "rolling" registers because they are continually updated with new data one bit at a time on a first-in, first-out (FIFO) basis. One of these rolling registers continually reflects the code data signal 275 presented to the input port RB2 at pin 8 of microprocessor 281 while the other continually reflects the quadrature code data signal presented to the input port RB3 at pin 9 of microprocessor 281. This is achieved as indicated at block 564 by reading the states of input ports RB2 and RB3 at least once during each 1.953 millisecond interval depicted in FIG. 3, determining the value of the data during that interval and storing that data in a respective one of each of the rolling registers. Each rolling register is updated in this manner once every 1.953 milliseconds on a FIFO basis.

As block 566 indicates, microprocessor 281 next determines whether the data presently appearing in either of the two rolling registers satisfies a Boolean test and thus constitutes a "valid" code associated with any of the transmitters 17 whose RF signals 18 bear a code to which the particular receiver/stimulator unit 14 is programmed to respond. If only one such valid code has been preprogrammed, the data in each of the two rolling registers is compared with that one code. If a plurality of such codes have been programmed, microprocessor 281 compares each one with the data in each of the two rolling registers and determines whether a Boolean test defining one or some logical combination of the preprogrammed codes is satisfied by the data in either of the two rolling registers. If such a Boolean test is satisfied, microprocessor 281 determines that a valid code from a transmitter 17 has been received. If no valid code associated with any of the transmitters 17 is detected, it is assumed no applicable boundary 20 has been encroached upon.

In such event, microprocessor 281 proceeds as indicated at block 568 to determine whether the data in either of the two rolling registers constitutes a valid code associated with a wire loop unit 21. Except that the preprogrammed codes and/or the Boolean criteria applied may be different, the execution of block 568 is otherwise the same as block 566 as just described. If no valid code associated with a wire loop unit 21 is detected, it is assumed no applicable wire loop boundary 23 has been encroached upon. In such event, program flow continually loops back to block 564 unless and until a valid code is detected upon a subsequent execution of block 566 and/or block 568. If desired, the number of times the loop consisting of blocks 564, 566 and 563 can optionally be counted by a software counter. By comparing the present value of the counter to a predetermined upper limit and redirecting program flow to end the Detect subroutine when that upper limit is reached, it can be assured that the battery check of block 506 will be performed no less frequently than may be appropriate to detect a low battery condition before battery 138 becomes unable to operate receiver/stimulator unit 14 reliably.

In the event microprocessor 281 determines as a result of the execution of block 566 and/or block 568 that a valid code has been received from a transmitter 17 and/or wire loop 22, a first precondition to the administration of an aversive stimulus is deemed satisfied. However, microprocessor 281 preferably does not immediately initiate administration of any stimulus. Rather, microprocessor 281 proceeds to determine whether a second necessary precondition is also satisfied. According to this aspect of the invention, no stimulus will be administered unless a subsequent transmission bearing the same code as a previous transmission is received during a limited window of time whose width and spacing in time with respect to a prior transmission are consistent with the duration and repetition rate known to be associated with transmissions emanating from a particular source. As the timing diagram of FIG. 3 reflects, the hexidecimal code identifying a transmitter 17 repeats regularly beginning 93.75 mSec after its immediately preceding transmission has been completed. Likewise, as explained above, the code associated with a wire loop unit 21 repeats regularly beginning 31.25 mSec after its immediately preceding transmission has been completed. By requiring a similarly encoded transmission to be received during a limited window of time consistent with one or the other of these known sets of timing parameters, the likelihood of stimulating an animal 12 when no boundary 20 or 23 has actually been encroached upon is greatly diminished.

In the preferred embodiment, this is achieved as shown in FIG. 15 by promptly re-initializing both of the rolling registers as indicated at block 570 as soon as a valid code associated with a transmitter 17 is detected. A 93.75 millisecond delay is then executed as indicated at block 572. As soon as the delay of block 572 is completed, input ports RB2 and RB3 of microprocessor 281 are read and the data so acquired is stored in each respective rolling register in the manner explained above as indicated at block 574. Once sixteen bits of data have been read and stored in each of the rolling registers in this manner, microprocessor 281 compares the data in each of the two rolling registers with the valid code data detected at block 566. If the code matches the data in either of the two rolling registers, a second predetermined condition is deemed satisfied whereupon both rolling registers are promptly re-initialized as indicated at block 576 prior to initiating stimulation. If the code does not match the data in either of the two rolling registers, the second predetermined condition is not satisfied and no stimulation is initiated. Instead, the Detect subroutine ends as indicated at block 592 and program flow is redirected to block 506 of the Main routine of FIG. 13.

As block 578 indicates, microprocessor 281 next selects a stimulation routine corresponding to the particular code determined to have been received at blocks 566 and 574. In so doing, microprocessor 281 selects at least one stimulation parameter in accordance with the particular digital code received. As FIG. 10 reflects, the stimulation parameters so selected may include the duration of stimulation, the repetition rate of stimulation, the number of times stimulation is applied in response to a single encroachment and/or the duration of intervals separating successive stimuli. Microprocessor 281 then executes the selected stimulation routine by driving port RA1 or port RA1 and port RA0 to generate the form and intensity of stimulation selected according to the status of switch 310 as determined at block 502 of the Main Routine of FIG. 13. As block 578 indicates, stimulation is administered for an interval of 93.75 milliseconds after which program flow is promptly redirected to block 574 is indicated. Stimulation continues to be applied in the manner determined by the selected stimulation routine until a valid code is no longer detected at block 574. In that event, the Detect subroutine ends as indicated at block 580.

Microprocessor 281 operates in a similar manner to determine whether a second predetermined condition associated with reception of an RF signal 18 from wire loop 22 is satisfied. As block 582 of FIG. 15 reflects, both rolling registers are promptly re-initialized as soon as a valid code associated with wire loop unit 21 is detected at block 568. Consistent with the 31.25 millisecond time interval between the end of one transmission of the code associated with wire loop unit 21 and the beginning of the next, a 31.25 millisecond delay is executed as indicated at block 584. As soon as that delay is completed, input ports RB2 and RB3 of microprocessor 281 are read and the data so acquired is stored in each respective rolling register as indicated at block 586. Once sixteen bits of data have been read and stored in each of the rolling registers in this manner, microprocessor 281 compares the data in each of the two rolling registers with the valid wire loop code detected at block 568. If that code matches the data present in either of the two rolling registers, the second predetermined condition is deemed satisfied. In that event, both rolling registers are re-initialized as indicated at block 588. If there is no match, however, the second predetermined condition is not satisfied. Rather than initiating stimulation, the Detect subroutine ends as block 592 indicates and program flow is redirected to block 506 of the Main routine of FIG. 13.

As block 590 reflects, microprocessor 281 then selects a stimulation routine corresponding to the particular code determined to have been received at blocks 568 and 586 and thereby selects one or more stimulation parameters such as those identified above. Microprocessor 281 then executes the selected stimulation routine by driving port RA1 or port RA1 and port RA0 to generate the form and intensity of stimulation selected according to the status of selector switch 310 as determined at block 502 of the Main Routine of FIG. 13. As block 590 indicates, stimulation is administered for an interval of 31.25 milliseconds after which program flow is promptly redirected to block 586 as indicated. Stimulation continues to be applied in the manner determined by the selected stimulation routine until a valid code is no longer detected at block 586. In that event, the Detect subroutine ends as indicated at block 592. Preferred stimulation routines are illustrated in FIG. 10. As noted previously, microprocessor 281 is preferably programmed to include a software timer, loop counter or other facility to limit the maximum number of times and/or the maximum duration of stimulation delivered as the result of any single boundary encroachment episode or series of episodes occurring closely in time to one another.

While the foregoing constitute preferred embodiments of the present invention, it is to be understood that the invention is not limited thereto and that in light of the present disclosure, various alternative embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

What is claimed is:

1. A radio frequency (RF) signaling apparatus, comprising:
    (a) a resonant circuit resonant substantially at an RF carrier frequency, said resonant circuit including an antenna; and
    (b) a drive circuit coupled to said resonant circuit, said drive circuit delivering to said resonant circuit, at substantially said RF carrier frequency, brief pulses of electrical energy separated by intervals of time in order to cause said resonant circuit to resonate, thereby exciting said antenna to transmit an RF signal at substantially said RF carrier frequency.

2. The apparatus of claim 1 wherein said drive circuit comprises a circuit which delivers said pulses of electrical energy at a duty cycle of less than about one percent (1%).

3. The apparatus of claim 1 wherein said drive circuit comprises a circuit which delivers said pulses of electrical energy at a duty cycle of less than about five percent (5%).

4. The apparatus of claim 1 wherein said drive circuit comprises a circuit which delivers said pulses of electrical energy at a duty cycle of less than about fifteen percent (15%).

5. The apparatus of claim 1 wherein said antenna is electrically small and said RF carrier frequency is a frequency of about ten kilohertz or less.

6. The apparatus of claim 1 wherein said RF signal comprises a signal having a magnetic field whose magnitude decreases substantially in proportion to the cube of increasing distance from said antenna.

7. The apparatus of claim 1 wherein said apparatus further comprises circuitry for controlling the phase of said pulses to digitally encode said RF signal.

8. The apparatus of claim 1 wherein said RF signal comprises a signal having an amplitude bounded by an envelope having a substantially constant magnitude.

9. A radio frequency (RF) signaling apparatus, comprising:
    (a) a resonant circuit resonant substantially at an RF carrier frequency, said resonant circuit including an antenna;
    (b) a drive circuit coupleable to said resonant circuit, said drive circuit delivering to said resonant circuit, at substantially said RF carrier frequency, pulses of electrical energy separated by intervals of time in order to cause said resonant circuit to resonate, thereby exciting said antenna to transmit an RF signal at substantially said RF carrier frequency; and
    (c) an isolation circuit operably interposed between said resonant circuit and said drive circuit, said isolation circuit operating to effectively electrically isolate said resonant circuit from said drive circuit during at least a portion of said intervals.

10. The apparatus of claim 9 wherein said portion of said intervals comprises substantially the entirety of said intervals.

11. The apparatus of claim 9 wherein said pulses are of a duration which is brief compared to said intervals and said RF carrier frequency is a frequency of about ten kilohertz or less.

12. The apparatus of claim 9 wherein said RF signal comprises a signal having a magnetic field whose magnitude decreases substantially in proportion to the cube of increasing distance from said antenna.

13. The apparatus of claim 9 further comprising circuitry for controlling the phase of said pulses to digitally encode said RF signal.

14. The apparatus of claim 9 wherein said RF signal comprises a signal having an amplitude bounded by an envelope having substantially constant magnitude.

15. A radio frequency (RF) signaling method, comprising the steps of:
    (a) providing an antenna resonant substantially at an RF carrier frequency; and
    (b) repetitively delivering to said antenna, at substantially said RF carrier frequency, pulses of electrical energy separated by intervals of time to cause said antenna to resonantly transmit an RF signal at substantially said RF carrier frequency.

16. The method of claim 15 wherein said pulses and said intervals represent a duty cycle of less than about one percent (1%).

17. The method of claim 15 wherein said pulses and said intervals represent a duty cycle of less than about five percent (5%).

18. The method of claim 15 wherein said pulses and said intervals represent a duty cycle of less than about fifteen percent (15%).

19. The method of claim 15 further comprising the step of encoding said RF signal by controlling the phase of said pulses.

20. The method of claim 19 wherein said encoding step comprises the step of shifting the phase of at least some of said pulses prior to delivering said pulses to said antenna.

21. The method of claim 15 wherein said providing step comprises the step of providing a said antenna which is electrically small.

22. The method of claim 15 further comprising the step of encoding said RF signal by controlling the phase of said pulses.

23. The method of claim 22 wherein said encoding step comprises the step of shifting the phase of at least some of said pulses prior to delivering said pulses to said antenna.

24. The method of claim 22 wherein said providing step comprises the step of providing a said antenna which is electrically small and wherein said RF carrier frequency is a frequency of about ten kilohertz.

25. A radio frequency (RF) signaling method, comprising the steps of:
   (a) providing an antenna resonant substantially at an RF carrier frequency;
   (b) providing a drive circuit selectively electrically coupleable to said antenna;
   (c) repetitively delivering to said antenna, at substantially said RF carrier frequency pulses, of electrical energy separated by intervals of time to cause said antenna to resonantly transmit an RF signal at substantially said RF carrier frequency; and
   (d) effectively electrically isolating said drive circuit from said antenna during at least a portion of said intervals.

26. The method of claim 25 wherein said portion of said intervals comprises substantially the entirety of said intervals.

27. The method of claim 25 wherein said pulses and said intervals represent a duty cycle of less than about one percent (1%).

28. The method of claim 25 wherein said pulses and said intervals represent a duty cycle of less than about five percent (5%).

29. The method of claim 25 wherein said pulses and said intervals represent a duty cycle of less than about fifteen percent (15%).

30. The method of claim 25 further comprising the step of encoding said RF signal by controlling the phase of said pulses.

31. The method of claim 30 wherein said controlling step comprises the step of shifting the phase of at least some of said pulses prior to delivering said pulses to said antenna.

32. The method of claim 25 wherein said providing step comprises the step of providing a said antenna which is electrically small and wherein said RF carrier frequency is a frequency of about ten kilohertz or less.

33. An apparatus for controlling the whereabouts of an animal, said apparatus comprising:
   (a) at least one transmitter operable to transmit a radio frequency (RF) signal defining a boundary in the vicinity of said transmitter, said transmitter including:
      (i) a resonant circuit resonant substantially at an RF carrier frequency, said resonant circuit including an antenna; and
      (ii) a drive circuit coupled to said resonant circuit, said drive circuit delivering to said resonant circuit, at substantially said RF frequency, a series of pulses of electrical energy effective to cause said resonant circuit to resonate thereby exciting said antenna to transmit said RF signal;
   (b) a receiver for receiving said RF signal; and
   (c) a stimulator responsive to said receiver for determining based on said RF signal whether at least one predetermined condition indicating encroachment of said boundary by the animal has been satisfied and, subject to satisfaction of said condition, administering to the animal at least one stimulus for deterring said encroachment in order to control the whereabouts of the animal.

34. The apparatus of claim 33 wherein said RF carrier frequency is a frequency of about 10 kilohertz or less.

35. The apparatus of claim 33 wherein said antenna is electrically small and said RF carrier frequency is a frequency of about ten kilohertz or less.

36. The apparatus of claim 33 wherein said transmitter is a transmitter operable to transmit a said RF signal having a magnetic field whose magnitude decreases substantially in proportion to the cube of increasing distance from said transmitter.

37. The apparatus of claim 33 wherein said transmitter further comprises circuitry for controlling the phase of said pulses to digitally encode said RF signal.

38. The apparatus of claim 33 wherein said transmitter is a transmitter operable to transmit a said RF signal having an amplitude bounded by an envelope of substantially constant magnitude.

39. An apparatus for controlling the whereabouts of an animal, said apparatus comprising:
   (a) at least one transmitter operable to transmit a first radio frequency signal which defines a first boundary in the vicinity of each said transmitter;
   (b) a wire loop operable to transmit a second radio frequency signal which defines a second boundary in the vicinity of said wire loop;
   (c) a receiver for receiving said first and second radio frequency signals; and
   (d) a stimulator operably coupled to said receiver for determining, based upon at least one of said first and second signals, whether at least one predetermined condition indicating encroachment of at least one of said first and second boundaries by the animal has been satisfied and, subject to satisfaction of said condition, administering to the animal at least one stimulus for deterring said encroachment in order to control the whereabouts of the animal.

40. The apparatus of claim 39 wherein said second radio frequency signal is of a frequency of less than about ten kilohertz.

41. The apparatus of claim 39 wherein said second radio frequency signal is a signal whose amplitude is bounded by an envelope of substantially constant magnitude.

42. The apparatus of claim 39 wherein said first radio frequency signal and said second radio frequency signal each bear a digital code, the reception of which constitutes a said predetermined condition.

43. The apparatus of claim 39 wherein said first radio signal is a signal having a magnetic field whose magnitude decreases substantially in proportion to the cube of increasing distance from said transmitter.

44. An apparatus for controlling the whereabouts of an animal, said apparatus comprising:
   (a) at least one transmitter operable to transmit a radio frequency signal defining a boundary in the vicinity of said transmitter, said radio frequency signal having a magnetic field the magnitude of which decreases substantially in proportion to the cube of increasing distance from said transmitter;
   (b) a receiver for receiving said signal; and
   (c) a stimulator responsive to said receiver for determining based on said signal whether at least one predetermined condition indicating encroachment of said boundary by the animal has been satisfied and, subject to satisfaction of said condition, administering to the animal at least one stimulus for deterring said encroachment in order to control the whereabouts of the animal.

45. The apparatus of claim 44 wherein said transmitter comprises a transmitter operable to transmit said radio frequency signal at a frequency of about ten kilohertz or less.

46. A method for controlling the whereabouts of an animal, said method comprising the steps of:
   (a) providing a wire loop along a path defining a boundary for the animal;

(b) coupling the loop to a source of radio frequency electrical energy effective to cause the loop to transmit a radio frequency signal other than an amplitude modulated (AM) signal;

(c) detecting a condition of said radio frequency signal indicating encroachment of said boundary by said animal and, in response to said detecting of said condition, administering to the animal at least one stimulus for deterring the animal from said encroachment;

(d) monitoring for the occurrence of a break in said loop; and (e) in response to detecting a said break in said loop, selectively coupling the loop to a source of amplitude modulated (AM) radio frequency electrical energy whereby locating the site of said break using a conventional AM receiver is facilitated.

47. In a system for controlling the whereabouts of an animal of the type in which an electronic boundary for the animal is established by transmitting a radio frequency signal and at least one aversive stimulus is delivered to the animal in response to detecting a condition of the radio frequency signal indicating that the boundary has been encroached upon by the animal, the improvement comprising:

interposing inactive intervals between at least some successive transmissions of said radio frequency signal.

48. The system of claim 47 wherein said inactive intervals are each within a range of from about thirty milliseconds to about five seconds.

49. An apparatus for controlling the whereabouts of an animal, said apparatus comprising:

(a) a transmitter for intermittently transmitting radio frequency signals defining a boundary for the animal;

(b) a receiver for receiving said signals; and (c) a stimulator operably coupled to said receiver for administering at least one stimulus to the animal to deter the animal from encroachment of said boundary in response to determining, based on said radio frequency signals, whether at least one predetermined condition indicating encroachment of said boundary has been satisfied, at least one said predetermined condition being reception of at least one of said radio frequency signals during a predetermined limited window of time occurring subsequent to reception of a previously transmitted one of said radio frequency signals.

50. A method for controlling the whereabouts of an animal, said method comprising the steps of:

establishing a boundary for the animal by intermittently transmitting radio frequency signals in the vicinity of the boundary;

receiving said signals; and selectively administering to the animal at least one stimulus to deter the animal from encroachment of said boundary in response to determining, based on said signals, whether at least one predetermined condition indicating encroachment of said boundary has been satisfied, at least one said predetermined condition being reception of at least one of said signals during a limited window of time occurring subsequent to reception of a previously transmitted one of said signals.

51. An apparatus for controlling the whereabouts of an animal, said apparatus comprising:

(a) a transmitter for intermittently transmitting radio frequency signals bearing a predetermined code, said signals defining a boundary for the animal;

(b) a receiver for receiving said signals; and (c) a stimulator operably coupled to said receiver for administering at least one stimulus to the animal to deter the animal from encroachment of said boundary in response to determining, based on said signals, whether at least one predetermined condition indicating encroachment of said boundary has been satisfied, at least one said predetermined condition being reception of at least one of said signals during a predetermined limited window of time occurring subsequent to reception of a previously transmitted one of said radio frequency signals, an additional said predetermined condition being reception of at least one of said signals bearing said predetermined code.

52. A method for controlling the whereabouts of an animal, said method comprising the steps of:

establishing a boundary for the animal, said establishing step including the step of intermittently transmitting radio frequency signals in the vicinity of the boundary, at least some of said signals bearing a predetermined code;

receiving said signals; and selectively administering to the animal at least one stimulus to deter the animal from encroachment of said boundary in response to determining, based on said signals, whether at least one predetermined condition indicating encroachment of said boundary has been satisfied, at least one said predetermined condition being reception of at least one of said signals during a limited window of time occurring subsequent to reception of a previously transmitted one of said signals, an additional said predetermined condition being reception of at least one of said signals bearing said predetermined code.

53. An apparatus for controlling the whereabouts of animals, said apparatus comprising:

a first device operable to transmit a first radio frequency signal defining a first boundary for the animal, said first radio frequency signal bearing predetermined first information;

a second device operable to transmit a second radio frequency signal defining a second boundary for the animal, said second radio frequency signal bearing predetermined second information; and a unit affixable to the animal operable to receive at least one of said first and second radio frequency signals, and to determine, based on at least one of said first information and said second information, whether at least one predetermined condition precedent to applying a stimulus to the animal to deter the animal from encroaching at least one of said first boundary and said second boundary is satisfied.

54. The apparatus of claim 53 wherein said first device comprises a wire loop whose path traverses the midst of at least a portion of said first boundary.

55. The apparatus of claim 53 wherein said second device comprises a battery powered transmitter.

56. The apparatus of claim 53 wherein said first information comprises a first digital code and said second information comprises a second digital code distinguishable from said first digital code.

57. The apparatus of claim 53 wherein said unit comprises a unit further operable to select at least one predetermined stimulation parameter based on at least one of said first and second information.

* * * * *